United States Patent [19]
Shinomiya et al.

[11] Patent Number: 4,520,745
[45] Date of Patent: Jun. 4, 1985

[54] SEAM FORMING METHOD AND DEVICE FOR SEWING MACHINE FOR EMBROIDERY

[75] Inventors: Hiroaki Shinomiya; Minetoshi Noguchi, both of Tokyo, Japan

[73] Assignee: Tokyo Juki Industrial Co., Ltd., Tokyo, Japan

[21] Appl. No.: 429,852

[22] Filed: Sep. 30, 1982

[30] Foreign Application Priority Data

May 17, 1982 [JP] Japan ................................. 57-82701

[51] Int. Cl.³ .............................................. D05C 9/06
[52] U.S. Cl. .................................. 112/266.1; 112/103; 112/121.12; 112/262.3
[58] Field of Search ................ 112/266.1, 121.12, 102, 112/103, 158 E, 262.1, 262.3

[56] References Cited

U.S. PATENT DOCUMENTS

| | | | |
|---|---|---|---|
| 4,190,007 | 2/1980 | Kimura et al. | 112/121.12 |
| 4,290,375 | 9/1981 | Tonomura et al. | 112/121.12 |
| 4,352,334 | 10/1982 | Childs et al. | 112/103 X |
| 4,383,489 | 5/1983 | Sugiyama et al. | 112/103 |
| 4,385,570 | 5/1983 | Yanagi | 112/121.12 |

Primary Examiner—Peter Nerbun
Attorney, Agent, or Firm—Koda & Androlia

[57] ABSTRACT

In a seam forming method and device for a sewing machine for embroidery, wherein a contour of a figure to be embroidered is converted into positional co-ordinates and read, data is calculated for alternately setting needle location points on opposing portions of the contour in such a manner that embroidery seams is formed in the contour corresponding to the positional co-ordinates thus read, and the data are read out and a needle is vertically moved to form the embroidery seams, with a taboret being moved in directions X and Y, with a figure including at least one side having a circular arc-shaped contour out of two opposing sides, needle location points are set at regular intervals circumferentially on a circular arc-shaped side, and needle location points on a side opposed to the circular arc-shaped side are set at points of intersections of the side opposed to the circular arc-shaped side with radial lines from the center of the circular arc passing through the midpoint of the needle location points on the circular arc-shaped side.

12 Claims, 74 Drawing Figures

FIG.3
(A)
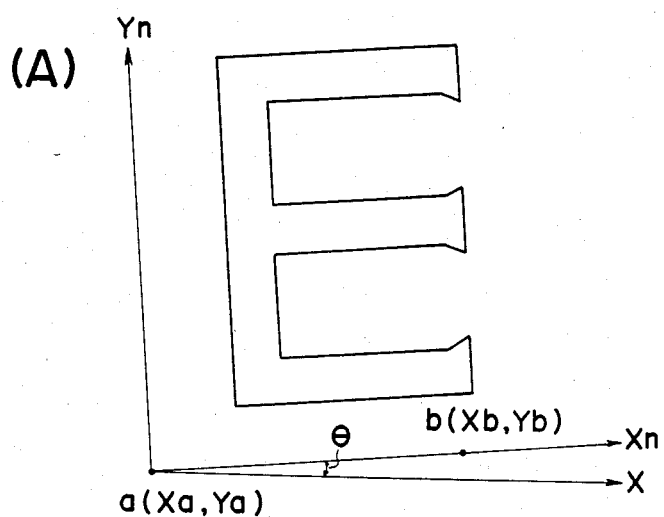
(B)
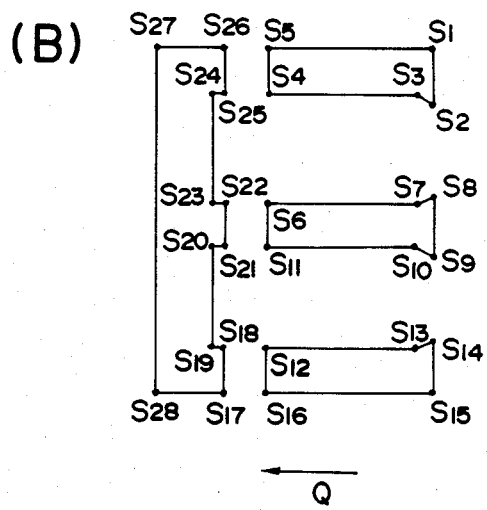

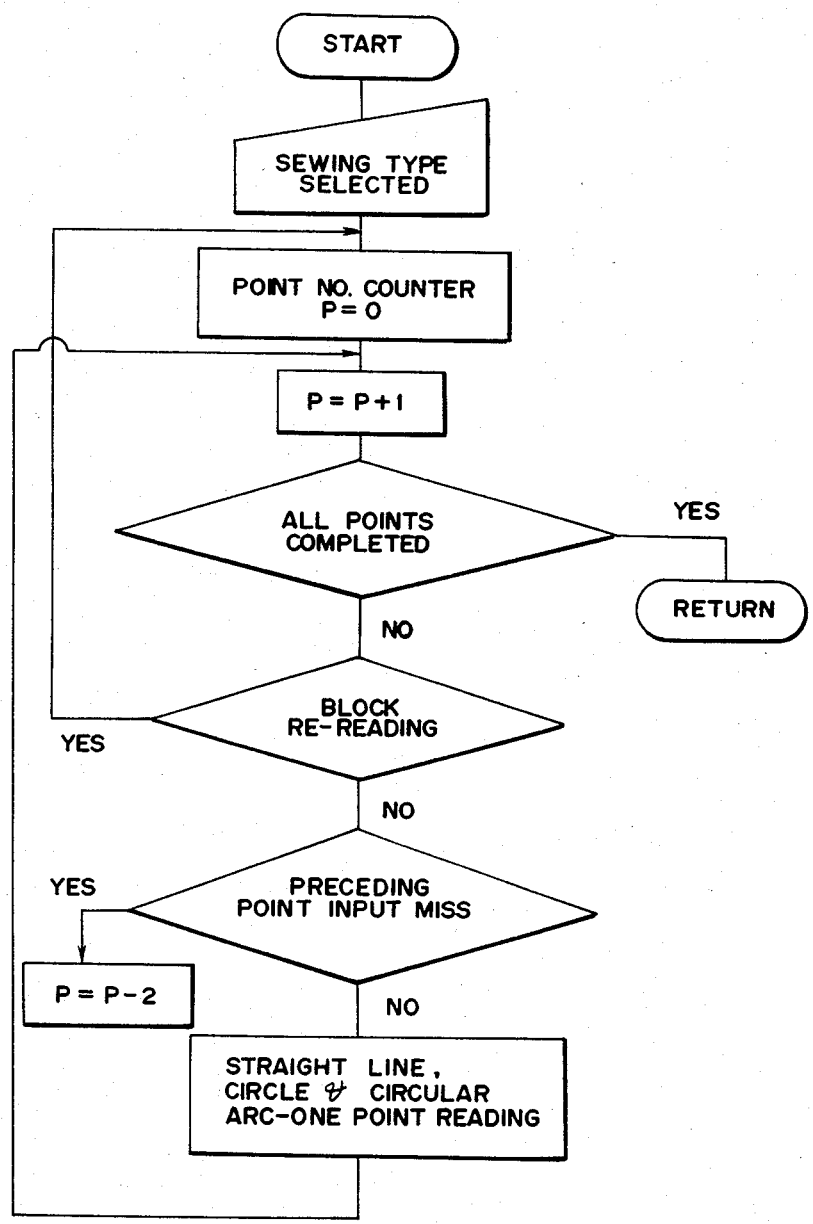

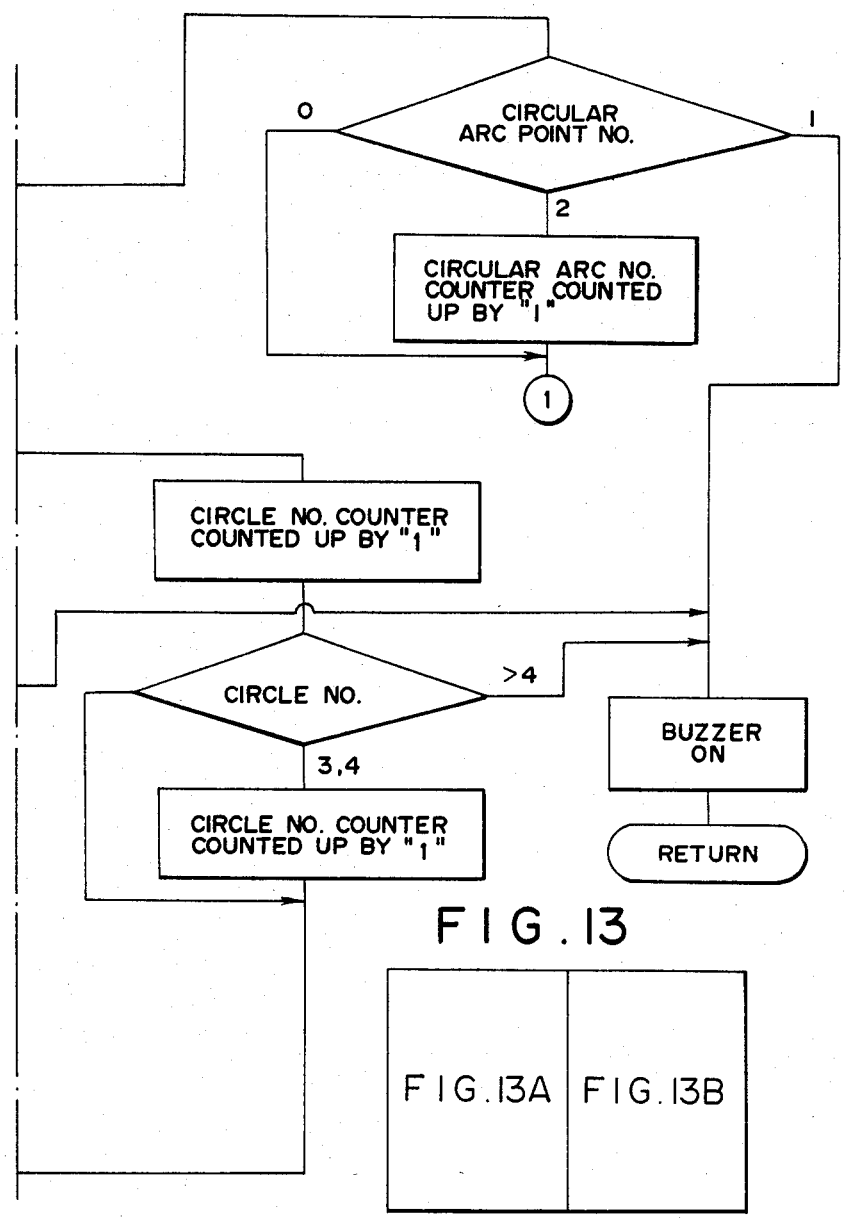
FIG.13B
FIG.13
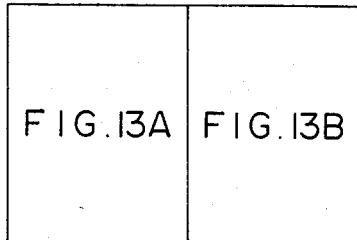

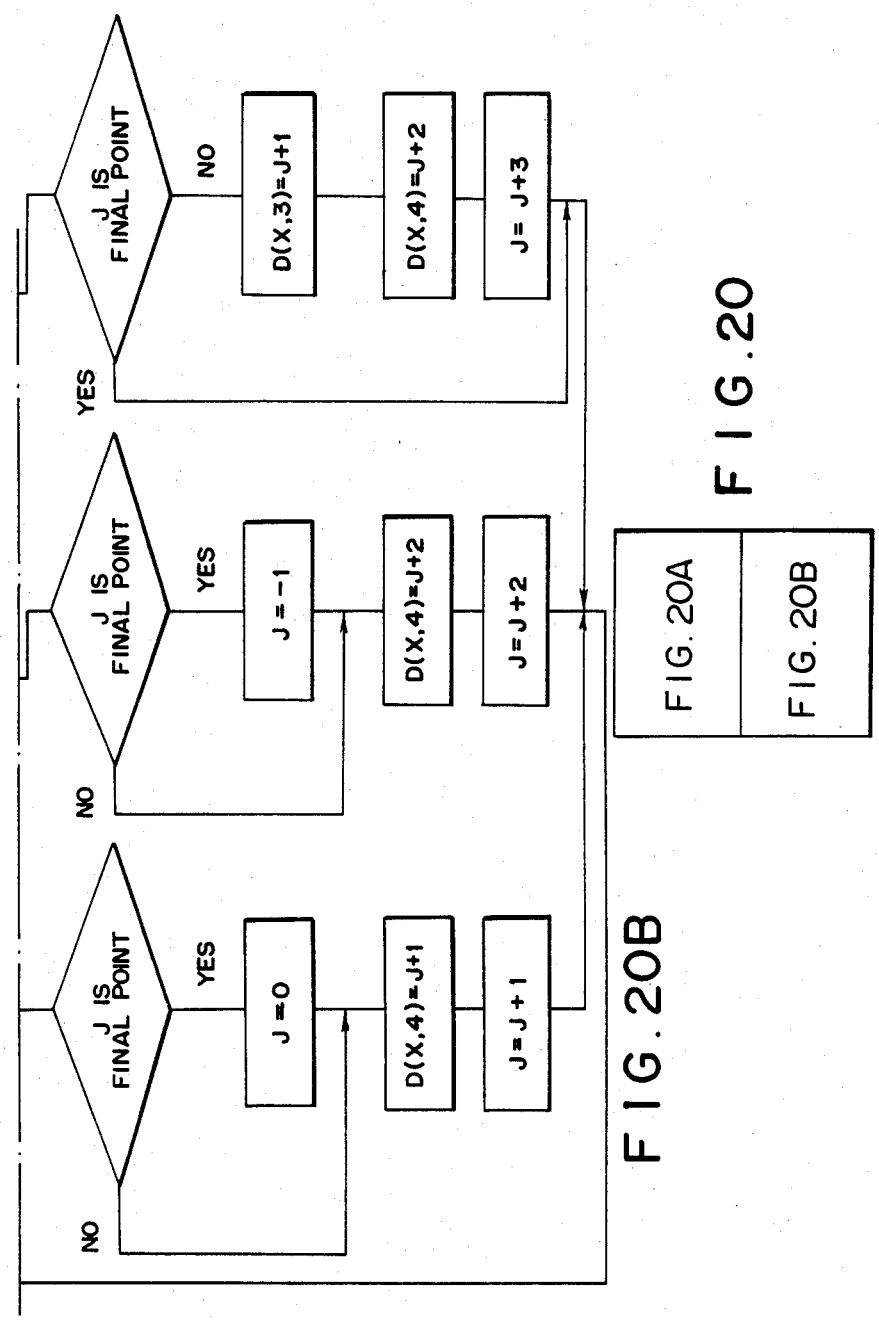

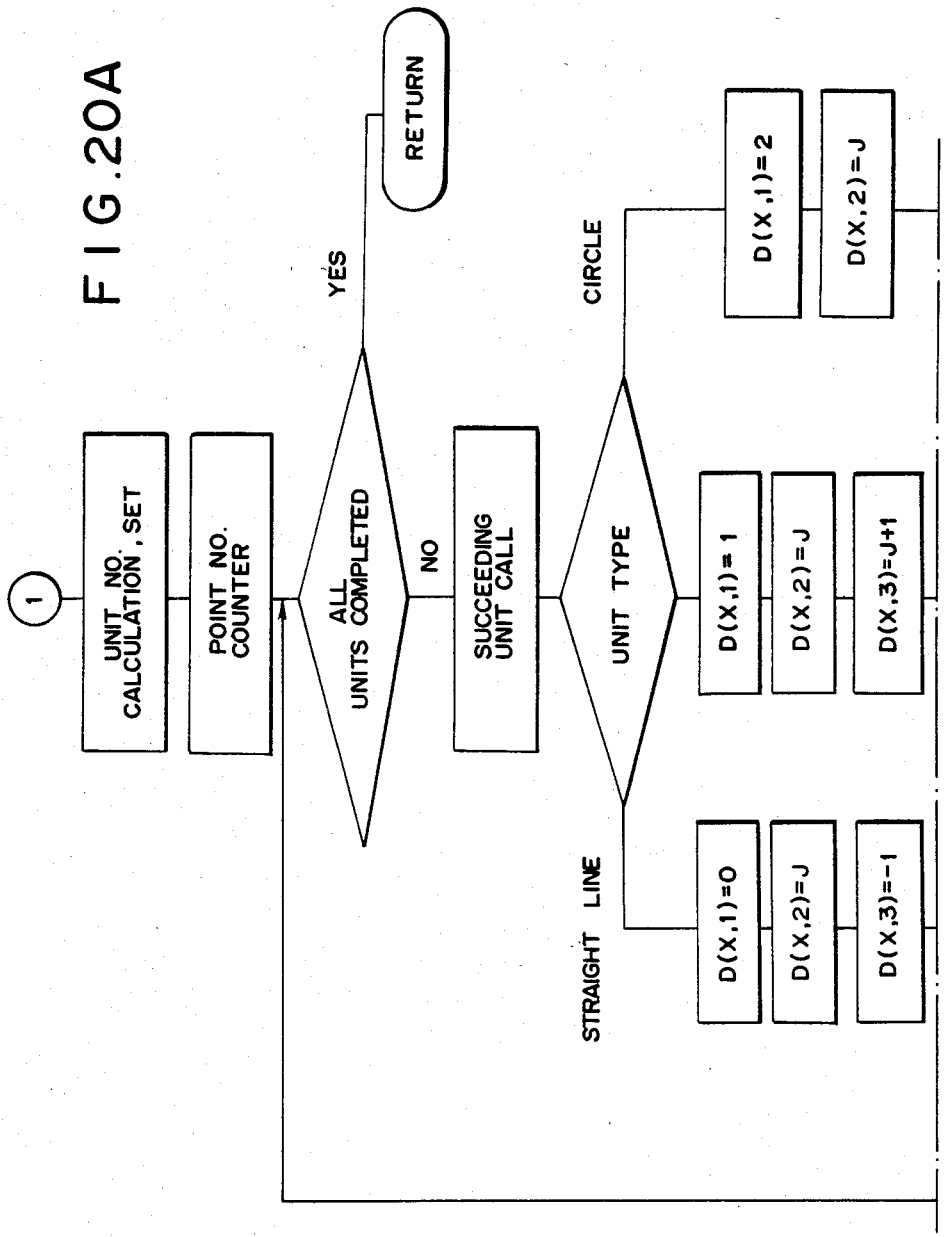

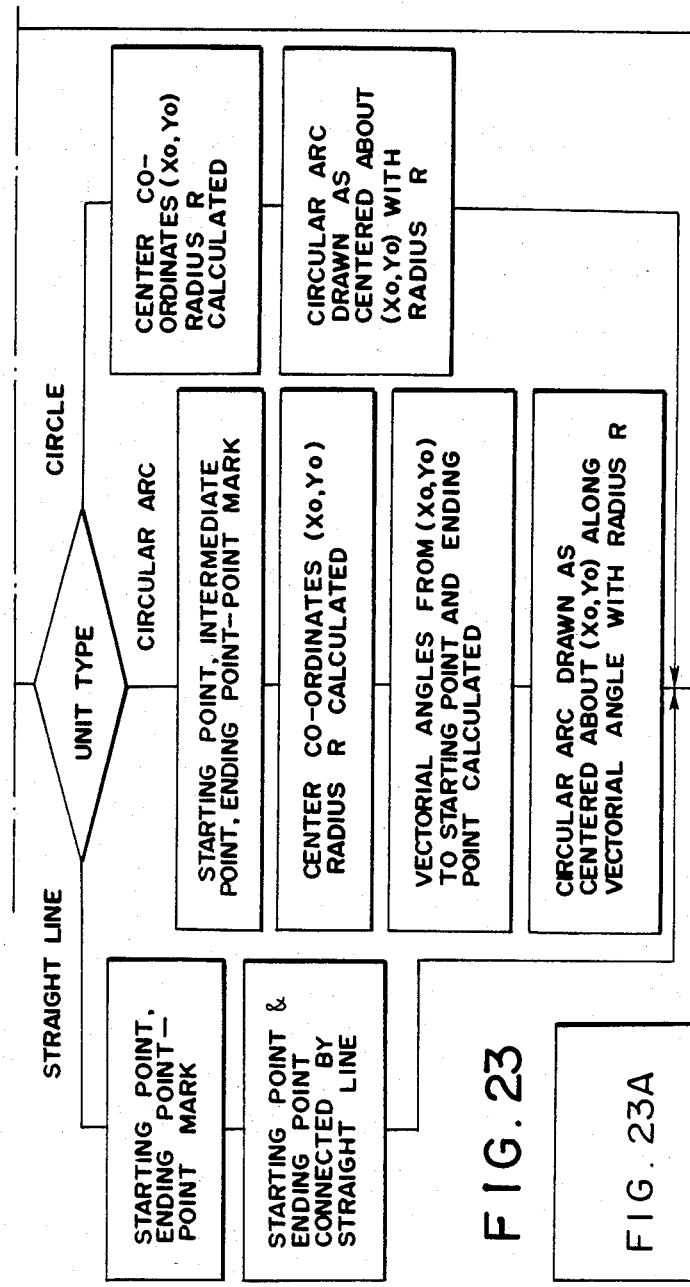

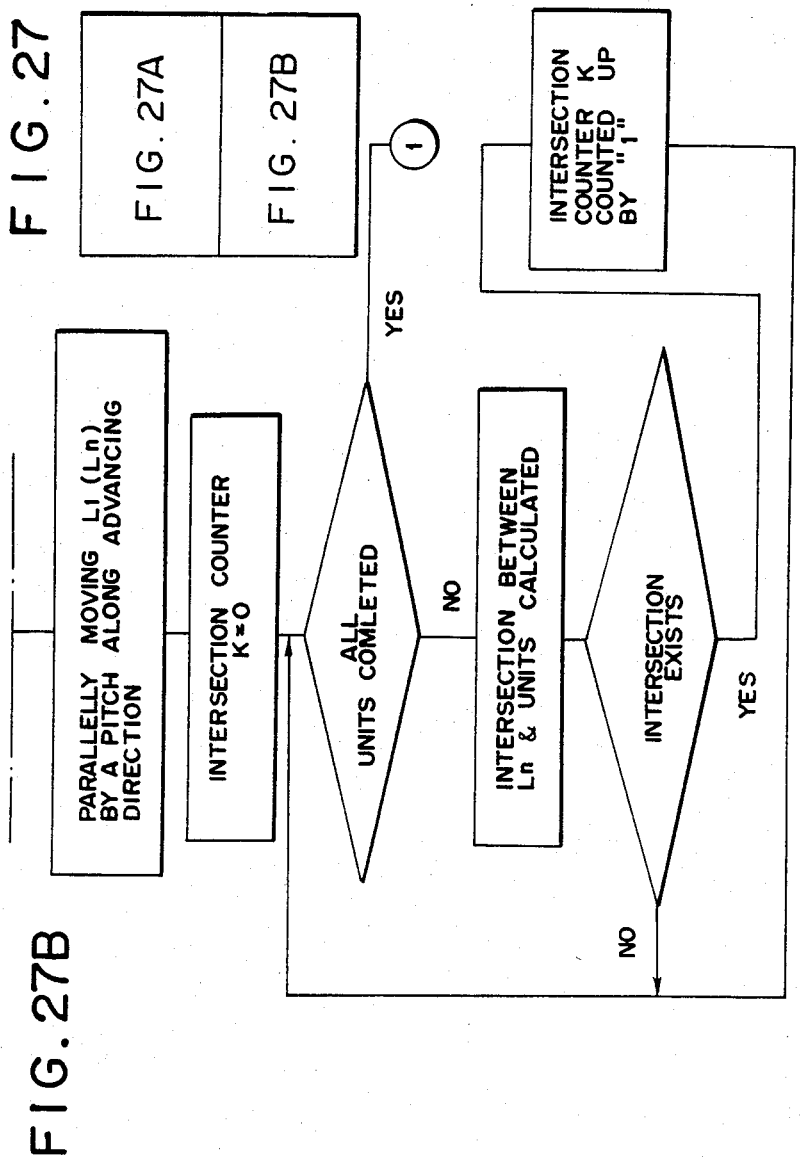

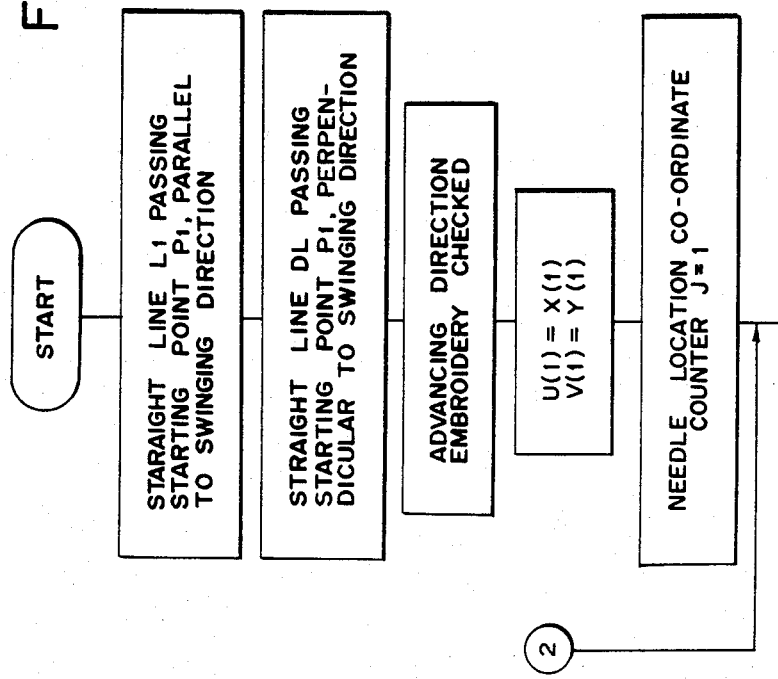

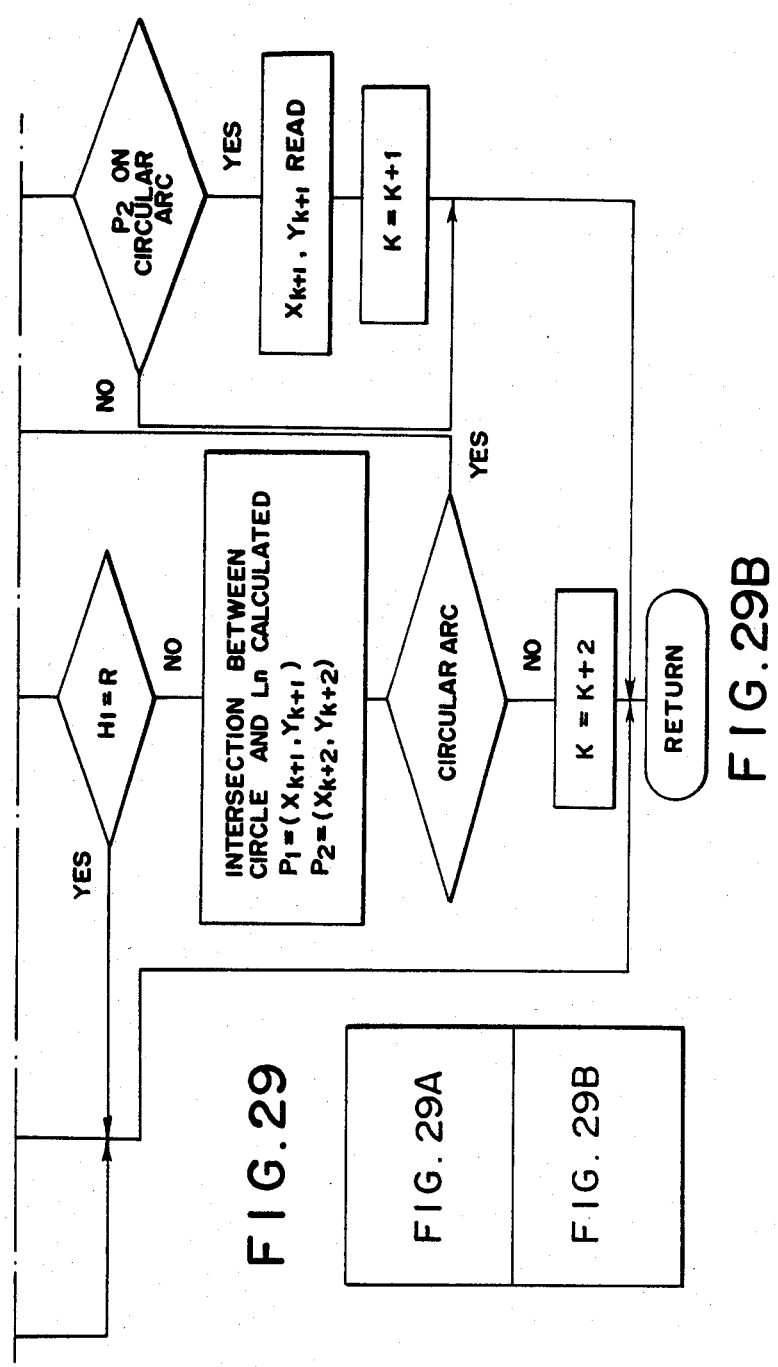

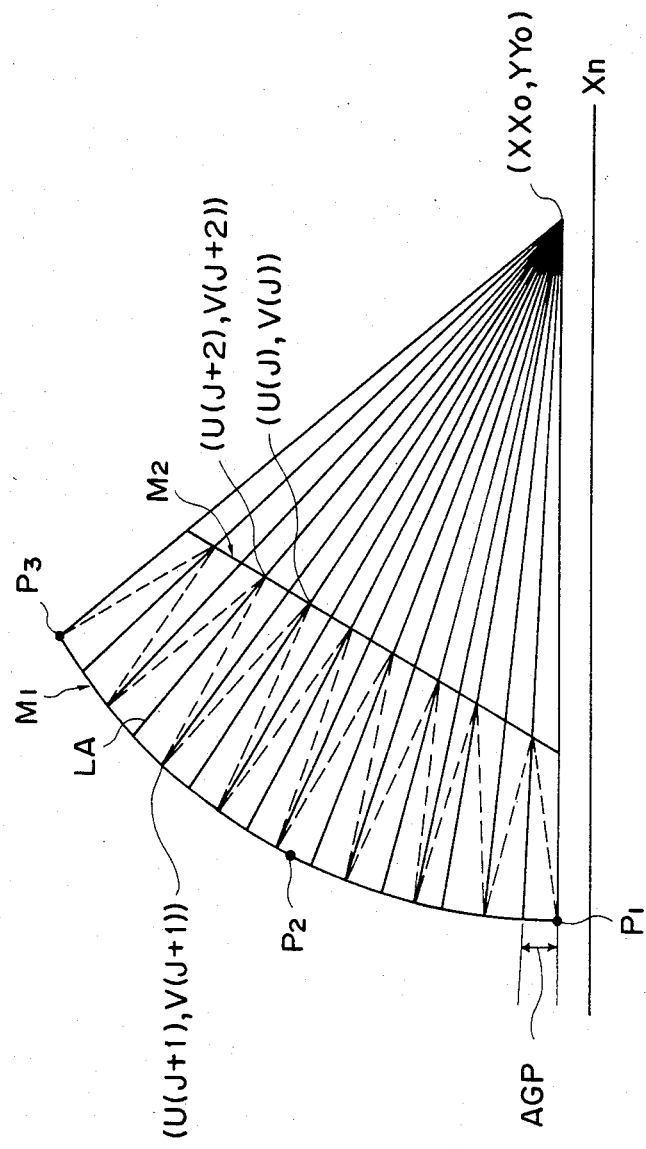
F I G. 37

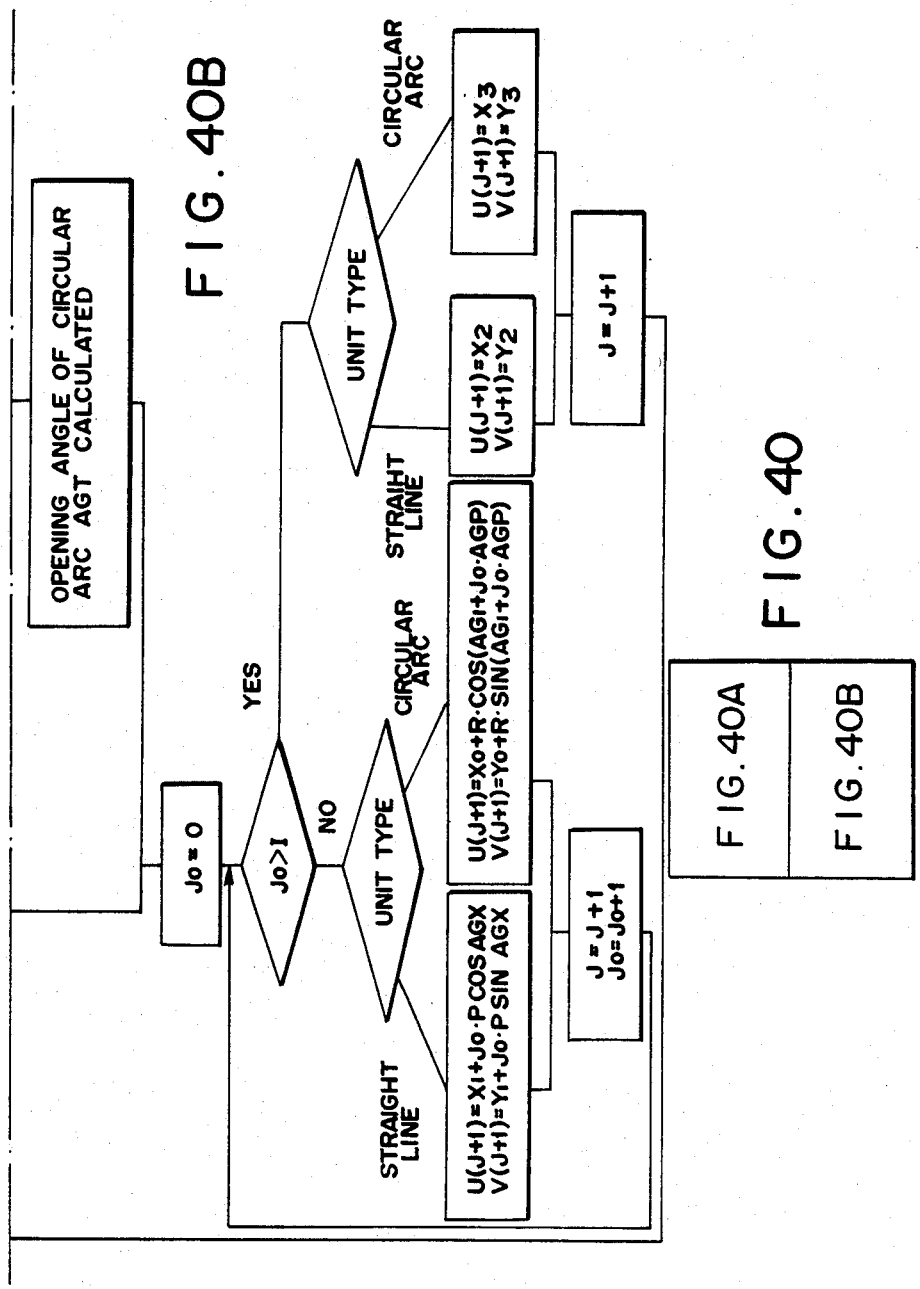

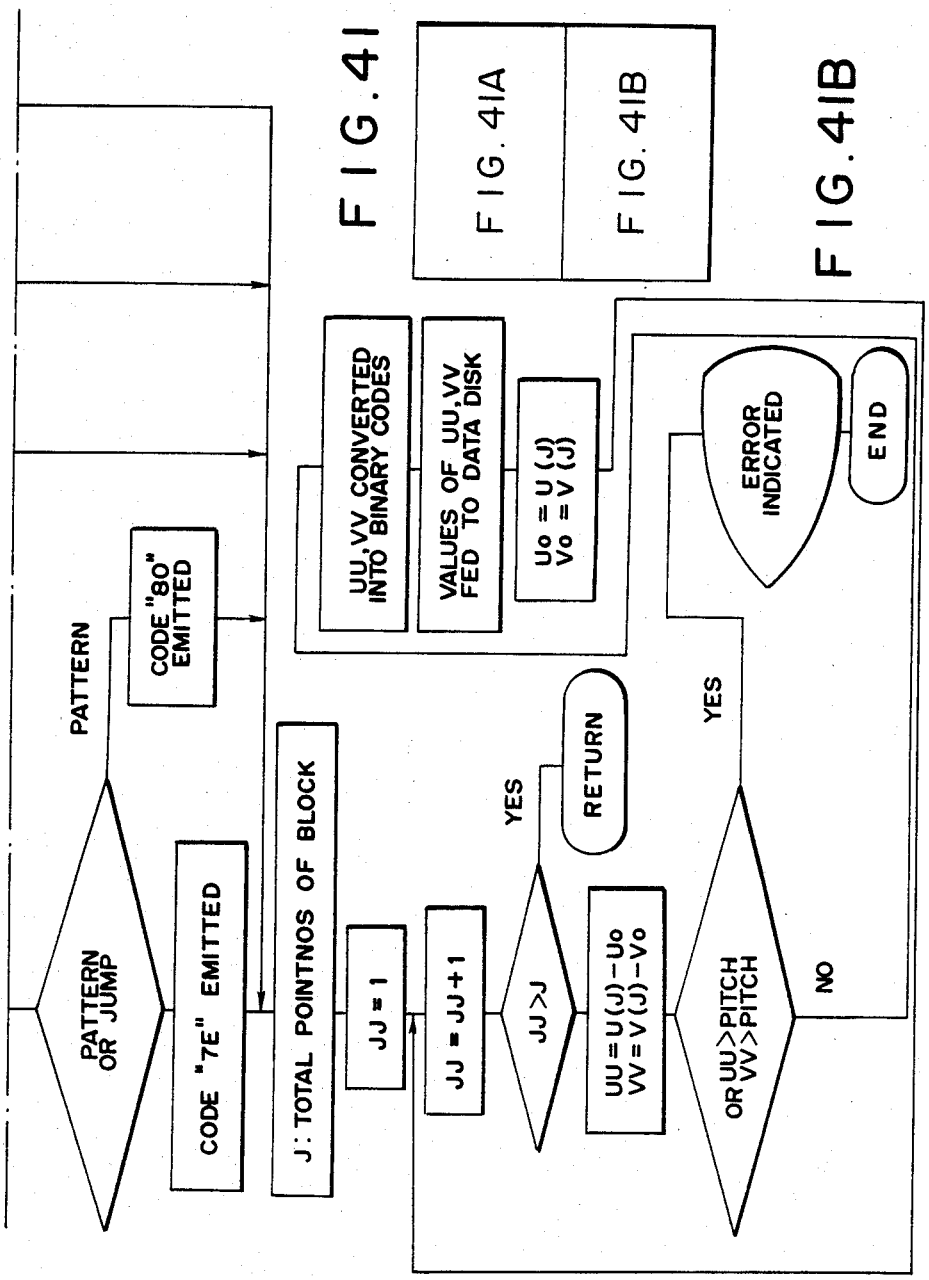

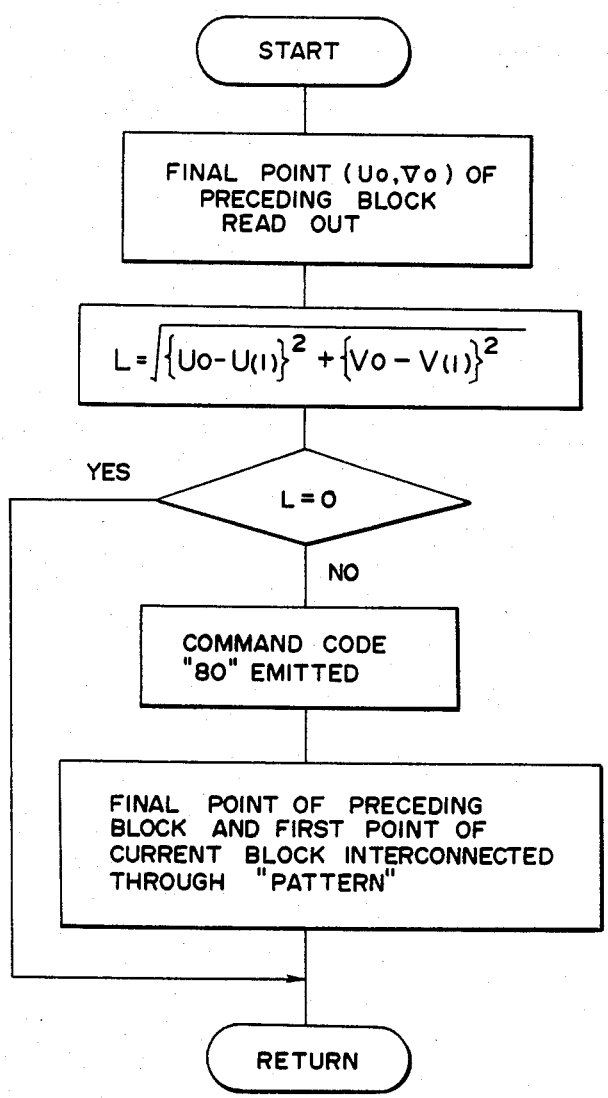

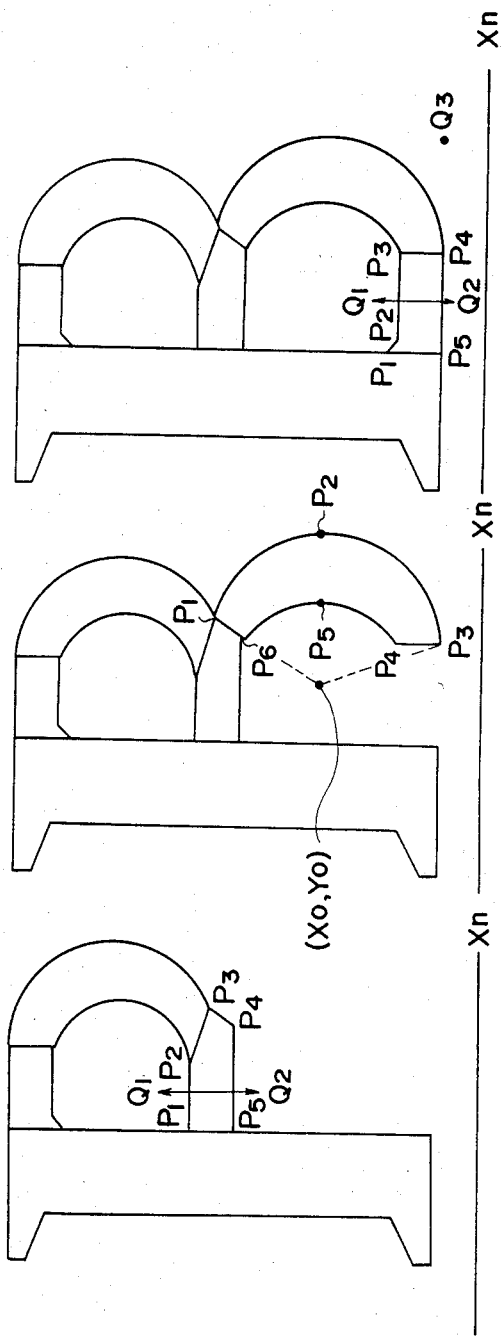

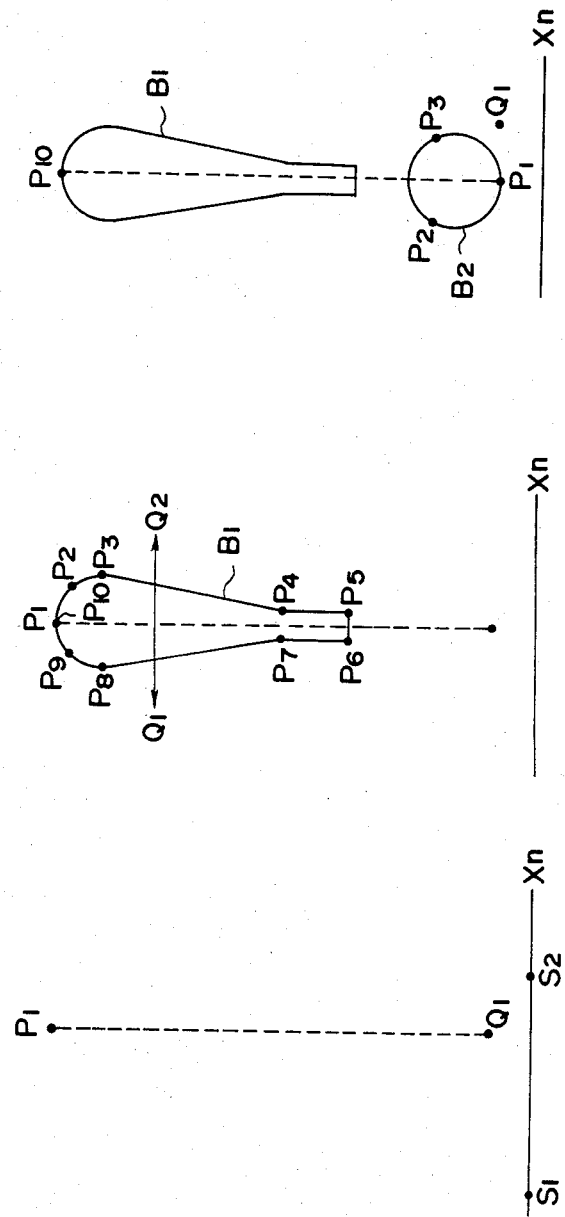

tion points are traced one by one in response to signals of these indications, thereby enabling to form seams. For this reason, there have been presented the disadvantages that the data of seams adds up to a great number to result in a long period of time for determining the needle location points, and moreover, the capacity of memory storage should be large.

SEAM FORMING METHOD AND DEVICE FOR SEWING MACHINE FOR EMBROIDERY

BACKGROUND OF THE INVENTION

This invention relates to a seam forming method and device for a sewing machine for embroidery.

Heretofore, in the conventional sewing machine for embroidery, to perform a predetermined embroidery sewing, needle location points are set at a preset pitch interval along a contour of a figure, the needle location points are respectively indicated as values of X and Y co-ordinates, and the needle location points are traced one by one in response to signals of these indications, thereby enabling to form seams. For this reason, there have been presented the disadvantages that the data of seams adds up to a great number to result in a long period of time for determining the needle location points, and moreover, the capacity of memory storage should be large.

There has been further presented the disadvantage that the direction of seams is limited to a predetermined direction so that a only a simple pattern can be embroidered.

SUMMARY OF THE INVENTION

The present invention has been developed to obviate the above-described disadvantages of the prior art and has as its object the provision of a novel seam forming method and device for a sewing machine for embroidery.

The characteristic feature of the present invention resides in that: a contour of a figure to be embroidered can be set by combination of a straight line defined by a starting point and an ending point with a circular arc or circle defined by three points including a starting point, an ending point and another point intermediate thereof, and a direction of the seams can be set such that the figure is divided into a suitable number of blocks and the direction of the seams is selected either in a desired direction or in radial directions from a center of the circular arc.

The present invention can provide a seam forming method for a sewing machine for embroidery, wherein a contour of a figure to be embroidered is converted into positional co-ordinates and read, data are calculated for alternately setting needle location points on opposing portions of the contour in such a manner that embroidery seams are formed in the contour corresponding to the positional co-ordinates thus read, and the data is read out and a needle is vertically moved to form the embroidery seams, with a taboret being moved in direction X and Y, characterized in that, with a figure including at least one side having a circular arc-shaped contour out of two opposing sides, needle location points are set at regular intervals circumferentially on a circular arc in connection with reading of the circular arc-shaped side, and needle location points on a side opposed to the circular arc-shaped side are set at points of intersections of the side opposed to the circular arc-shaped side with radial lines from the center of the circular arc passing through the midpoints of the needle location points on the circular arc-shaped side.

The present invention can provide a seam forming method for a sewing machine for embroidery wherein, in separately, equidistantly setting needle location points on an inner and an outer circles being coaxial of each other and at positions between the two circles such that the path of the needle location points starts from a point on the outer circle, passes through a midpoint between the outer and inner circles, returns to a point on the outer circle, moves to a point on the inner circle, and returns to a point on the outer circle, thus repeating the same cycle as described above when the ratio of the inner circle to the outer circle in diameter is smaller than a predetermined value and the interval of needle location points of the inner circle is shorter than a predetermined length.

The present invention can provide a seam forming device for a sewing machine for embroidery including a first switch to generate a first signal through manual operation, a second switch to generate a second signal through manual operation, and a tablet provided on a flat surface thereof with preset co-ordinates and a cursor movable on the upper surface of the tablet, wherein there are provided: a reading means for converting co-ordinates of the cursor positioned against the upper surface of the tablet in response to the first or second signal into a data signal and emitting same and an operational means for setting a straight line connecting two points corresponding to data signals in response to successively emitted two first signals, setting a circular arc line passing through three points corresponding to data signals in response to successively emitted three second signals and setting needle location points on the respective lines; and, when the circular arc line and the straight line are to be connected to each other, the two means can form a continuous line at a connecting point between the two lines through manual operation of the first or second switch corresponding to the succeeding line.

The present invention can provide a seam forming device for a sewing machine for embroidery, a tablet provided on a flat surface thereof with preset co-ordinates, a cursor movable on the upper surface of the tablet and a manually controllable portion to generate a reading signal through manual operation, provided with a reading means for converting co-ordinates of the cursor positioned against the upper surface of the tablet and emitting same, and capable of reading a contour of a figure rested on the upper surface of the tablet for embroidery and setting needle location points on the contour such that embroidery seams are formed within the contour, wherein a direction of embroidery seams is set such that, in response to a specifying signal generated through manual operation, the direction of embroidery seams lies along a straight line connecting two points corresponding to two reading signals generated after the specifying signal is generated.

The present invention can provide a seam forming device for a sewing machine for embroidery, having a first switch to generate a reading signal through manual operation, a second switch to generate a completion signal through manual operation, and a tablet provided on a flat surface thereof with preset co-ordinates and a cursor movable on the upper surface of the tablet, provided with a reading means for converting co-ordinates of the cursor positioned against the upper surface of the tablet into a data signal in response to the reading signal and generating same, and capable of setting a circle or circular arc passing through three points in response to the completion signal after reading three different points on the tablet in response to three successive data signals, uniformly dividing the circle or circular arc and setting needle location points on the circle or circular arc.

BRIEF DESCRIPTION OF THE ACCOMPANYING DRAWINGS

Detailed description will hereunder be given of various embodiments of the present invention with reference to the accompanying drawings, in which:

FIG. 3(A) shows the relations between the co-ordinates of tablet and the base line;

FIG. 3(B) shows the division of a pattern into blocks;

Figure 4:
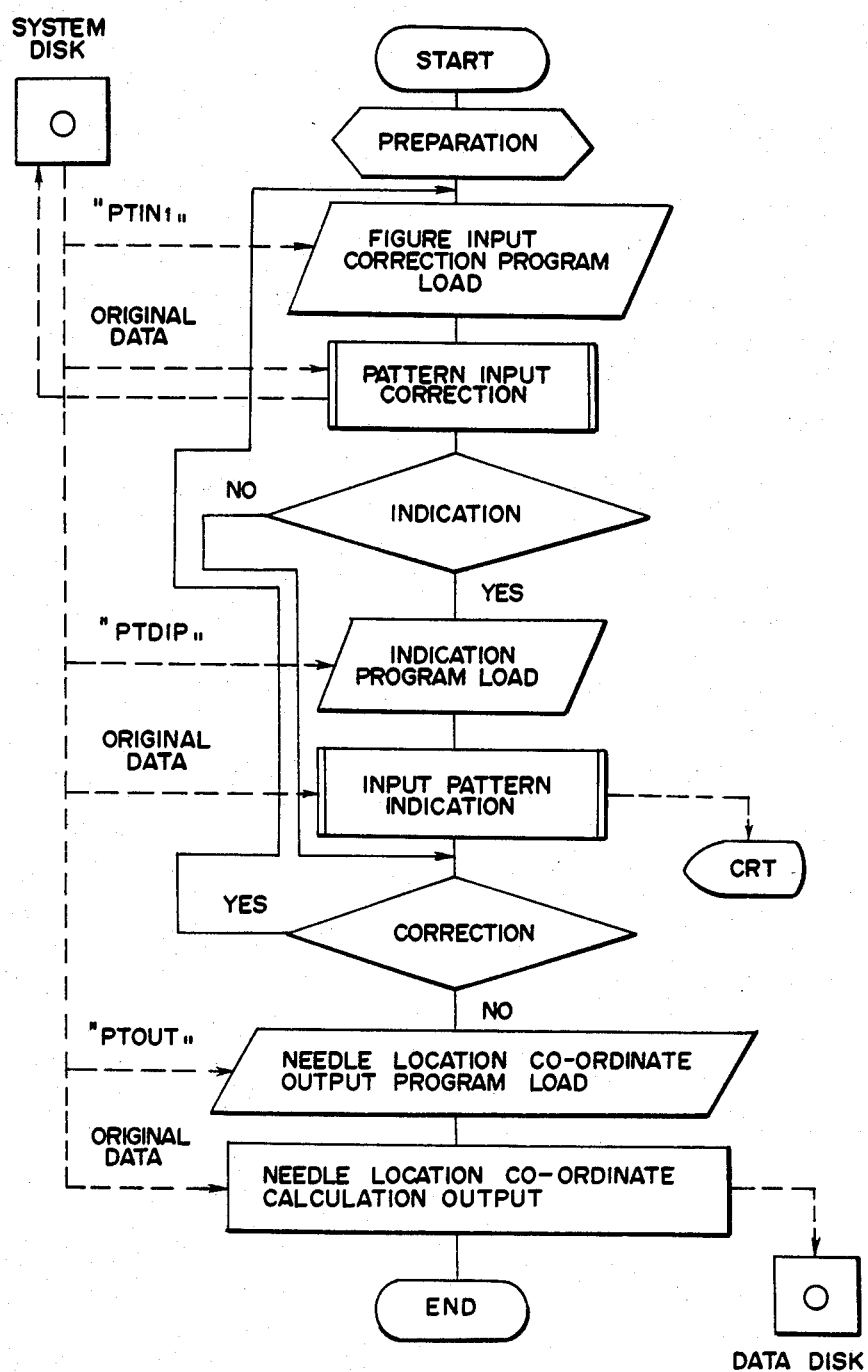
Figure 5:
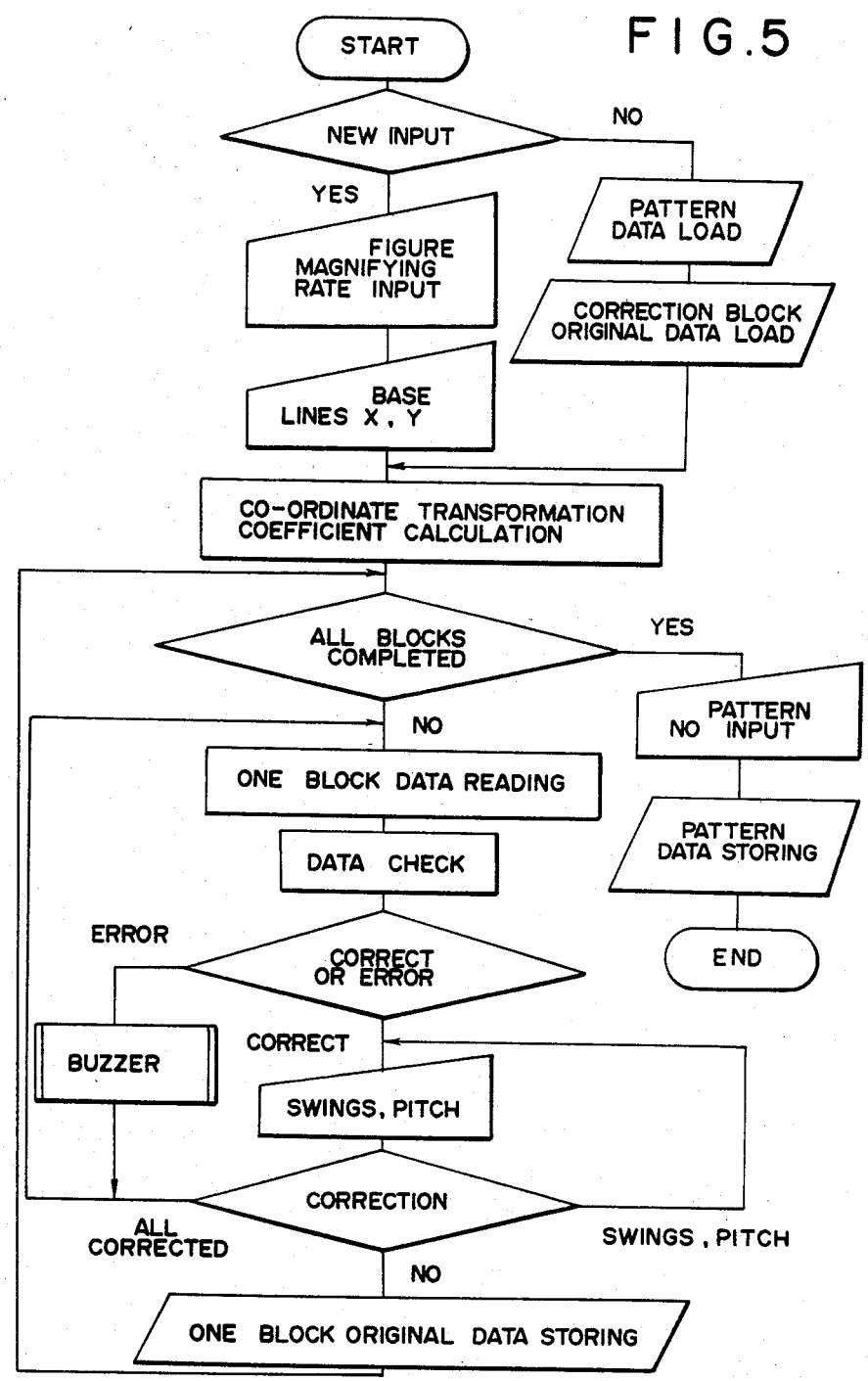
Figure 6:
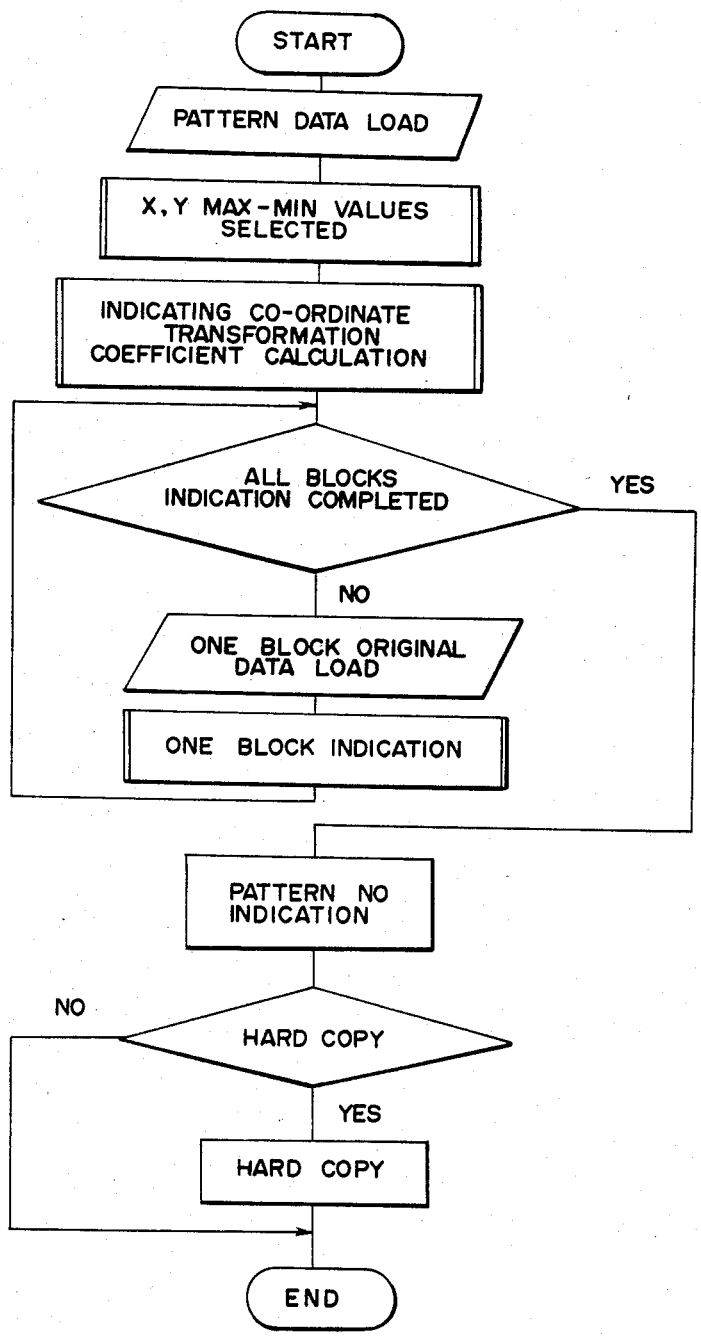
Figure 7:
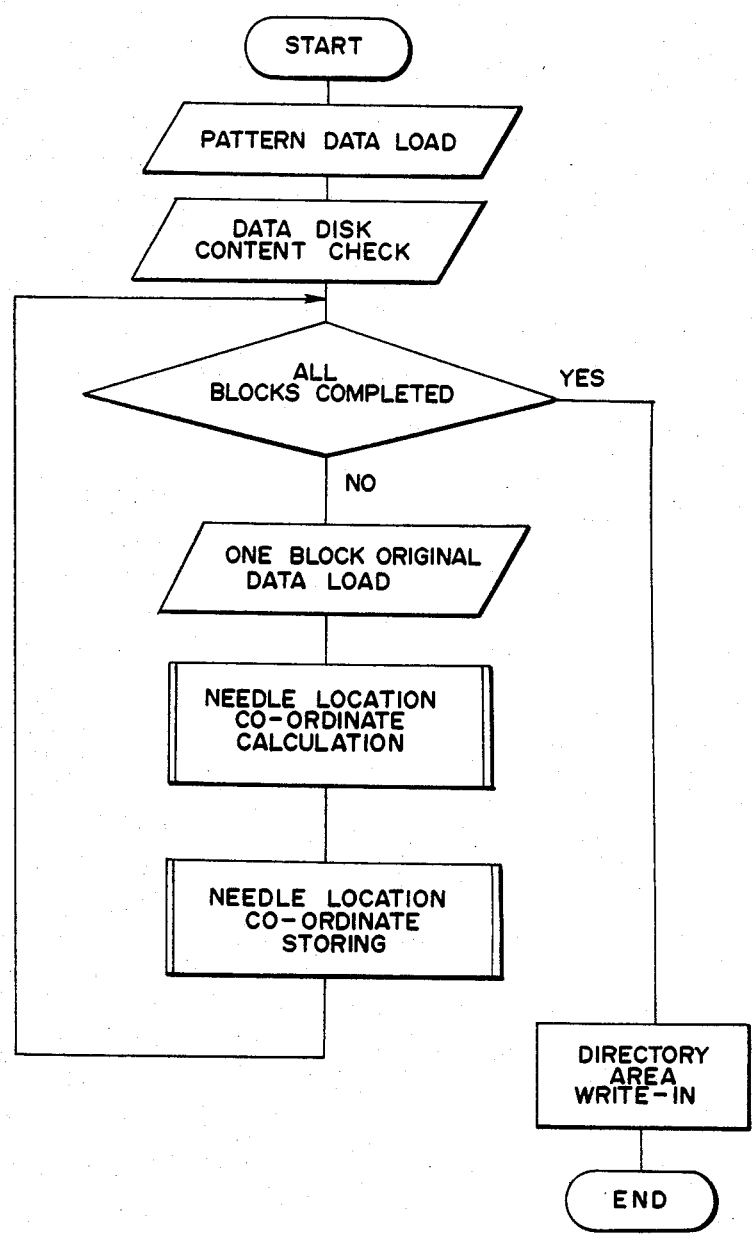
Figure 8:
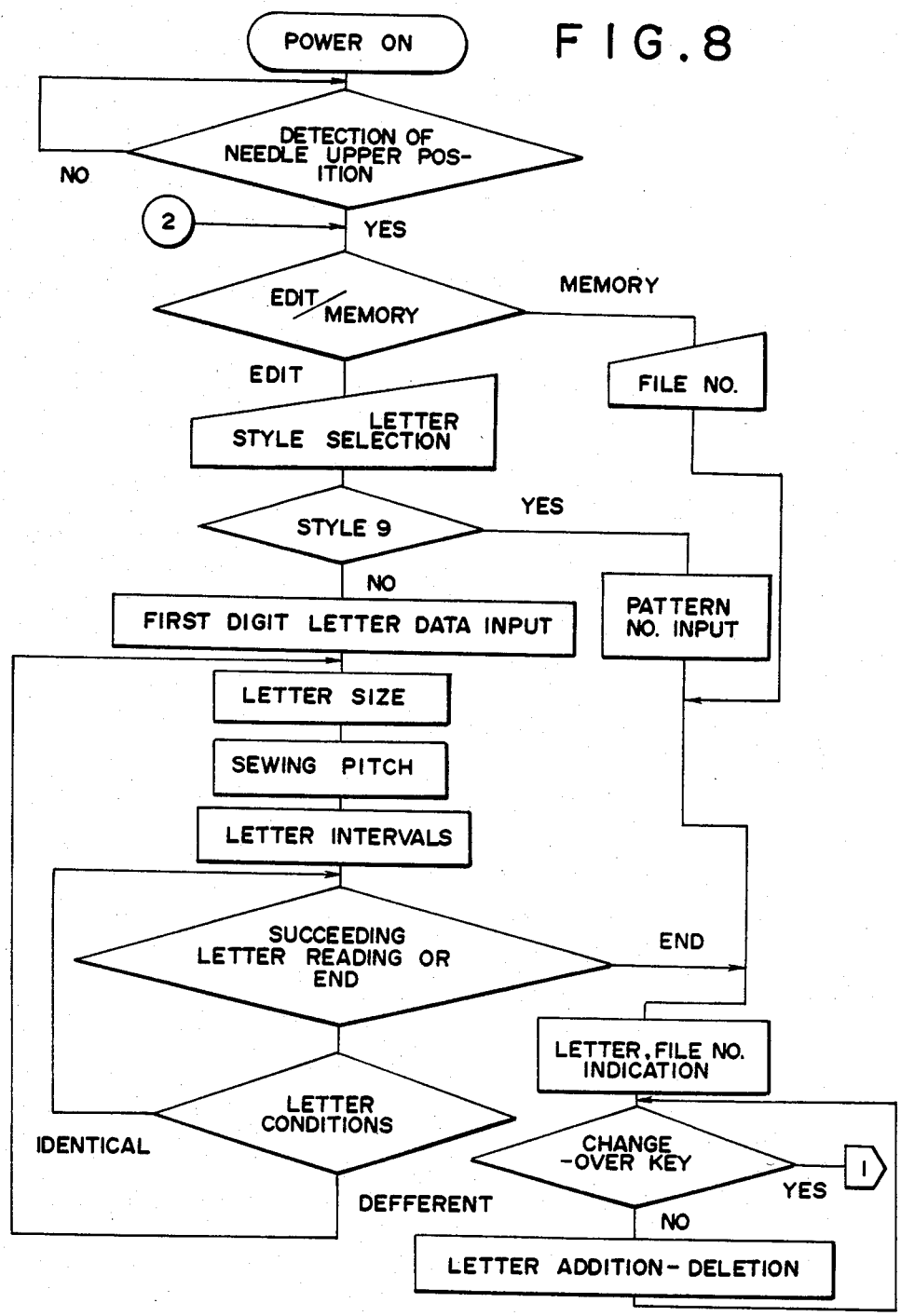
Figure 9:
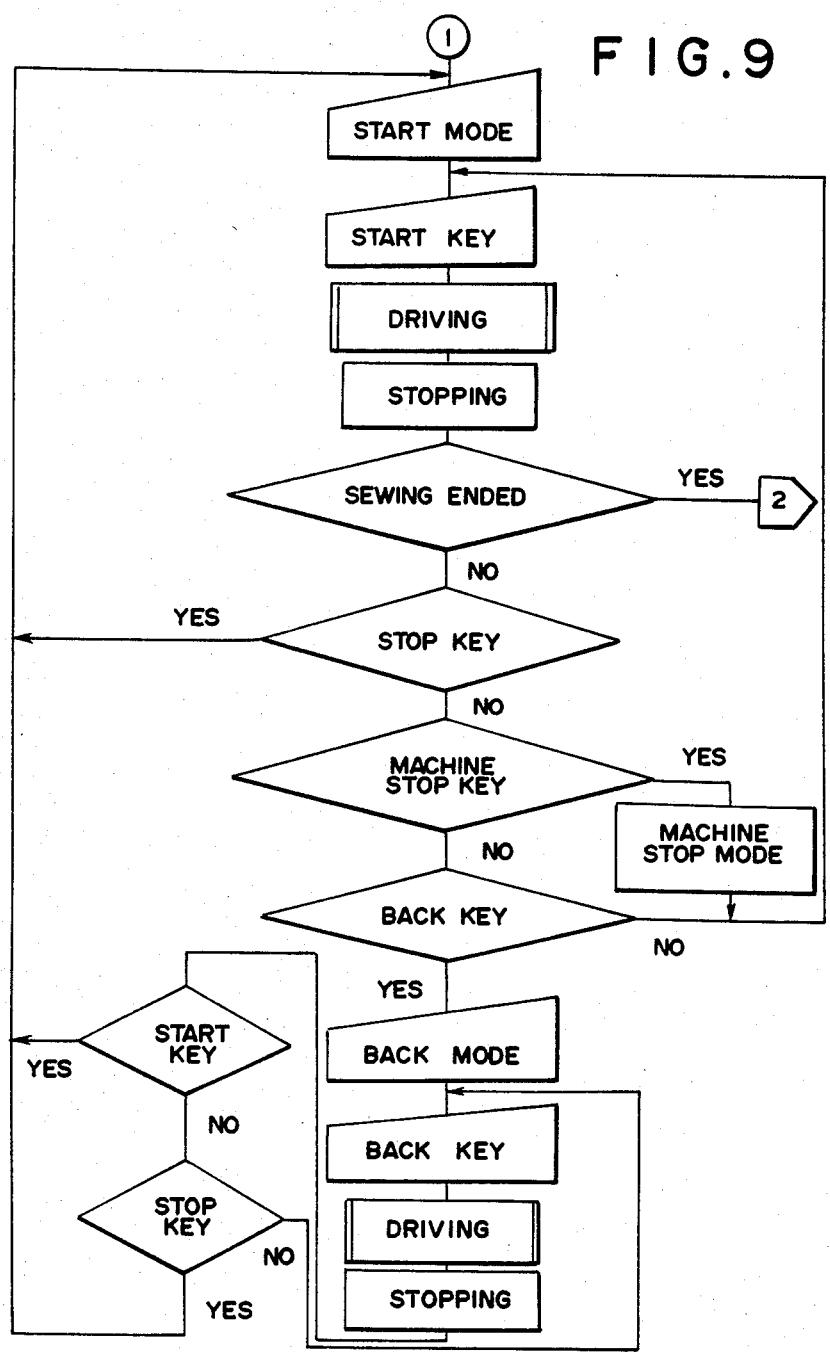
Figure 10:
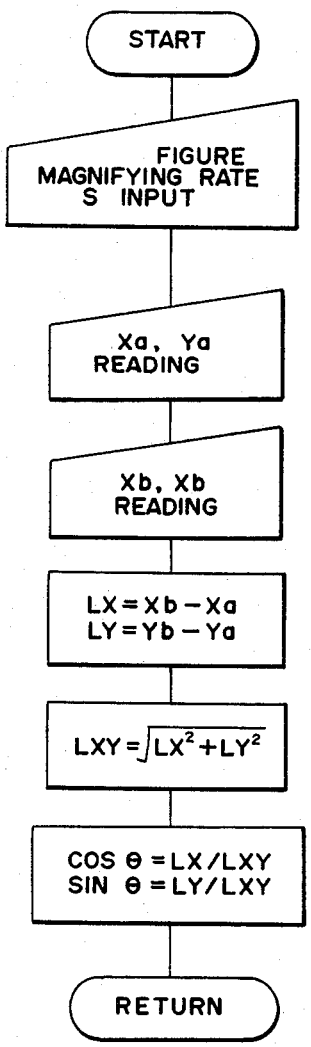
Figure 12A:
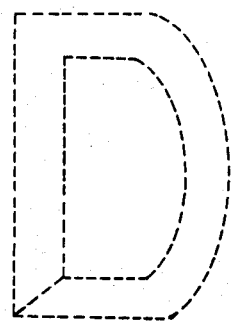
Figure 12B:
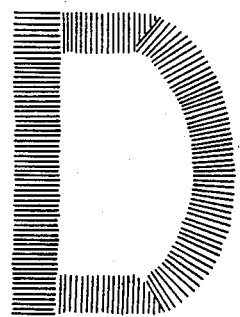
Figure 12C:
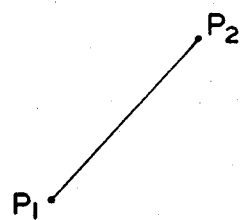
Figure 13A:
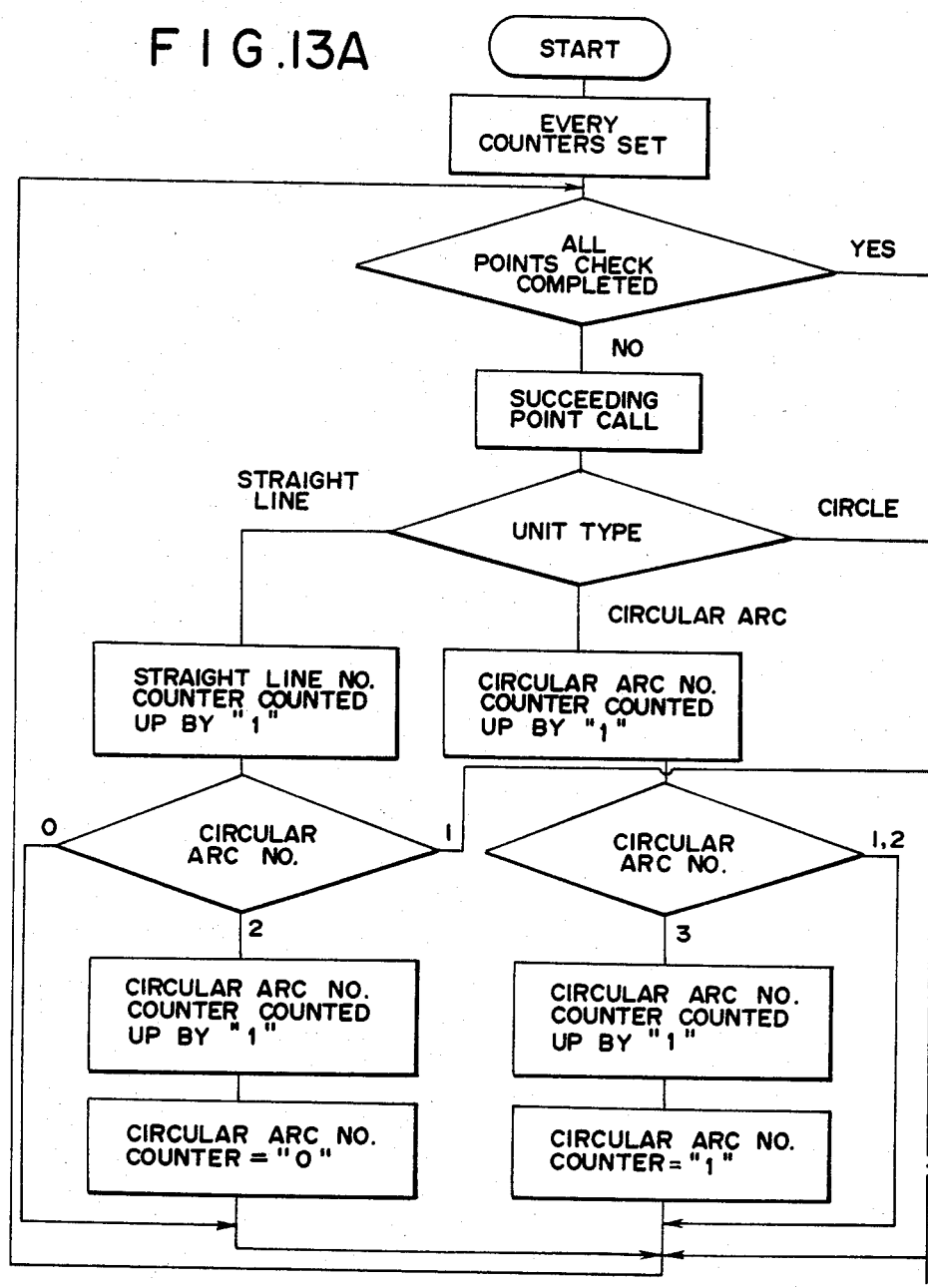
Figure 14:
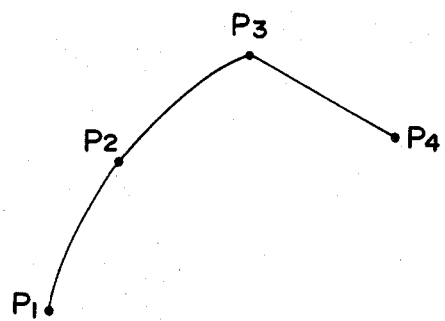
Figure 23A:
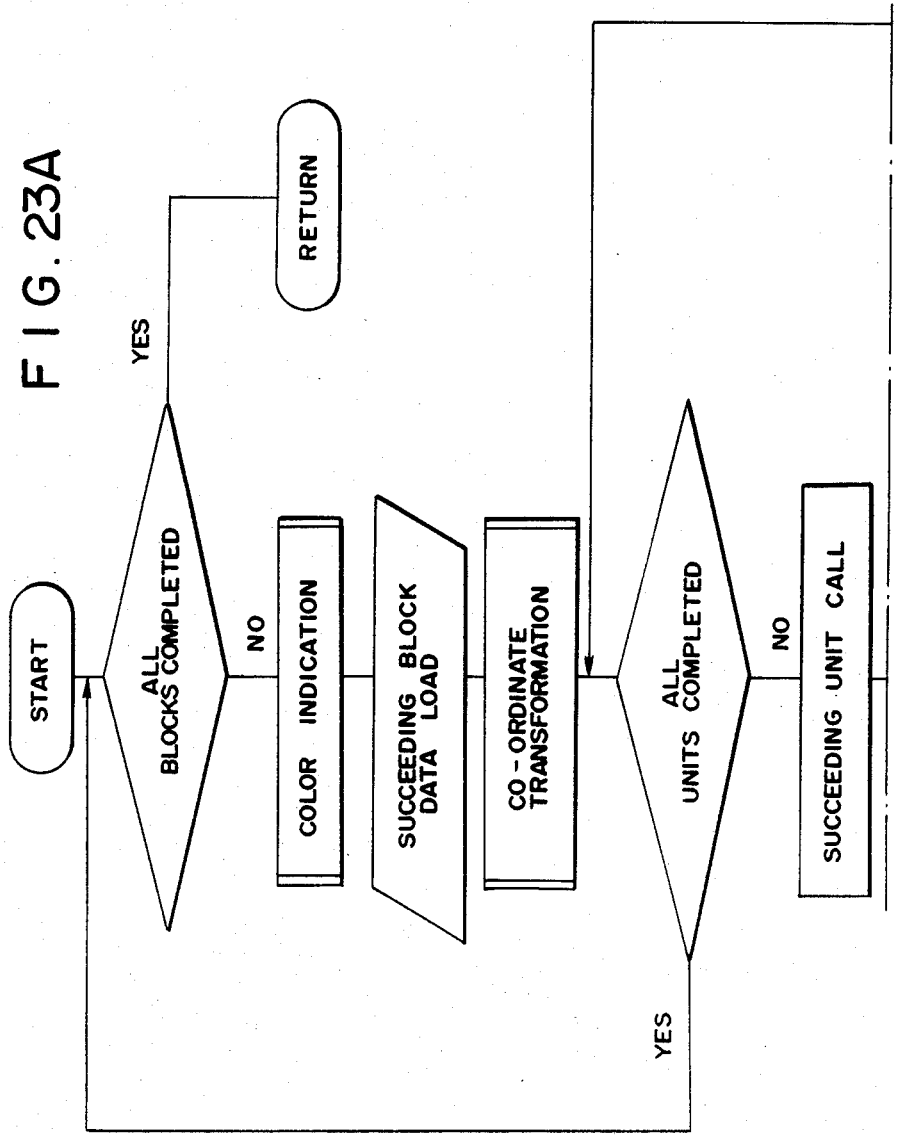
Figure 24:
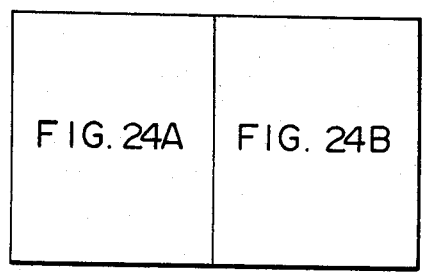
Figure 24B:
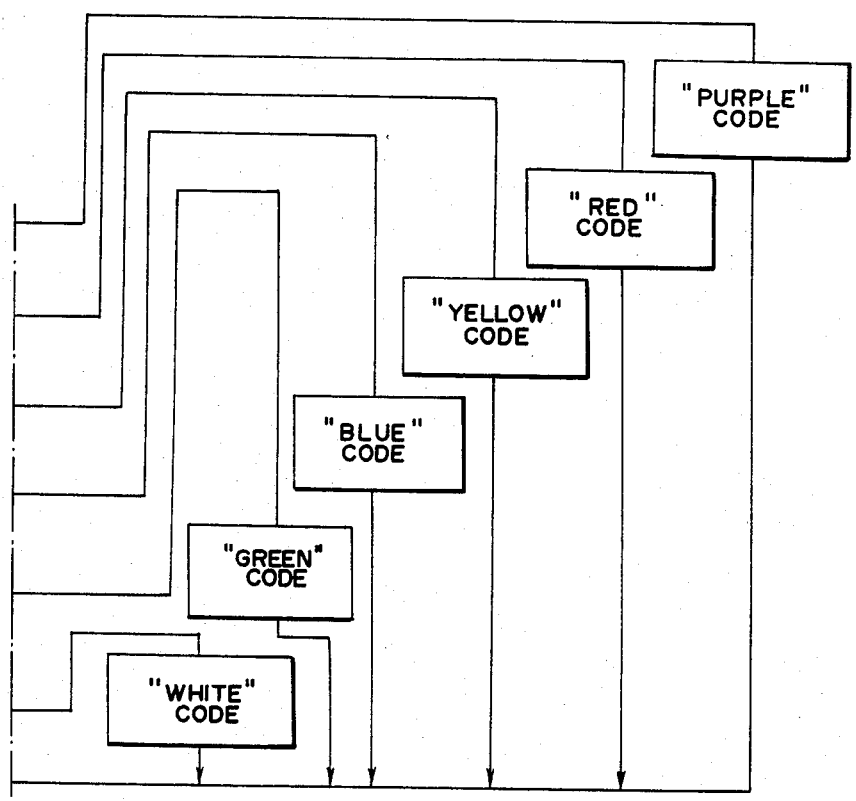
Figure 24A:
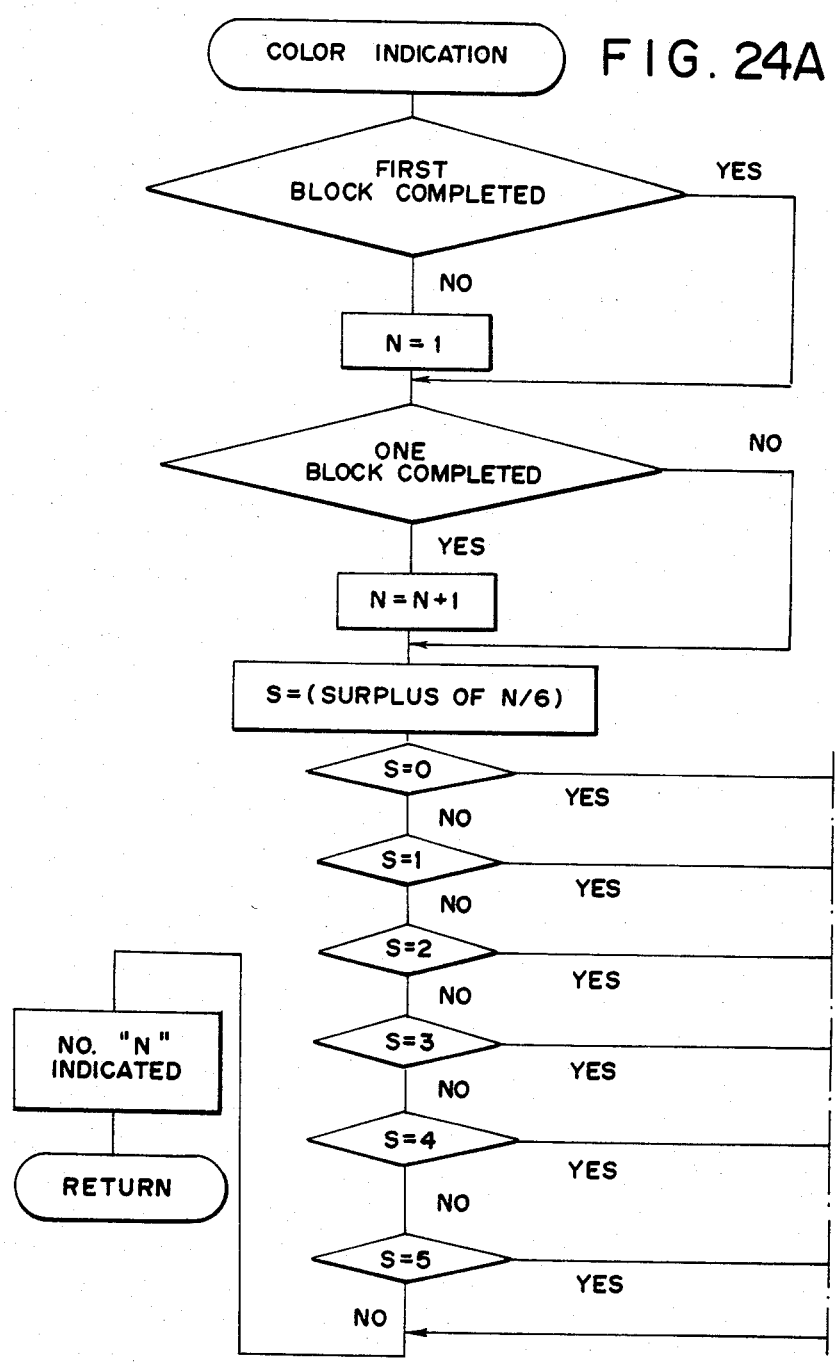
Figure 25:
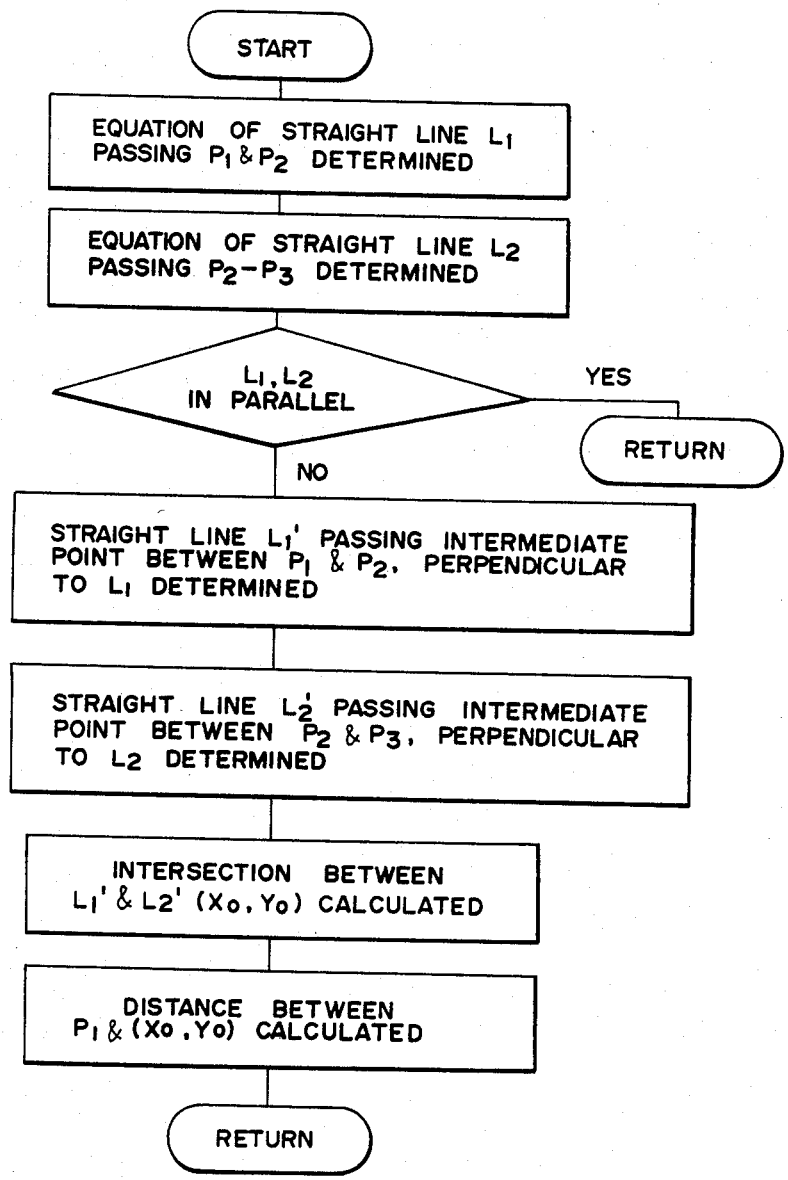
Figure 26:
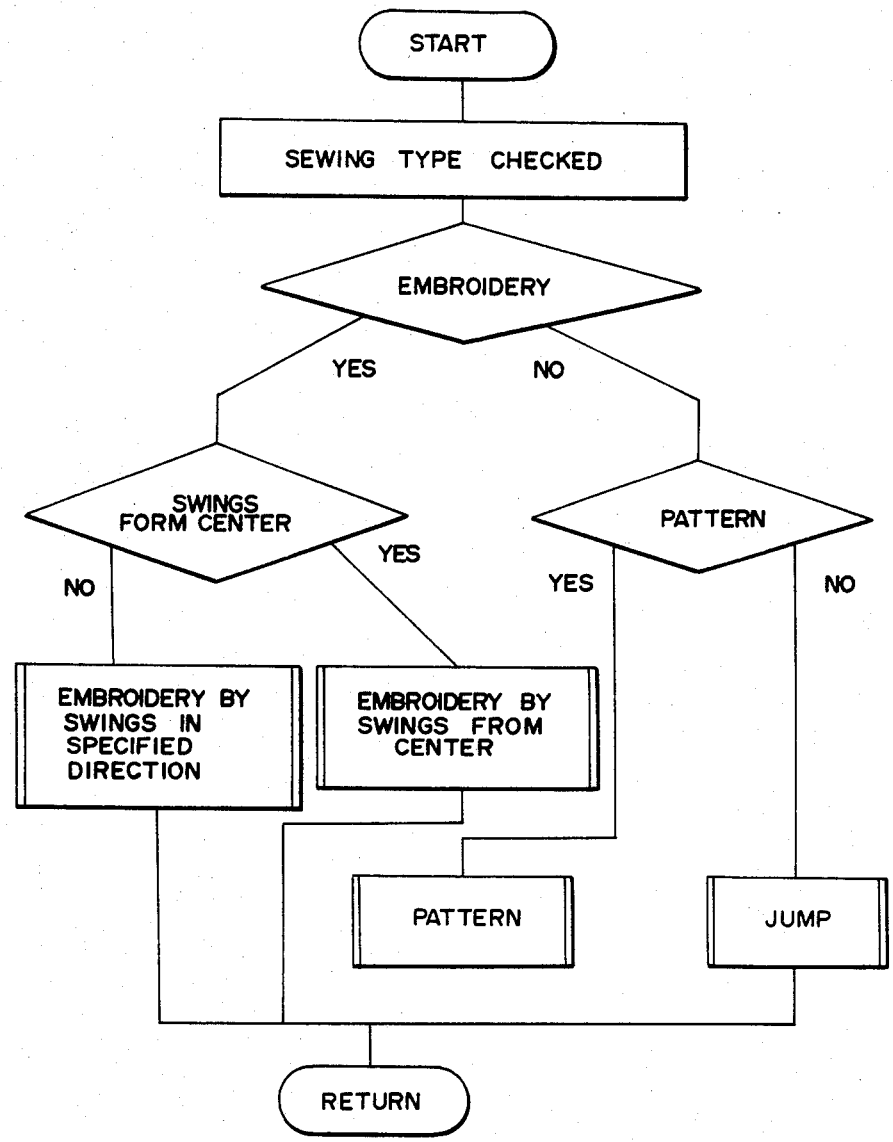
Figure 29A:
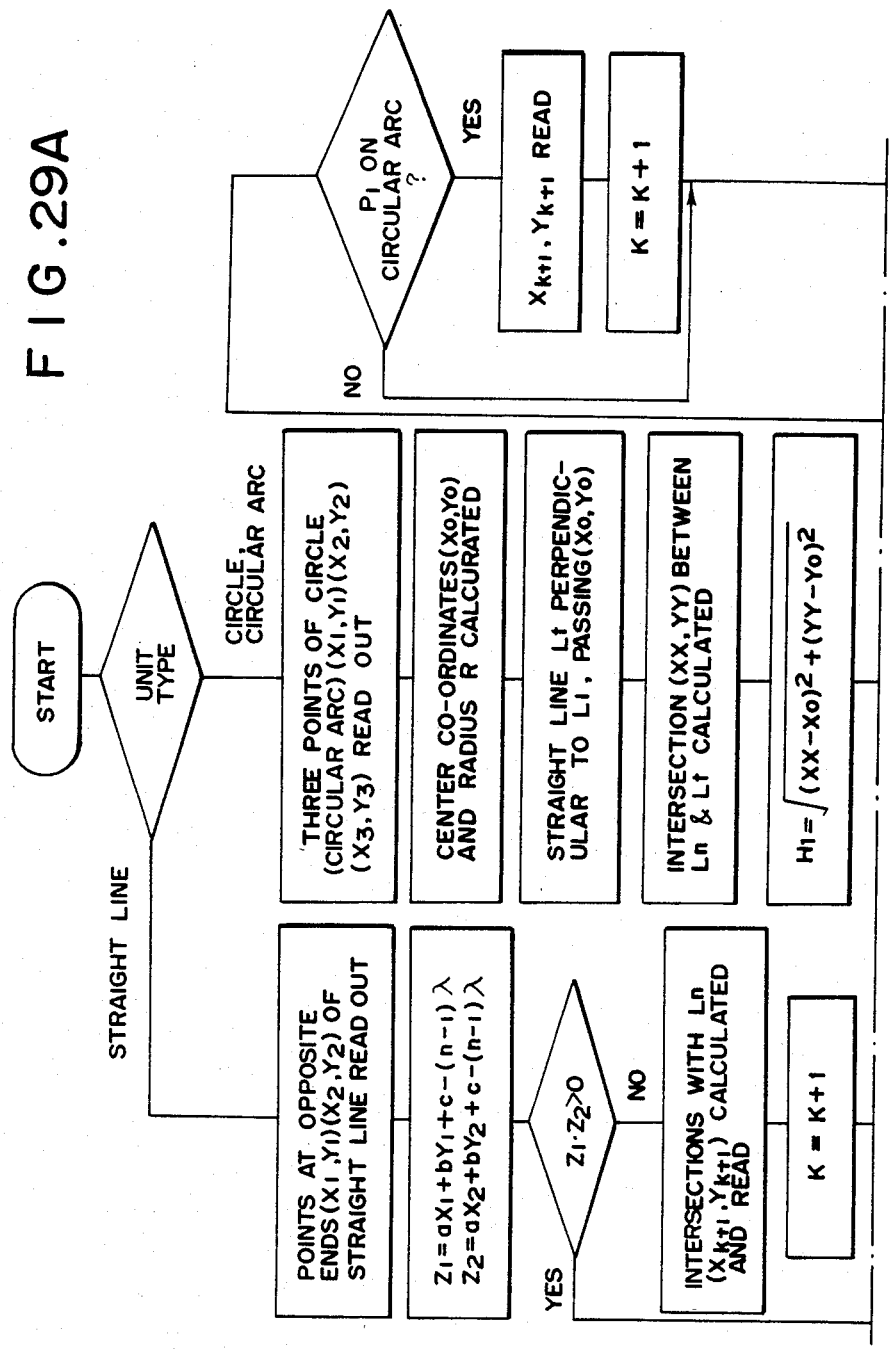
Figure 30:
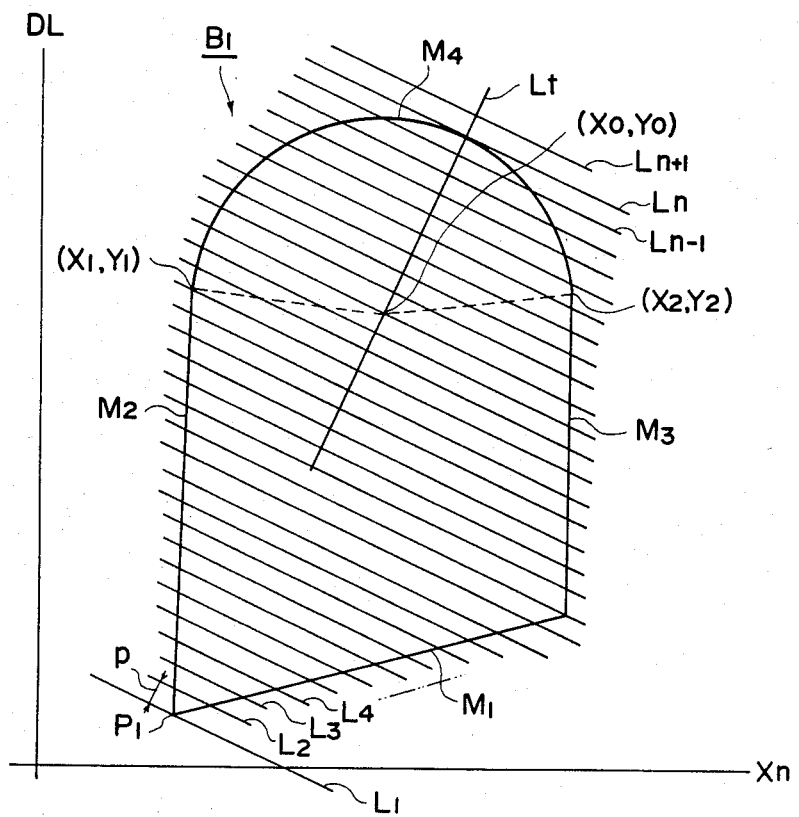
Figure 31A:
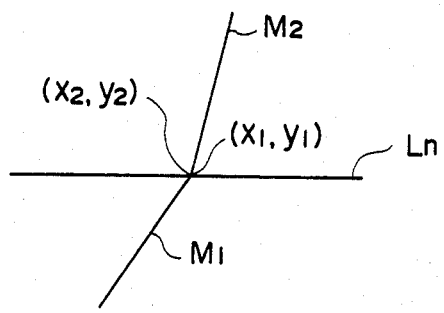
Figure 31B:
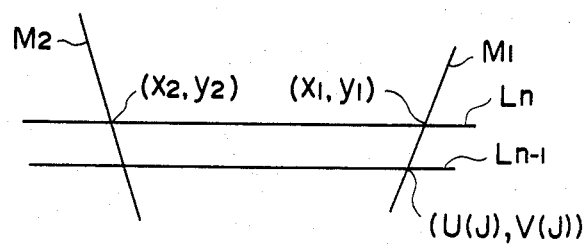
Figure 31C:
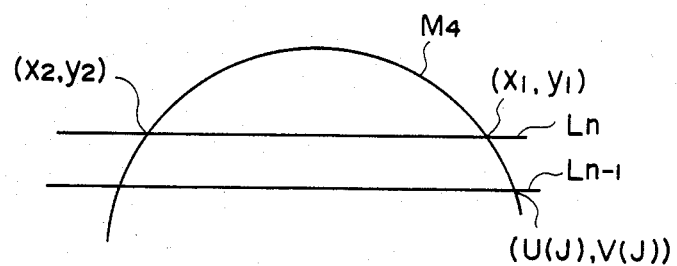
Figure 32:
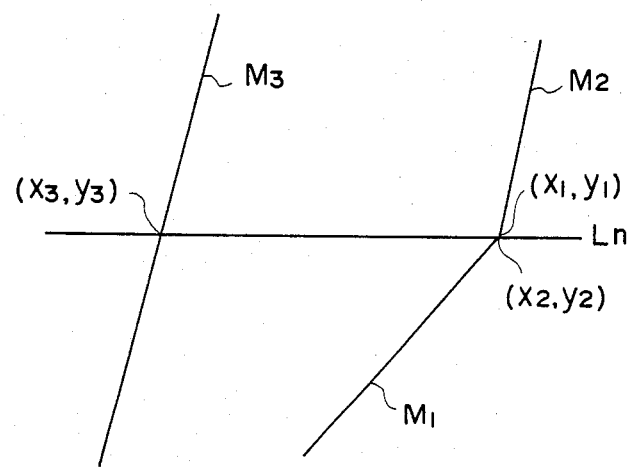
Figure 33:
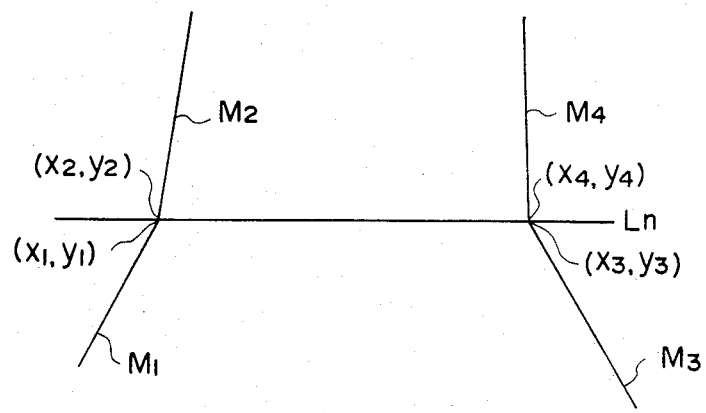
Figure 34:
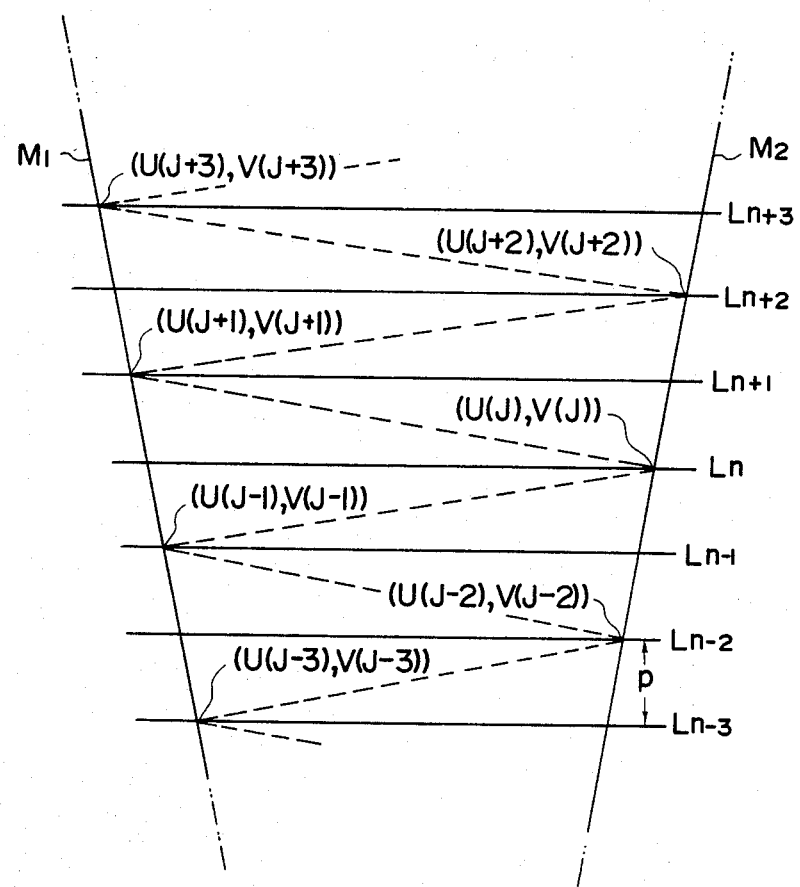
Figure 35:
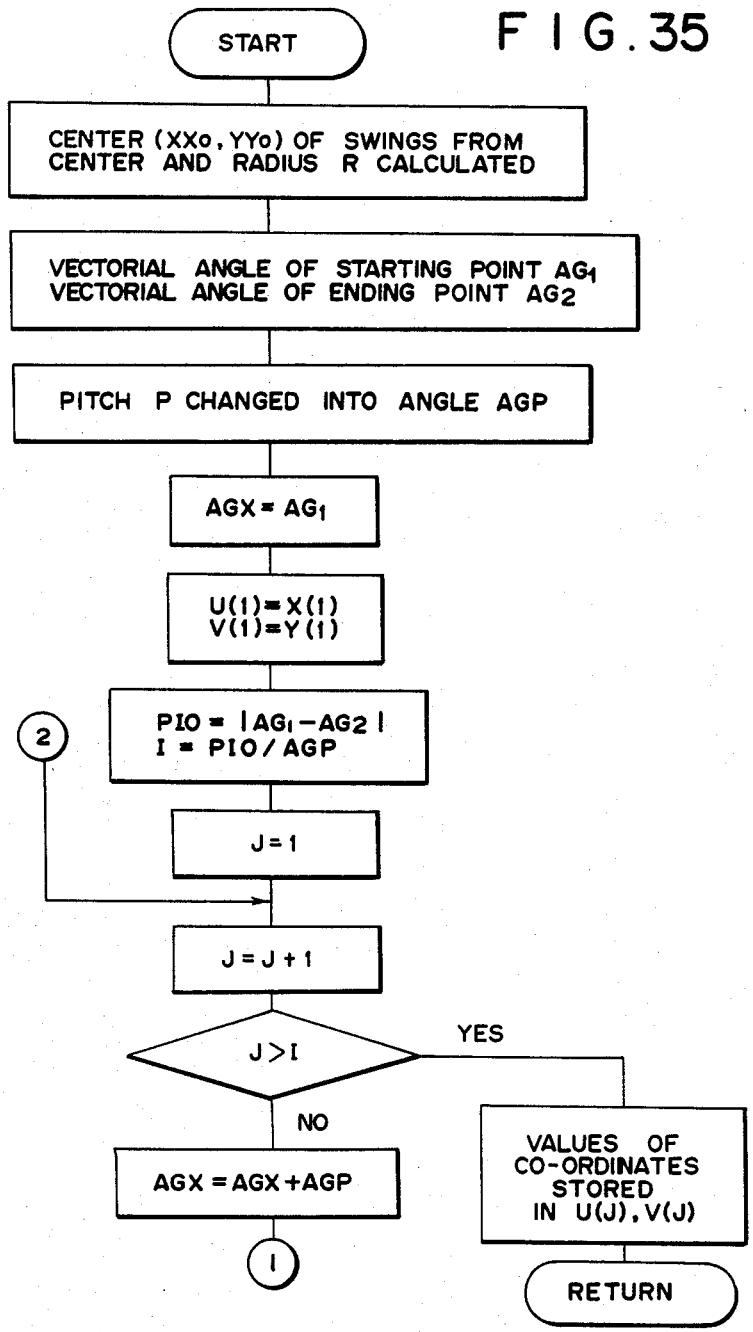
Figure 36:
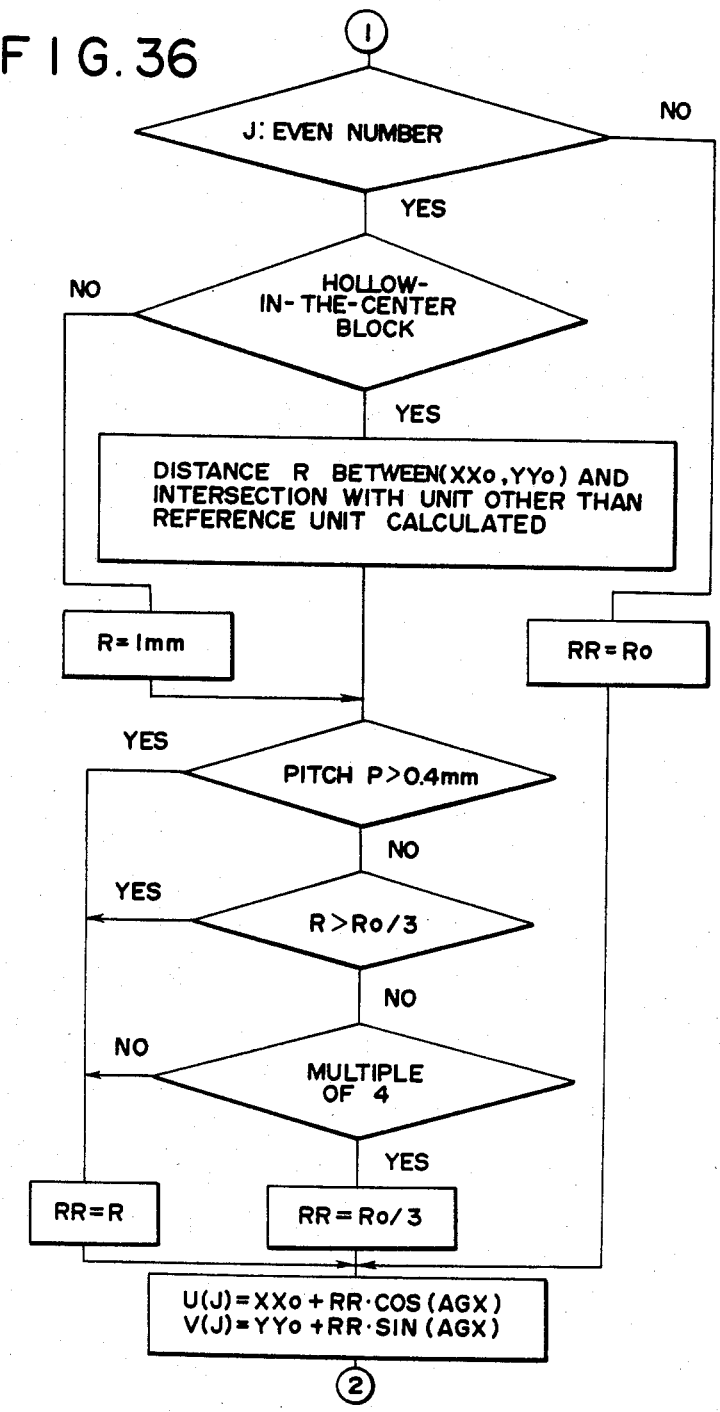
Figure 38:
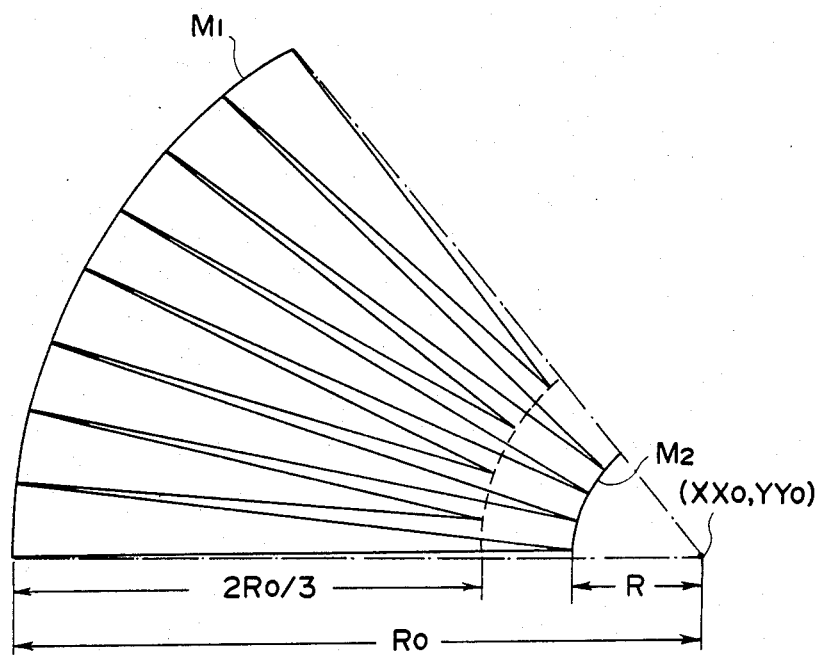
Figure 39:
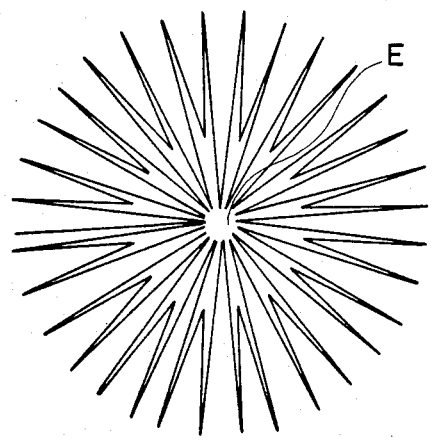
Figure 40A:
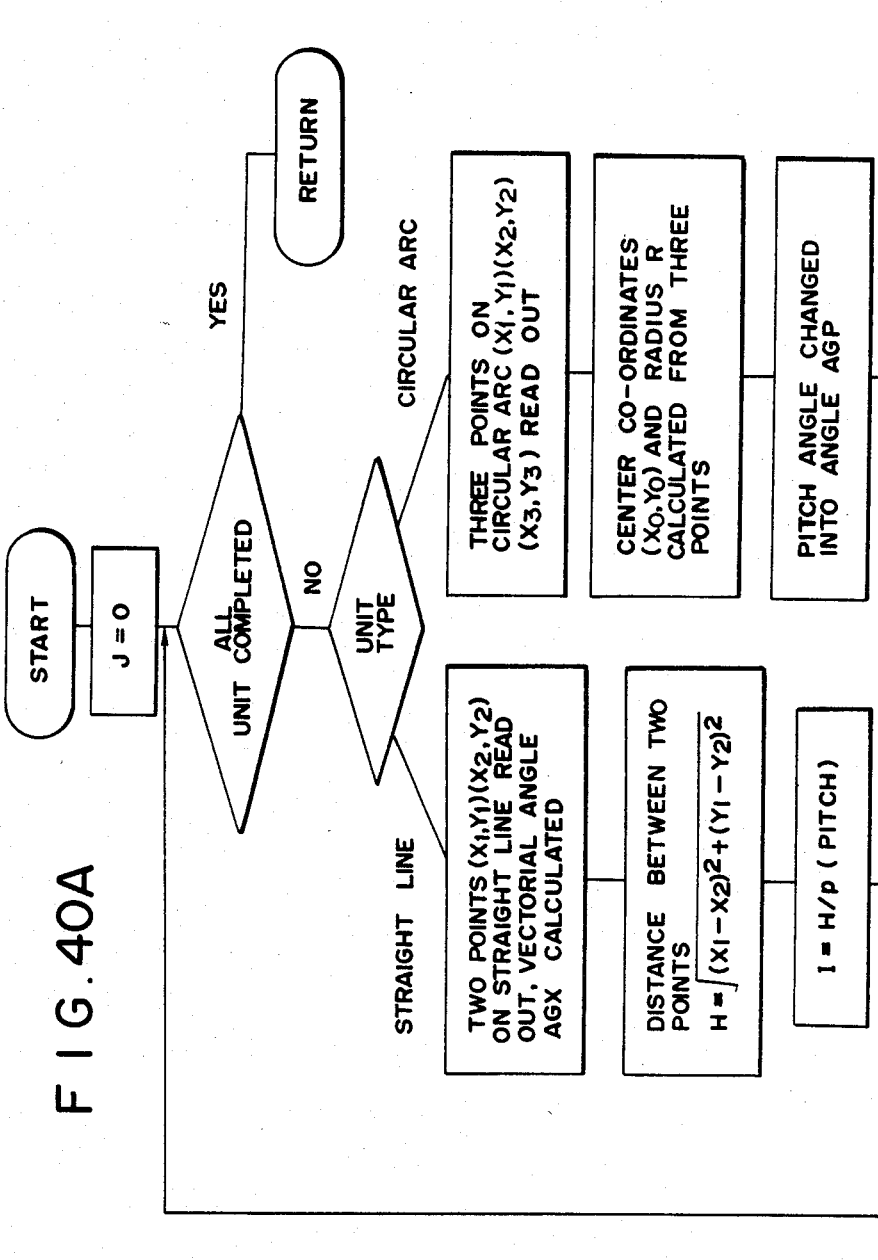
Figure 41A:
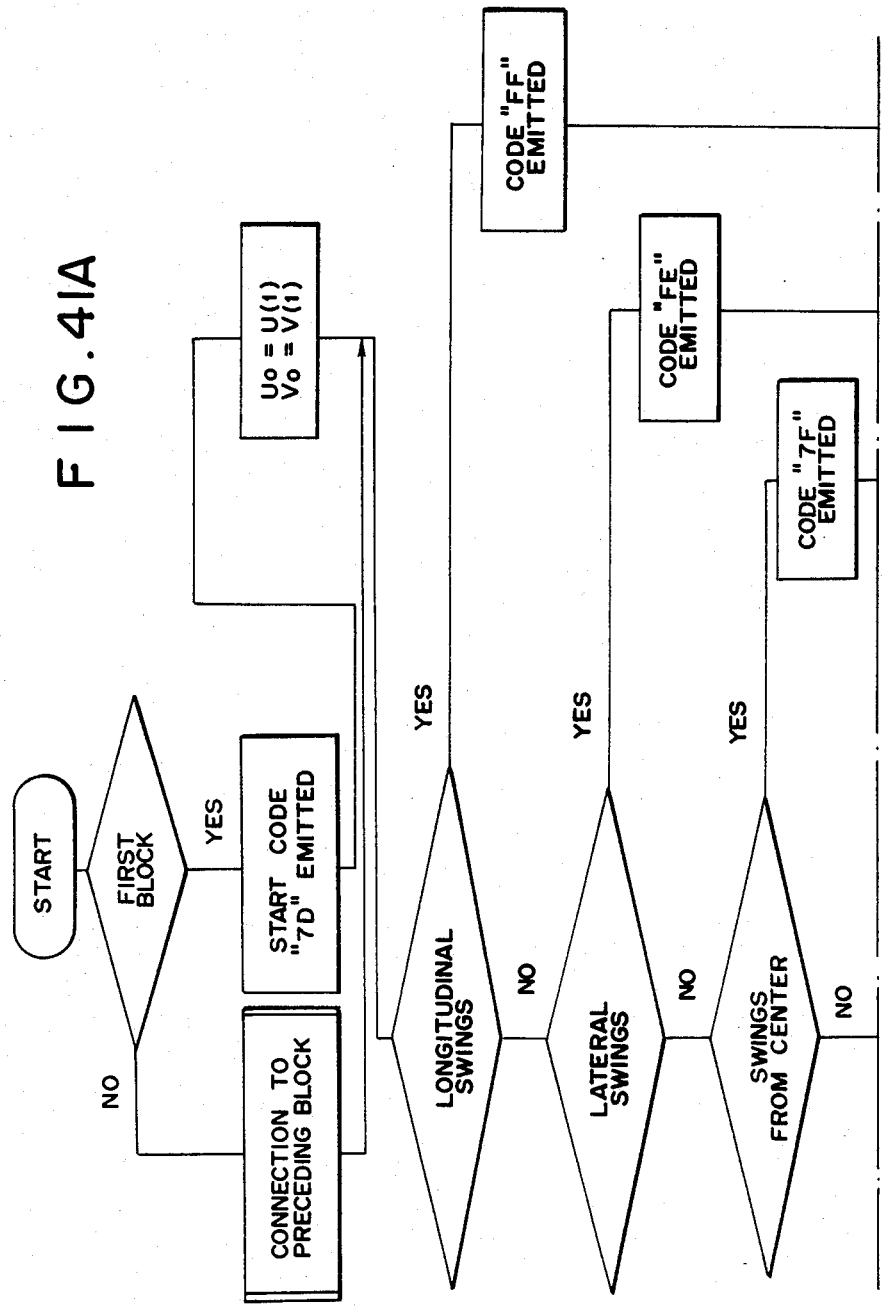
Figure 43:
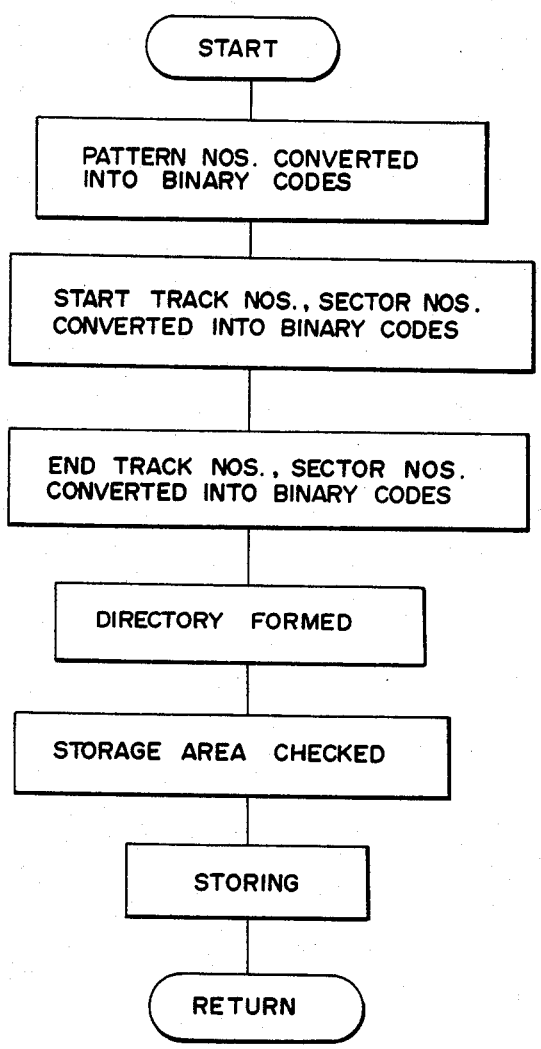

FIG. 4. is a general flow chart showing the data processing in the control means according to the present invention;

FIG. 5 is a flow chart showing the data inputting and checking;

FIG. 6 is a flow chart indicating the data;

FIG. 7 is a flow chart for calculating the needle location points from data and storing the same into the data disk;

FIGS. 8 and 9 are flow charts showing the control of the sewing machine;

FIG. 10 is a flow chart for determining the inputting the figure magnifying rate (scale) and determining the base line;

FIG. 11 is a flow chart for reading the data in one block;

FIG. 12A shows the pattern sewing;

FIG. 12B shows the embroidery sewing;

FIG. 12C shows the jump;

FIGS. 13A, 13B, 13 is a flow chart for checking the data in one block;

FIGS. 14 through 19 show the specific examples of data checking;

FIG. 20A, 20B, 20 is a flow chart for giving component data to the units;

FIGS. 21A, 21B, 21, and 22 are flow charts for calculating the maximum co-ordinates and the minimum co-ordinates of one pattern;

FIGS. 23A, 23B, 23 is a flow chart for calculating the indicating co-ordinates on the CRT;

FIGS. 24A, 24B, 24 is a flow chart for giving color indication codes different from one another to the blocks;

FIG. 25 is a flow chart for calculating the co-ordinates of the center and the radius of a circle or a circular arc;

FIG. 26 is a flow chart for specifying the type of swings;

FIGS. 27A, 27B, 27, 28A, 28B, 28 are flow charts for calculating the needle location points in specifying the swinging direction;

FIGS. 29A, 29B, 29 is a flow chart for calculating the co-ordinates of the points of intersection between the units and the straight line $L_n$;

FIG. 30 is a view in explanation of the specification of the needle location points in specifying the swinging direction;

FIGS. 31A through 31C show the positional relationships when the points of intersection between the straight line $L_n$ and the respective units become "2";

FIG. 32 is a view in explanation of the case where the points of intersection between the straight line $L_n$ and the respective units become "3";

FIG. 33 is a view in explanation of the case where the points of intersection between the stragiht line $L_n$ and the respective units become "4";

FIG. 34 is a view in explanation of the conditions where the needle location co-ordinates are selected from the points of intersection of the units;

FIGS. 35 and 36 are flow charts for calculating the needle location points in the swings from center;

FIG. 37 is a view in explanation of the specification of the needle location points in the swings from center;

FIG. 38 shows the seams to prevent jamming in the swings from center;

FIG. 39 shows the swings from center in a circle;

FIGS. 40A, 40B, 40 is a flow chart for calculating the pattern sewing seams;

FIGS. 41A, 41B, 41, and 42 are flow charts for storing the needle location co-ordinates into the data disk;

FIG. 43 is a flow chart for adding a directory area to the data;

FIGS. 44 through 49 show the conditions where the pattern "B" is read;

FIGS. 50 through 52 show the conditions where the pattern "!" is read; and

Figure 53:
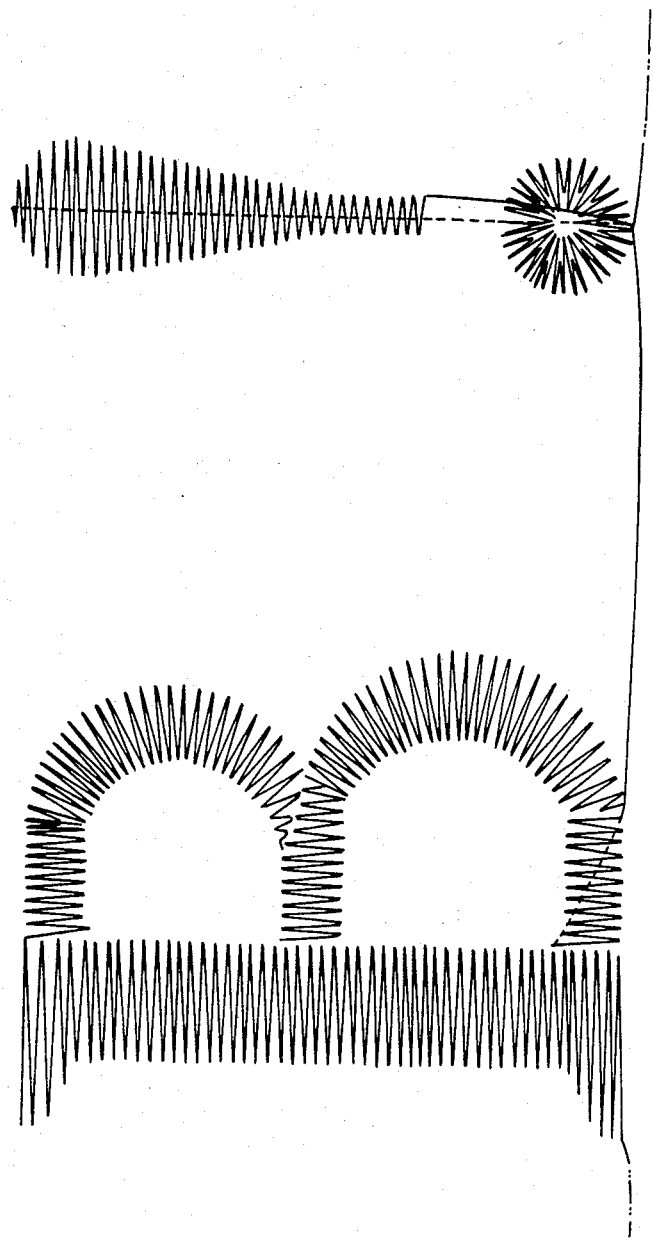

FIG. 53 shows the embroidery sewing seams of the patterns "B" and "!".

DESCRIPTION OF THE PREFERRED EMBOIDMENTS

Description will hereunder be given of an embodiment with reference to the drawings. Designated at 1 is a base having a flat upper surface 1a. A sewing machine 2 is rested on the upper surface 1a in such a manner that a bed sufface 2a of the sewing machine 2 is flush with the upper surface 1a. The sewing machine 2 is interlocked with a driving motor 3 disposed on the same axial line as the spindle, not shown, and vertically moves a needle 4. Denoted at 5 is a support frame, which detachably supports therein a taboret 6 holding cloth, is interlocked with a driving means, not shown, such as a stepping motor disposed inwardly of the base 1, and is made movable on the upper surface 1a in a composite direction between a direction X in the axial line of the spindle of the sewing machine and a direction Y crossing the aforesaid axial line. Indicated at 7 is a floppy reading means, which, having an insert portion 7a capable of detachably receiving a floppy disk, not shown, reads data stored in the floppy disk. Designated at 8 is a keyboard, which includes: an operating key group for reading out floppy data read in by the floppy reading means and writing into the floppy data the data of sewing operations of the sewing machine 2, the control on the movement of the support frame 5 and the like; and an indicating portion 10 to indicate in letters the data inputted or ouputted in connection with the key operations of the operating key group 9.

Figure 1:
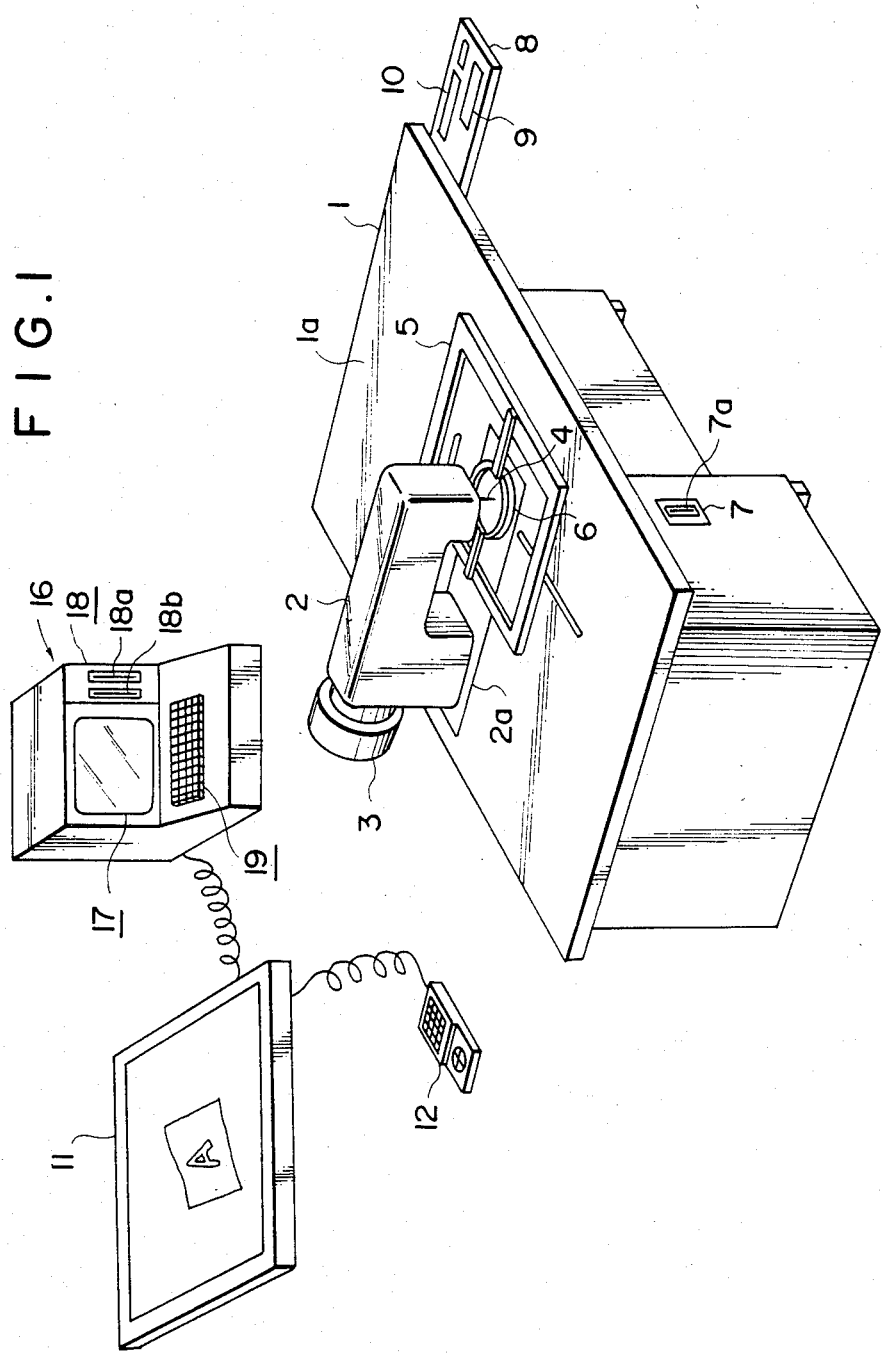
FIG. 1 is a perspective view showing the sewing machine for embroidery, tablet and indicating means.
Figure 2:
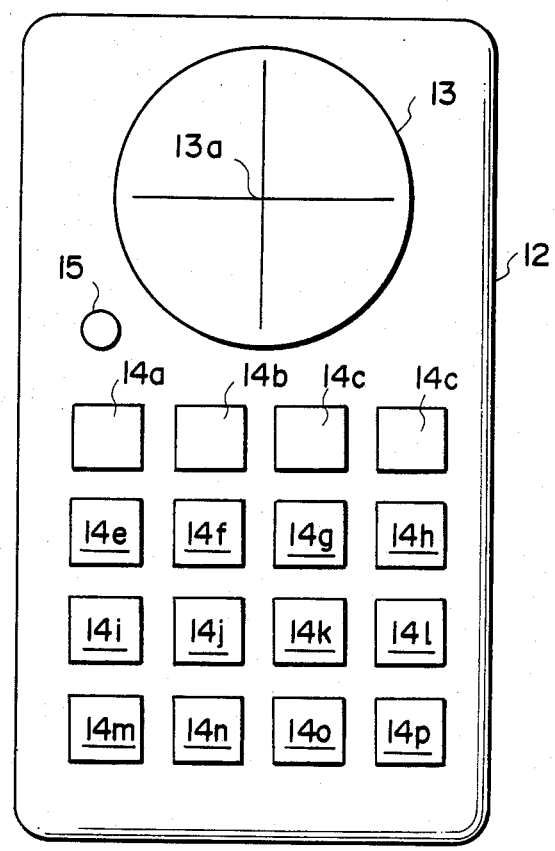
FIG. 2 is a front view showing the cursor for data inputting.

Designated at 11 is a well-known tablet (a co-ordinate reading device), which is connected to a cursor (a reader) 12 through a cord. The cursor 12 is of such an arrangement that a transparent glass sheet 13 provided at the central portion thereof with a cross mark 13a is set into a window hole vertically penetrated through one end portion of the cursor, sixteen operating keys 14 are arranged on the upper surface of the other end portion of the cursor, and a lamp 15 is provided to be turned "ON" for ascertaining a generation of a signal each time one of the operating keys 14 is operated. When the cursor 12 is rested on the upper surface of the tablet 11, co-ordinates of a position are detected on the upper surface of the tablet 11 opposed to the intersection of the cross mark 13a at a position where the cursor 12 is rested (Refer to FIG. 2), the positional co-ordinates are read in connection with the operation of the operating keys 14, whereby the co-ordinates signals corresponding to the respective co-ordinates are generated.

Denoted at 16 is a control device, which comprises: an indicating means 17 to perform CRT indication; a floppy control means 18 having an insert portion 18a capable of detachably receiving a system floppy disk (system disk), into which basic data are written in and an insert portion 18b capable of detachably receiving a data floppy disk (data disk), into which data to be read by the floppy reading means 7 are written in, and performing writing in and reading out of the floppy disks (system and data disks); an operating means 19 having a plurality of keys; and an operating means 19 having a plurality of keys; and a control circuit, not shown, having ROM, RAM, CPU and so forth. A program based on the flow chart shown in FIG. 4 is stored in the control circuit as will be described hereunder. In the flow shown in FIG. 4, a pattern input correction program "PTIN$_1$" is read in from the system disk, data obtained by processing "PTIN$_1$" are written into the system disk at the time of input, processed data, which have been once written in the system disk, are read out to perform correction at the time of correction, and the result is rewritten into the system disk as processed data. After "PTIN$_1$" is processed, the presence of an indication command is judged, and, when the indication command is issued, an input pattern indicating program "PTDIP" is read in from the system disk is CRT-indicated on the indicating means 17 based on this "PTDIP". After "PTDIP" is processed or when the absence of an indication command is judged, the presence of a correction is judged, and, correction processed data based on the aforesaid program "PTIN$_1$" are rewritten in at the time of correction. At the time of no correction, a needle drop co-ordinate calculation output program "PTOUT" is read in from the system disk and processed data of the system disk are processed. As the result of the processing, the data of the needle location co-ordinates and the like are written into the data disk, thus completing the write-in flow.

Further description will hereunder be given of the pattern input correction program (PTIN$_1$) with reference to the flow shown in FIG. 5. Judgement is made whether the data to be read in is a new input or not; and, when it is a new input, it is read in by a key input from the cursor 12 how many times an original pattern is magnified to, which is read on the tablet 11. This magnification is inputted by use of numeral keys from "1" to "9" of the cursor 12. For example, when "4" is inputted, the scale becomes ¼ as compared with the case where "1" is inputted. Then, a "basic line" is determined. The basic line is a base line $X_n$ previously specified for plotting the needle location points, and whose co-ordinates are characterized by an inclination $\theta$ made with absolute co-ordinates X on the tablet 11 as shown in FIG. 3(A). This inclination $\theta$ is determined by means of the cursor 12 based on the flow shown in FIG. 10 as follows. Namely, a key 14a is pressed when the mark 13a of the cursor 12 is registered with the absolute co-ordinates (Xa, Ya) to thereby read in co-ordinates (Xa, Ya) in the first plate, and then, the key 14a is pressed at a point (Xb, Yb) spaced apart from the point (Xa, Ya) to thereby read in the co-ordinates of the point (Xb, Yb). From these, a distance $LX=Xb-Xa$ in the axial direction X and a distance $LY=Yb-Ya$ in the axail direction Y are calculated. Subsequently, $LXY=\sqrt{(Xb-Xa)^2+(Yb-Ya)^2}$ is calculated, $\cos\theta=LX/LXY$ and $\sin\theta=LY/LXY$ are determined, and, hereinafter, the base line inclined to the absolute co-ordinates X by the angle $\theta$ becomes the axis X. This ase line $X_n$ and the absolute co-ordinates (X, Y) are in the relationship of $X_n=X\cos\theta-Y\sin\theta$. After the co-ordinate transformation coefficients $\cos\theta$ and $\sin\theta$ are determined as described above, the data reading operation is carried out based on the flow shown in FIG. 11.

As will be described in the following action, in the present embodiment, in reading an original figure, the original figure is divided into a plurality of blocks as shown in FIG. 3(B) for example. A term "types of sewings" in the description "Selection of types of sewings" in the flow shown in FIG. 11 includes a pattern sewing, an embroidery sewing and a jump in the present embodiment, each of which is instructed by a key 14k, key 14l and key 14m of the cursor 12. By the pattern sewing, only the contour of the pattern is sewn as shown in FIG. 12A, by the embroidery sewing, the interior of the pattern is filled up with sewing threads as shown in FIG. 12B, and, by the jump, the seam advances from a point P$_1$ to a point P$_2$ with the needle not being dropped as shown in FIG. 12C. A point number counter is a counter in which points in one block are successively added up from 1 to 5 for example, as shown in FIG. 3. Firstly, a counted value P is set to "0" and, each time the cursor 12 reads a point, the counted value P is counted up by "1". Thereafter, judgement is made whether "All points completed" or not, i.e., whether reading of the block is completed or not. At the moment when a 14h key of the cursor 12 is pressed, a judgement is made whether reading of the block is completed or not. When "all points completed" is not reached, a judgement is made whether "block re-reading" is needed or not. "Block re-reading" occurs in the case where an improper point is mistakenly read in by an operator, and the operator has pressed a key 14j of the cursor 12 in order to correct the data of the block as a whole. When the key 14j is pressed, the data of all points in the block are cleared and it becomes necessary to re-read data anew. When the key 14j has not been pressed, a judgement is made whether a "preceding point input miss" is present or not. A "preceding point input miss" represents the case where the data which has been inputted is mistaken and the operator has pressed the key 14i of the cursor 12 in order to correct the data. When the key 14 is pressed, the counted value P of the point number counter is counted down by "2", and thereupon, counted up by "1", whereby the preceding data is cleared, and it becomes possible to read in a proper data thereinto. When neither the key 14j nor the key 14i has been pressed, the operator immediately enters an operation of "straight line", "circle" or "circular arc" to be described hereunder. In the present embodiment, an individual side (straight line), circular arc or circle is called a unit. It is well known that a straight line is defined by two points on the opposite ends thereof, a circle or a circular arc is defined by three points not disposed on one and the same line. To define units in the present invention, the above-described geometrical properties are utilized. For example, if only one point is used in defining a circular arc, or on the contrary, four points are used in defining a circular arc, then, such ways of use are be regarded as errors, and checking for such errors is performed by following the flow shown in FIG. 13.

In the cursor 12, defining of a straight line corresponds to a key 14b, defining of a circular arc to a key 14c and defining of a circle to a key 14d, respectively. These respective defining operations by means of the cursor 12 will be described in the flow shown in FIG. 13.

Figure 15:
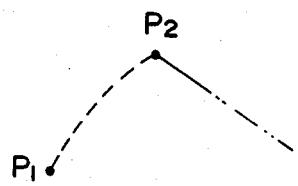
Figure 16:
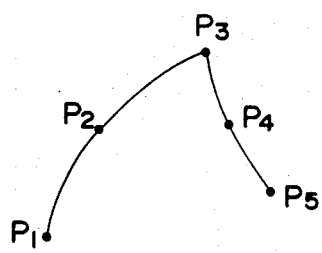
Figure 17:
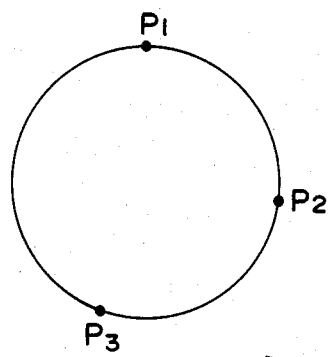
Figure 18:
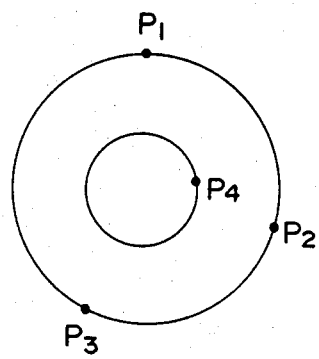
Figures 21, 21B:
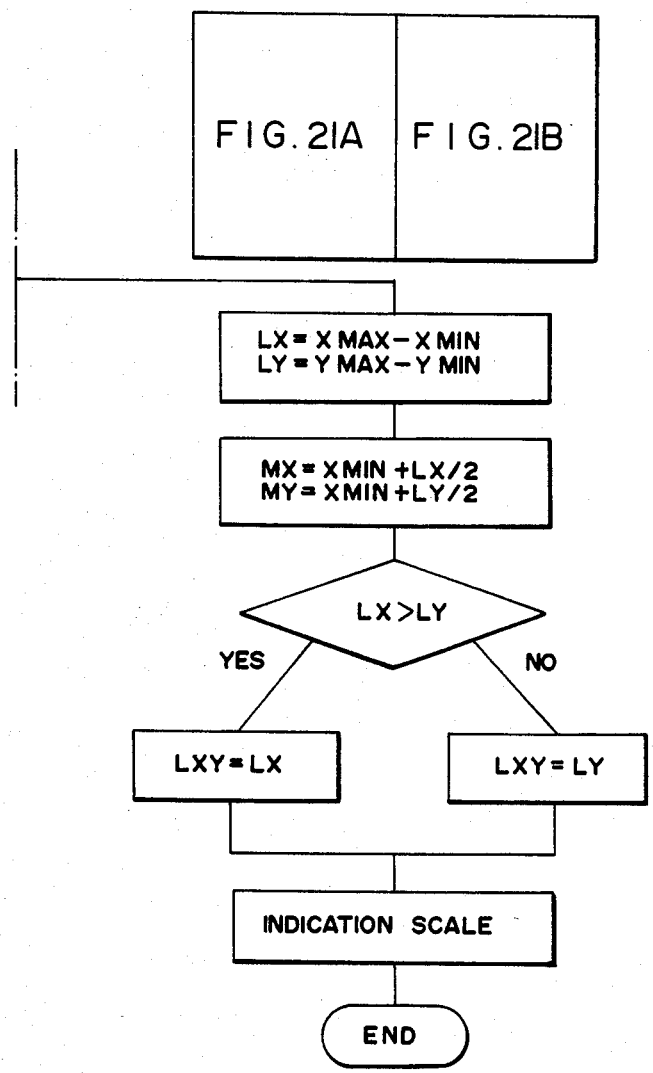
Figure 21A:
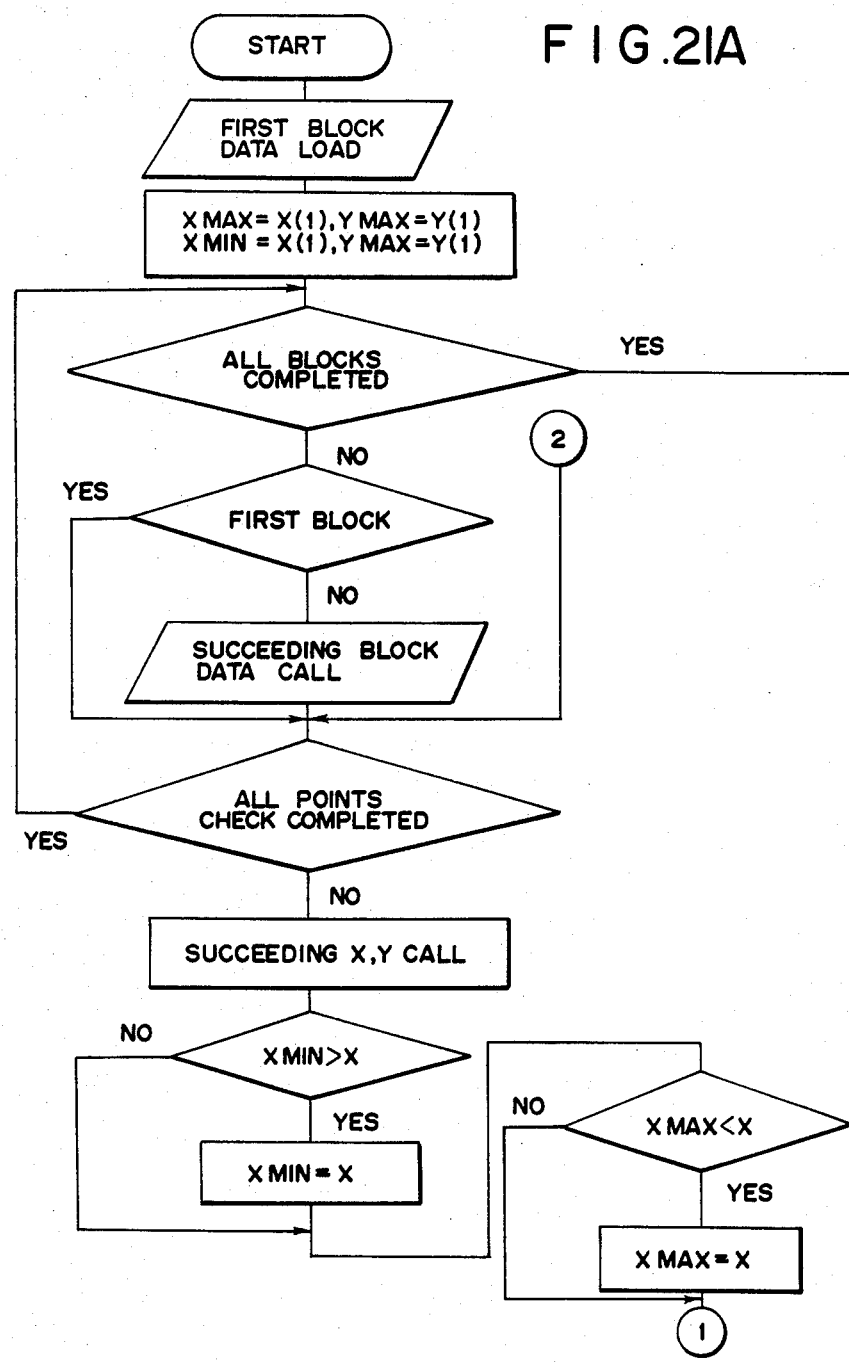
Figure 22:
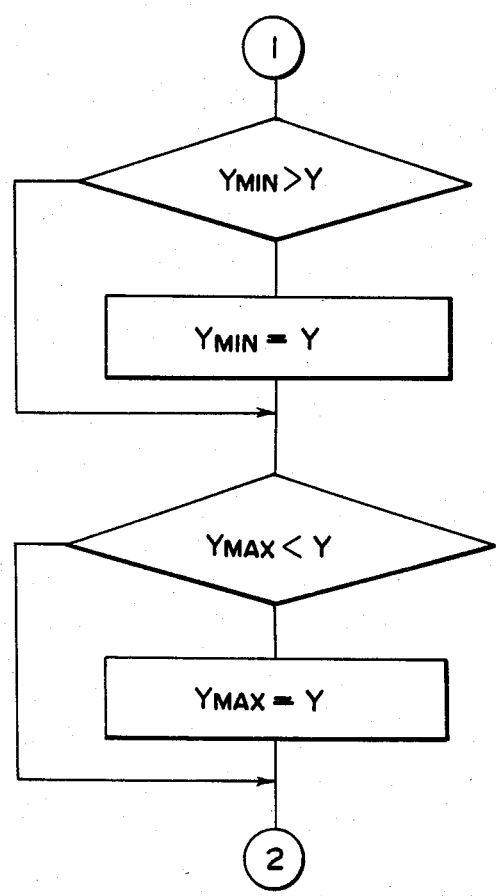

In FIG. 13, counted values are preset to "0" in respective counters including a "straight line number" counter, a "circular arc point number" counter, a "circle point number" counter, a "circular arc number" counter and a "circle number" counter. All of these counters will be used in the following operations. Then, in connection with the operation of the key 14b, 14c or 14d of the cursor 12, the "straight line number" counter, the "circular arc point number" counter or the "circle point number" counter is counted up by "1". When the "straight line number" counter is counted up by "1", the counted value of the "circular arc point number" counter is judged. Suppose, in the case of inputting points $P_1-P_4$ shown in FIG. 14, $P_1-P_3$ is a circular arc and $P_3-P_4$ is a straight line. When the key 14c is pressed with the mark 13a of the cursor 12 being registered with $P_1$ and the key 14c is pressed again with the mark 13a being registered with $P_2$, the counted value of the "circular arc point number" counter becomes "2". At this time, when the key 14b is pressed with the mark 13a being registered with $P_3$, a circular arc is defined by $P_1$, $P_2$ and $P_3$, whereby the counted value of the "circular arc number" counter is counted up by "1" and the "circular arc point number" counter is cleared to "0" because defining of one circular arc is completed. This case is a normal one, and hence, no checking function in the flow shown in FIG. 13 works. Whereas, when the "circular arc point number" counter has "1", i.e., $P_1$ is inputted as shown in FIG. 15, the key 14b to instruct a straight line is pressed with the mark 13a of the cursor 12 being registered with $P_2$. Then, $P_1$ and $P_2$ cannot define a circular arc, whereby a buzzer sounds to report an error in inputting the data. In this case, the key 14j or 16y of the cursor 12 must be pressed to correct the data. In FIG. 16, when the key 14c is pressed both at $P_1$ and $P_2$ and further the key 14c is pressed again at $P_3$, a circular arc is defined by $P_1$, $P_2$ and $P_3$ and the counted value of the "circular arc number" counter becomes "1" as described above. However, $P_3$ is an ending point of the circular arc, and at the same time, is regarded as a starting point of the succeeding circular arc, and hence, the counted value of the "circular arc number" counter becomes "1" but not "0", thus avoiding an error. In FIG. 17, when the key 14d is pressed at $P_1$, $P_2$ and $P_3$, the counted value of the "circle point number" counter becomes "3", whereby a circle is defined by $P_1$, $P_2$ and $P_3$, so that the counted value of the "circle number" counter is counted up by "1". Here, if the key 14d is pressed with the mark 13a of the cursor 12 being registered with $P_4$ on the circle, the counted value of the "circle point number" counter is further counted up by "1" and becomes "4". However, in the present embodiment, since a circle coaxial of a circle defined by $P_1$, $P_2$ and $P_3$ and passing through $P_4$ is formed as shown in FIG. 18, the above "4" is not regarded as an error. However, when the counted value of the "circle point number" counter is further counted up by "1" and becomes "5", there are present too many points, whereby the buzzer sounds to report the error.

Figure 19:
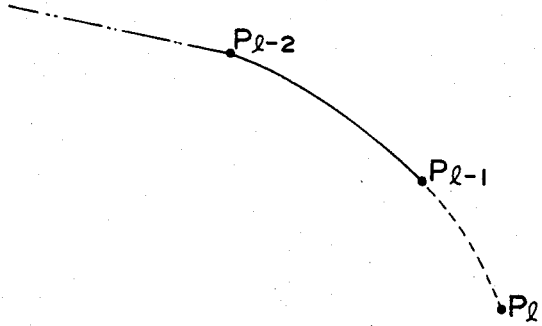

Upon completion of checking all the points as described above, judgement is made what the counted value of the "circular arc point number" counter is at this ending point. When the counted value is "0", the circular arc is completed. In consequence, the process goes forward to the flow shown in FIG. 20. If the counted value of the "circular arc point number" counter at a point $P_{l-1}$ right before the ending point P is "2" as shown in FIG. 19, then a circular arc is completely formed by three data including a data inputted by a key 14n of the cursor 12, a point $P_{l-2}$ and the point $P_{l-1}$, and the counted value of the "circular arc number" counter is counted up by "1". However, if the counted value of the "circular arc point number" counter is "1" at the point $P_{l-1}$, then it becomes impossible to complete the circular arc at the ending point $P_l$, and hence, the buzzer is sounded to report the error.

FIG. 20 shows a flow wherein inputted point data are divided into a plurality of units including straight line, circular arc and/or circle as shown in FIGS. 11 and 12, and the respective units are given component data to be utilized in calculating the needle location point, which will be described hereunder. Here, the number of units is the total sum of the counted values of the "straight line number" counter, the "circular arc number" counter and the "circle number" counter in the flow shown in FIG. 13.

The component data is five numerals including D(X,1)– D(X, 5) which correspond to the units, respectively. X is a serial number for identifying the respective units. Firstly, D(X, 1) is a code for indicating the type of a unit, and "0" is given thereto for a straight line, "1" for a circular arc and "2" for a circle. D(X, 2) is given a number of a point as being a starting point of the unit (Refer to FIG. 3(B)). D(X, 3) is given a number of a point as being a center point of the unit. However, since the unit of straight line has no center point, "−1" is given thereto for the convenience. D(X, 4) is given a number as being an ending point of the unit. In particular, when the last unit of a block is a straight line, the ending point of the unit coincides with the starting point of the block. Hence, J=0 is set, and D(X, 4)=0+1=1 and J=0+1=1 is restored. When the last unit of a block is a circular arc, the ending point of the unit coincides with the starting point of the block. Hence, firstly, it is put as J=1, and D(X, 4)=−1+2=1 and J=−1+2=1 are restored. Thus, data check and giving the component data to the respective units are completed throughout the block, specified inputs for "swings" and "pitch" are performed, returning to the flow shown in FIG. 5. The specified input for the "pitch" is performed on the unit of 0.1 mm by use of numeral keys 14a–14j of the cursor 12. For example, if the keys 14b and 14c are successively pressed, then 0.1×12=1.2 mm is set as being the pitch between the needle location points.

Subsequently, "swings" in one block are specified by use of the cursor 12. In the present embodiment, "swings" include "swings in specified direction" as shown in FIG. 30 and "swings from center" as shown in FIGS. 37 and 38. In the "swings in specified direction", based on the flow, not shown, similar to one shown in FIG. 10, firstly, the key 14a of the cursor 12 is pressed once, subsequently, the mark 13a of the cursor 12 is moved and the key 14a is pressed again, whereby a direction swings with respect to the base line $X_n$ (Refer to FIG. 3) is specified. Additionally, the "swings from center" is specified by pressing a key 14$h$ of the cursor 12.

Thus, upon completion of reading of the data of one block, judgement is made whether the data of the whole block in the original figure (pattern) has been completed or not by the presence of a completion command, i.e., whether the key 14$_n$ of the cursor 12 has been pressed two times in succession or not. When completion is determined, as for the aforesaid data, command inputs regarding registration numbers (pattern No.) when the aforesaid data is registered in the data disk is read in, and further, the data processed by "PTIN$_1$" as being the pattern data are stored in the system disk.

Subsequently, description will hereunder be given of an input pattern indication program "PTDIP" following the flow shown in FIG. 6.

The pattern data stored by the pattern input correction program "PTIN$_1$" is read in from the system disk, and the maximum values XMAX and YMAX, and further, the minimum values XMIN and YMIN of the X and Y axes of the data are selected. More specifically, in the flows shown in FIGS. 21 and 22, firstly, data in one pattern are loaded, and substitution is made by use of the first point (X(1), Y(1)) such that XMAX=X(1), XMIN=X(1), YMAX=Y(1), and YMIN=Y(1). Subsequently, the second point (X(2), Y(2)) in the first block is compared in value with XMAX, XMIN, YMAX and YMIN. Substitution is made such that when XMIN>X(2), XMIN=X(2), when XMAX<X(2), XMAX=X(2), when YMIN>X(2), YMIN=Y(2), and, when YMAX<Y(2), YMAX=Y(2). This comparison is repeated on the successive points in the first block. Upon completion of comparison on all the points in the first block, data in the succeeding block are read out for comparison. Upon completion of comparison on the whole block, YMAX and XMIN indicate the maximum and minimum values of the abscissa X in the data of the whole block, and YMAX and YMIN indicate the maximum and minimum values of the ordinate Y, respectively. Then the spreads LX and LY of the data in the directions X and Y are calculated through $LX=XMAX-XMIN$ and $LY=YMAX-YMIN$, and the co-ordinates of the center of the data are calculated through $MX=XMIN+LX/2$ and $MY=XMIN+LY/2$. Further, the larger one out of LX and LY refers to LXY, and scaling is obtained in inverse proportion to the value of LXY, whereby the pattern may be indicated on the CRT in a preset scale irrespective of the size of the original pattern.

Upon completion of scaling, indication routines for each block are started. In the flow chart shown in FIG. 23, the data of one block is read out and the scale of the data is enlarged or reduced based on a SCL value (a value calculated on the basis of proportional ratio), and thereafter, judgement is made what the first unit is, a straight line, a circular arc or a circle. When the unit is a straight line, the starting and ending points are marked and the two points are connected to each other by a straight line. When the first unit is a circle or a circular arc, the starting point $P_1=(X_1, Y_1)$, the Intermediate point $P_2=(X_2, Y_2)$ and the ending point $P_3=(X_3, Y_3)$ are plotted, and the co-ordinates of the center $(X_0, Y_0)$ and the radius R is calculated based on the flow chart shown in FIG. 25. More specifically, in the flow chart shown in FIG. 23, a straight line $L_1$ passing through $P_1$ and $P_2$: $(X-X_1)(Y_2-Y_1)=(Y-Y_1)(X_2-X_1)$ is defined and a straight line $L_2$ passing through $P_2$ and $P_3$: $(X-X_2)(Y_3-Y_2)(X_3-X_2)$ is also defined. At this time, if $L_1$ and $L_2$ are in parallel to each other, i.e., $(Y_2-Y_1)/(X_2-X_1)=(Y_3-Y_2)/(X_3-X_2)$, then the three points are disposed on one and the same straight line. Hence, neither a circle nor a circular arc can be formed, and the flow chart makes a return. In this case, it is necessary to input over again to define a circle or a circular arc. Now, if $L_1$ and $L_2$ are not in parallel to each other, then, upon defining a straight line $L_1'$ passing through the intermediate point between $P_1$ and $P_2$, and perpendicular to $L_1$: $-[X-(X_1+X_2)/2](X_2-X_1)=[Y-(Y_1+Y_2)/2](Y_2-Y_1)$ and a straight line $L_2'$ passing through the intermediate point between $P_2$ and $P_3$, and perpendicular to $L_2$: $-[X-(X_2+X_3)/2](X_3-X_2)=[Y-(Y_2+Y_3)/2](X_3-X_2)=[Y-(Y_2+Y_3)/2](Y_3-Y_2)$, a point of intersection between $L_1'$ and $L_2'(X_0, Y_0)$ is extracted as follows.

$$X_0 = \frac{\begin{vmatrix} \frac{1}{2}[(X_2^2 - X_1^2) + (Y_2^2 - Y_1^2)] & Y_2 - Y_1 \\ \frac{1}{2}[(X_3^2 - X_2^2) + (Y_3^2 - Y_2^2)] & Y_3 - Y_2 \end{vmatrix}}{\begin{vmatrix} X_2 - X_1 & Y_2 - Y_1 \\ X_3 - X_2 & Y_3 - Y_2 \end{vmatrix}}$$

$$Y_0 = \frac{\begin{vmatrix} X_2 - X_1 & \frac{1}{2}[(X_2^2 - X_1^2) + (Y_2^2 - Y_1^2)] \\ X_3 - X_2 & \frac{1}{2}[(X_3^2 - X_2^2) + (Y_3^2 - Y_2^2)] \end{vmatrix}}{\begin{vmatrix} X_2 - X_1 & Y_2 - Y_1 \\ X_3 - X_2 & Y_3 - Y_2 \end{vmatrix}}$$

Since this point of intersection $(X_0, Y_0)$ becomes the co-ordinates of the center of the circle or circular arc, the radius R is calculated from $$R=\sqrt{(X_1-X_0)^2+(Y_1-Y_0)^2}.$$

When the unit is a circle, the circle is immediately drawn based on the co-ordinates of the center $(X_0, Y_0)$ and the radius R. However, when the unit is a circular arc, the vectorial angles are limited. Hence, the vectorial angles $AG_1$ and $AG_2$ are calculated, i e., $$AG_1=\tan^{-1}[(Y_1-Y_0)/(X_1-X_0)]_1$$

$$AG_2=\tan^{-1}[(Y_3-Y_0)/(X_3-X_0)]$$

Thus, the circular arc is drawn within the scope of the vectorial angles $AG_1$ and $AG_2$.

As described above, units in one block are indicated on the CRT one after another, a counted value N of a block counter is counted up by "1" in connection with the flow shown in FIG. 24, and the counted value N of the block counter is indicated in the vicinity of the block, which has been indicated. Subsequently, this counted value N is divided by "6", and, if the surplus S is 0, then, for example, a "purple" color code is generated, if S=1, then a "red" color code is generated, if S=2, then a "yellow" color code is generated, if S=3, then a "blue" color code is generated, if S=4, then a "green" color code is generated, and if S=5, then a "white" color code is generated. In other words, the contours of the respective blocks are indicated in different colors on the CRT, successively. Upon completion of indicating all of blocks, the pattern No., which has been registered, is indicated, a hard copy (PRINT) is printed, when necessary, and then the process comes to an end.

Description will now be given of a needle location co-ordinate calculation output program "PTOUT" with reference to the flow shown in FIG. 7. Firstly, a pattern is read out of the system disk, the contents of data of the data disk to store the needle location co-ordinate data, which will be described hereunder, are checked and the presence of the write-in capacity is ascertained. Subsequently, judgement is made whether storage of the data of all the blocks is completed or not. If not, data per block is read out of the system disk, and subsequently, the needle location co-ordinate calculation routine to be described hereunder (Flow charts shown in FIGS. 26–29, 35 and 37) is processed.

As shown in the flow chart of FIG. 26, the needle location co-ordinate calculation includes four types including (i) embroidery by swings in specified direction, (ii) embroidery by swings from center, (iii) pattern sewing and (iv) jump. As to the type to be used for calculation of needle location co-ordinates, as shown in the flow chart of FIG. 11, specifying the type is made through operation of a key 14e (embroidery), a key 14k (pattern), or a key 14m (jump) of the cursor 12 prior to read-out of the data of one block, and further, as shown in the flow chart of FIG. 5, in particular, specifying the type of embroidery is made through operation of a key 14a (specifying the swinging direction) or a key 14h (swings from center) of the cursor 12 after reading of the data of one block.

(i) embroidery by swings in specified direction

Figure 28B:
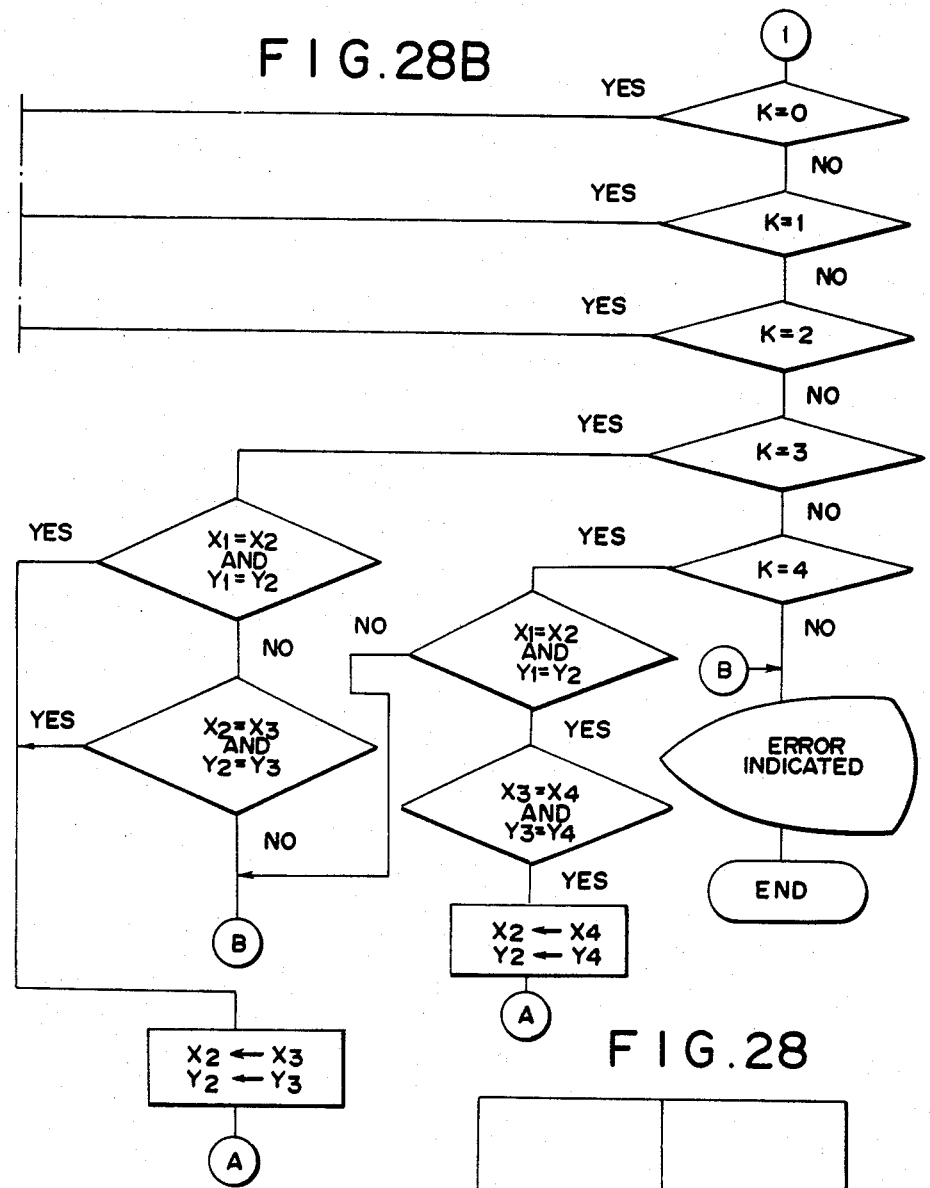
Figure 28:
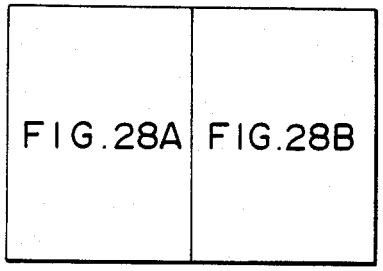
Figure 28A:
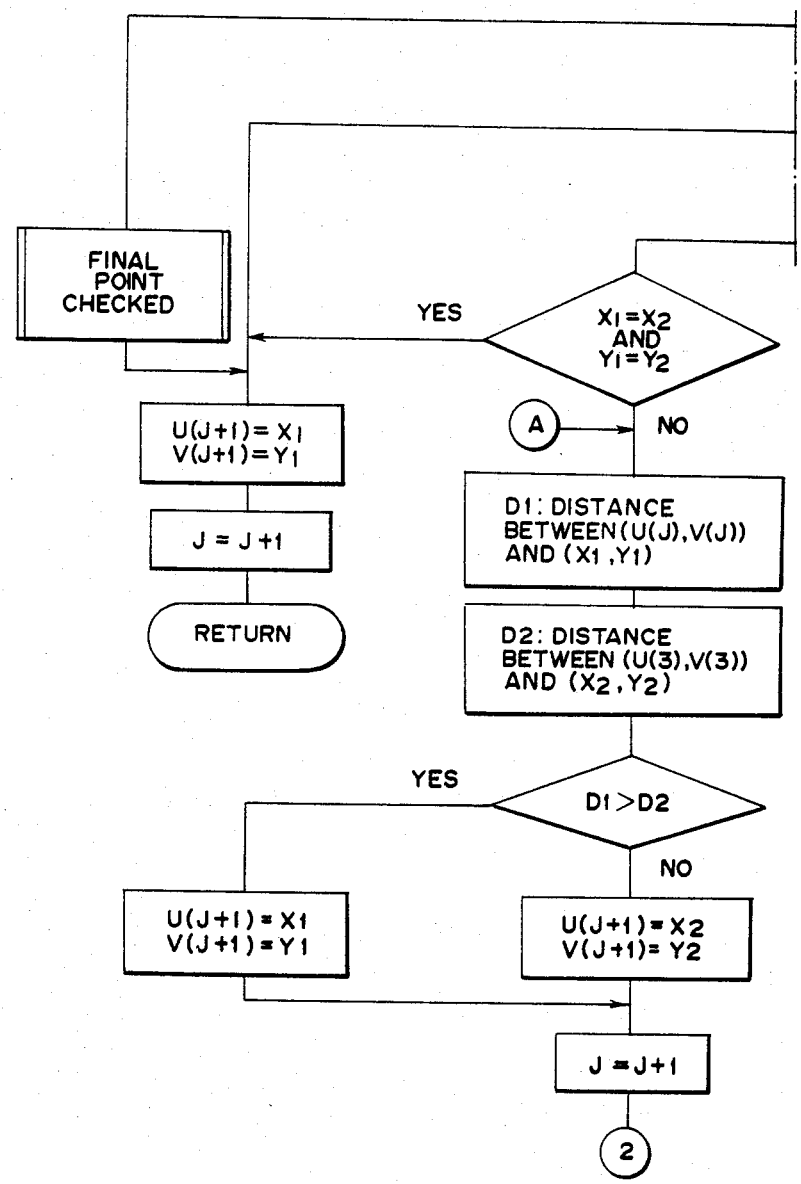

Description will hereunder be given of this type with reference to FIG. 30 in accordance with the flow charts shown in FIGS. 27 through 29. Since the swinging direction with respect to the base line $X_n$ has been specified in the flow chart of FIG. 5, a straight line $L_1$ in parallel to the swinging direction and passing through the starting point $P_1=(X(1), Y(1))$ of a block $B_1$ is defined. Now, by use of constants a, b and c, $L_1$ is expressed as "$aX+bY+c=0$". Further, there is defined a straight line DL: $-bX+aY+c_1=0$ having a constant $c_1$, passing through the point $P_1$ and perpendicular to $L_1$. Subsequently, the advancing direction of the embroidery is checked. For example, in FIG. 30, the data of the block $B_1$ is disposed upwardly of $L_1$, so that the embroidery advances upwardly. Subsequently, two-dimentional areas (U(J), V(J)) for needle location co-ordinates are prepared. J is a counted value of a needle co-ordinate counter, which is counted up by "1" each time a needle location point is calculated. In the initial condition, firstly, J=1 is set, as every first points of needle location, co-ordinates of the starting point $P_1$ of the block $B_1$ such for example as V(1)=X(1) and U(1)=Y(1) are stored. Subsequently, the straight line $L_1$ is upwardly moved in parallel by a pitch P of needle location inputted in the flow of FIG. 5, whereby the straight line $L_2$: $aX+bY+c-\lambda=0$ ($\lambda=P\sqrt{a^2+b^2}/b$) is obtained. Then, in FIG. 30 for example, the straight line $L_2$ intersects a unit $M_1$ and a unit $M_2$ at one point, respectively.

A counted value K of an intersection counter is counted up by "1" each time the aforesaid single straight line $L_1$, $L_2$ or the like intersects a unit. As to the presence of a point of intersection with a unit, a judgement is made on a straight line (a straight line obtained by moving $L_1$ upwardly by $(n-1)\lambda$ in parallel refers to $L_n$: $aX+bY+c-(n-1)\lambda=0$) successively from right to left in FIG. 30 for example, and the counted value K is cleared to "0" at the moment $L_n$ is upwardly advanced by a pitch P to become $L_n+1$ after completion of the aforesaid judgement.

Co-ordinates of the point of intersection between the unit and the straight line $L_n$ is calculated in accordance with the flow chart shown in FIG. 29. Firstly, when the unit is a straight line, co-ordinates of the opposite ends of the unit are supposed to be $(X_1, Y_1)$ and $(X_2, Y_2)$. In order for the straight line $L_n$: $aX+bY+c-(n-1)\lambda=0$ to intersect this unit, it is necessary and sufficient that the points $(X_1, Y_1)$ and $(X_2, Y_2)$ interpose the straight line $L_n$ therebetween and are opposed to each other. More specifically, when it is put as $Z_1=aX_1+bY_1+c-(n-1)\lambda$ and $Z_2=aX_2+bY_2+c-(n-1)\lambda$, if $Z_1Z_2>0$, then it is regarded as no point of intersection existing between the unit and the straight line L. If $Z_1Z_2<0$, then it is regarded as a point of intersection existing therebetween, and the process goes forward to the subsequent calculation of the point of intersection. More specifically, the straight line passing through the points $(X_1, Y_1)$ and $(X_2, Y_2)$ is $(X-X_1)(Y_2-Y_1)=(Y-Y_1)(X_2-X_1)$, and the point of intersection $(xk+1, yk+1)$ intersection $L_n$ is calculated as follows:

$$xk+1 = \frac{\begin{vmatrix} (n-1)\lambda - C & b \\ X_1Y_2 - Y_1X_2 & X_1 - X_2 \end{vmatrix}}{\begin{vmatrix} a & b \\ Y_2 - Y_1 & X_1 - X_2 \end{vmatrix}}$$

$$yk+1 = \frac{\begin{vmatrix} a & (n-1)\lambda - C \\ Y_2 - Y_1 & X_1Y_2 - Y_1X_2 \end{vmatrix}}{\begin{vmatrix} a & b \\ Y_2 - Y_1 & X_1 - X_2 \end{vmatrix}}$$

Since one point of intersection is calculated as described above, the counted value K of the intersection counter is counted up by "1".

Subsequently, when the unit is a circle or a circular arc, three points on a circular arc of the circle (or the circular arc) are supposed to be $(X_1, Y_1)$, $(X_2, Y_2)$ and $(Y_3, Y_3)$. Co-ordinates of the center $(X_0, Y_0)$ of the circle (or the circular arc) and a radius R of the circle (or the circular arc) are calculated from the aforesaid three points in accordance with the flow chart shown in FIG. 25. Subsequently, there is defined a straight line $L_t$: $-b(X-X_0)+a(Y-Y_0)=0$ passing through the point $(X_0, Y_0)$ and perpendicular to $L_n$. Then, a point of intersection between $L_t$ and $L_n$ (XX, YY) is calculated as follows:

$$XX = \frac{\begin{vmatrix} (n-1)\lambda - C & b \\ -bX_0 + aY_0 & a \end{vmatrix}}{\begin{vmatrix} a & b \\ -b & a \end{vmatrix}}$$

$$YY = \frac{\begin{vmatrix} a & (n-1)\lambda - C \\ -b & -bX_0 + aY_0 \end{vmatrix}}{\begin{vmatrix} a & b \\ -b & a \end{vmatrix}}$$

A distance $H_1$ between the point $(X_0, Y_0)$ and the point (XX, YY) is calculated through an equation of $H_1=\sqrt{(X_0-XX)^2+(Y_0-YY)^2}$. In comparison between $H_1$ and the radius R, if $H_1>R$, then the straight line $L_n$ does not intersect the circle because $L_n$ traverses a position farther than the radius R from the center $(X_0, Y_0)$ of the circle (or the circular arc), whereby no point of intersection exists. However, if $H_1 \leq R$, then $L_n$ intersects the circle (or the circular arc), and the process goes forward to the subsequent calculation of the point of intersection. More specifically, the following equations are simultaneously solved for X and Y, and two points of intersection $P_1 = (Xk+1, Yk+1)$ and $P_2 = (Yk+2, Yk+2)$ are extracted.

$L_n$: $aX + bY + c - (n-1)\lambda = 0$

Circle: $(X - X_0)^2 + (Y - Y_0)^2 = R^2$

The specific calculation formulae are omitted here because of the complexity, however, will be shown later in the following page for the reference.

Now, when the unit is a circle, the points of intersection $P_1$ and $P_2$ should necessarily belong to the unit, and hence, the counted value K of the intersection counter is counted up by "2". However, when the unit is a circular arc, there are some cases where the points of intersection $P_1$ and $P_2$ do not belong to the unit. Hence, a judgement is made whether the points of intersection $P_1$ and $P_2$ belong to the unit or not as follows. Namely, as for the three points $(X_1, Y_2)$, $(X_2, Y_2)$ and $(X_3, Y_3)$ on the circular arc, their vectorial angles $AG_1$, $AG_2$ and $AG_3$ from the center are calculated through the following equations.

$$AG_1 = \tan^{-1}[(Y_1 - Y_0)/(X_1 - X_0)]$$

$$AG_2 = \tan^{-1}[(Y_2 - Y_0)/(X_2 - X_0)]$$

$$AG_3 = \tan^{-1}[(Y_3 - Y_0)/(X_3 - X_0)]$$

Subsequently, vectorial angles $AG_4$ and $AG_5$ of the points of intersection $P_1$ and $P_2$ are calculated through the following equations.

$$AG_4 = \tan^{-1}[(Yk+1 - Y_0)/(Xk+1 - X_0)]$$

$$AG_5 = \tan [(yK+2 - Y_0)/(Xk+2 - X_0)]$$

Only when $AG_1 < AG_4 < AG_2$ or $AG_2 < AG_4 < AG_3$, $P_1$ is regarded as a point of intersection with the circular arc, and the counted value K of the intersection counter is counted up by "1". Subsequently, only when $AG_1 < AG_5 < AG_2$ or $AG_2 < AG_5 < AG_3$, $P_2$ is regarded as a point of intersection with the circular arc, and the counted value K of the intersection counter is further counted up by "1". Reference:

A point of intersection between $$aX = bY + c - (n-1)\lambda = 0 \text{ and}$$
$$(X - X_0)^2 + (Y - Y_0)^2 = R^2$$

$$Y_{k+1}, Y_{k+2} = \frac{a^2 A \pm \sqrt{A^2 - B}}{a^2 + b^2}$$

$$X_{k+1}, X_{k+2} = \frac{-abA \mp \sqrt{A^2 - B}}{a^2 + b^2} + \frac{(n-1)\lambda}{a} - \frac{c}{a}$$

(Double signs are in correspondence with each other)
However, $$A = \frac{b}{a} X_0 - Y_0 + \frac{bc}{a^2} - \frac{(n-1)b\lambda}{a^2}$$

$$B = X_0^2 + Y_0^2 - R^2 + \frac{1}{a^2}(n-1)^2\lambda^2 + \frac{c^2}{a^2}$$

When the points of intersection of one straight line $L_n$ with the respective units are all calculated, the following check is performed in connection with the counted value K of the intersection counter in accordance with the flow shown in FIG. 28.

(1) $K = 0$

In this case, there is not point of intersection between the unit and the straight line $L_n$. Hence, a check is made whether the ending a point is calculated or not. When the ending point is calculated, calculation of the needle location points in connection with the block is completed.

(2) $K = 1$

In this case, the value of the point of intersection $(x_1, y_1)$ obtained is stored in the needle point co-ordinates $(U(J+1), V(J+1))$, and the counted value J of the needle location co-ordinate counter is counted up by "1".

(3) $K = 2$

There are three cases shown in FIGS. 31A, 31B and 31C, where the number of the points of intersection between the unit and the straight line $L_n$ becomes 2.

In the case shown in FIG. 31A, the straight line $L_n$ crosses a point connecting two units $M_1$ and $M_2$, whereby the straight line $L_n$ crosses the both units $M_1$ and $M_2$. Consequently, it is regarded as the points of intersection $K = 2$. In fact, however, the two points of intersection $(x_1, y_1)$ and $(x_2, y_2)$ are identical with each other, whereby it is put as $x_1 = x_2$ and $y_1 = y_2$, so that this case comes back to $K = 1$.

In the case shown in FIG. 31B, the single straight line $L_n$ intersects two different units $M_1$ and $M_2$ at two points $(x_1, y_1)$ and $(x_2, y_2)$ different from each other. At this time, there are respectively calculated through the following equations two distances $D_1$ and $D_2$ between the points $(x_1, y_1)$, $(x_2, y_2)$ and a needle location point $(U(J), V(J))$, which is specified to have the final needle location co-ordinates, out of the points of intersection between the respective units and a straight line $L_{n-1}$ which is lower than the straight line $L_n$ by a pitch P as follows:

$$D_1 = \sqrt{(x_1 - U(J))^2 + (y_1 - V(J))^2}$$

$$D_2 = \sqrt{(x_2 - U(J))^2 + (y_2 - V(J))^2}$$

If $D_1 > D_2$, then the point $(x_1, y_1)$ is selected, and, if $D_1 < D_2$, then the point $(x_2, y_2)$ is selected. Values of co-ordinates of the point thus selected are stored in $(U(J+1), V(J+1))$, and the counted value J of the needle location co-ordinate counter is counted up by "1".

In the case shown in FIG. 31C, being different from the above, two different points of intersection $(x_1, y_1)$ and $(x_2, y_2)$ belong to a single circular arc unit $M_4$. Processing of the two points is performed in the same manner as in the case of FIG. 29B. A point farther than the preceding needle location point $(U(J), V(J))$ is selected as the succeeding needle location point $(U(J+1), V(J+1))$, and the counted value J of the needle location co-ordinate counter is counted up by "1".

(4) $K = 3$

As shown in FIG. 32, this is the case where one of the points of intersection touches both units $M_1$ and $M_2$, whereby $(x_1, y_1)$ and $(x_2, y_2)$ overlap with each other. At this time, since $x_1 = x_2$ and $y_1 = y_2$, this case comes back to the case of FIG. 31B. If it does not return to the case of FIG. 31B, then it is regarded as an error.

(5) $K = 4$

As shown in FIG. 33, this is the case where one of the points of intersection touches both units $M_1$ and $M_2$, whereby $(x_1, y_1)$ and $(x_2, y_2)$ overlap with each other, and also, the other of the points of intersection touches both units $M_3$ and $M_4$, whereby $(x_3, y_3)$ and $(x_4, y_4)$ overlap with each other. It is put as $x_1=x_2$, $y_1=y_2$, $x_3=x_4$ and $y_3=y_4$, whereby this case comes back to the case of FIG. 31B. If it does not return to the case of FIG. 31B, then it is regarded as an error.

(6) $K>4$

In the present embodiment, the largest number of the points of intersection K between the single straight line $L_n$ and the units is "4". Therefore, if K is larger than "4", it is regarded as an error at once.

When the flow returns from FIG. 28 to FIG. 26 as described above, the straight line further moves upwardly by a pitch P to become $L_{n+1}$. At this time, a point of intersection between this straight line $L_{n+1}$ and the unit is calculated in accordance with the flow shown in FIG. 26. A check is performed on the number of points of intersection K in accordance with the flow chart shown in FIG. 28.

Description will hereunder be given of a typical case of $K=2$ as shown in FIG. 34, in particular. In this case, the straight line $L_n$, $L_{n+1}$ and $L_{n+2}$ intersect the units $M_1$ and $M_2$ each one time, so the number of points of intersections between the straight lines $L_n$, $L_{n+1}$ and $L_{n+2}$ and the units $M_1$ and $M_2$ amounts to six. However, it does not come to that all of these points of intersection are specified as the needle location points. As shown in the flow of FIG. 28, only one point on the straight line $L_n$ is selected as the needle location point. Now, suppose that, with the straight line $L_n$, the needle location points $(U(J), V(J))$ are selected on the right side (Refer to FIG. 34). Then, out of the two points of intersection between $L_{n+1}$ and the units $M_1$, $M_2$, the point of intersection on the side of the unit $M_1$ is farther from $(U(J), V(J))$ than the point of intersection on the side of the unit $M_2$, and hence, the point of intersection on the side of the unit $M_1$ is selected as the succeeding needle location point $(U(J+1), V(J+1))$. Likewise, with the point of intersection between $L_{n+2}$ and the units $M_1$, $M_2$, the point of intersection on the side of the unit $M_2$ is selected as the needle location point $(U(J+2), V(J+2))$. Thus, the needle location points move on, reciprocating between the units $M_1$ and $M_2$, whereby embroidery seams can be formed in which the swinging direction of the needle is substantially in parallel to the straight line $L_n$.

(ii) embroidery by swings from center

"Swings from center" refers to embroidery seams in which the swinging direction of needle varies radially from a center point, and the needle location point is calculated in accordance with the flow chart shown in FIG. 35. More specifically, with the circular arc unit $M_1$ at the outer side of a block shown in FIG. 37, from three points $P_1=(X_1, Y_1)$, $P_2=(X_2, Y_2)$ and $P_3=(X_3, Y_3)$ thereon, the center of the circular arc $(XX_0, YY_0)$ and the radius $R_0$ of the circular arc are calculated in accordance with the flow chart shown in FIG. 25. Subsequently, a vectorial angle $AG_1=\tan^{-1}[(Y_1-YY_0)/(X_1-XX_0)]$ of the starting point $P_1$ and a vectorial angle $AG_2=\tan^{-1}[(Y_3-YY_0)/(X_3-XX_0)]$ of the ending point $P_3$ are calculated, an angle AGP corresponding to one pitch is calculated to be $AGP=P/R_0$ from $R_0 \times AGP = P$, and the initial value of the angle AGX is put as $AG_1$. Subsequently, $P_1=(X_1, Y_1)$ is stored in co-ordinates $(U(1), V(1))$ of the first needle location point, the whole angle $PIO="AG_1-AG_2"$ of the circular arc unit $M_1$ is calculated, and the total number $I=PIO/AGP$ is extracted. Subsequently, the counted value J of a needle number counter is set to "1".

Since it has been put as $U(1)=X_1$ and $V(1)=Y_1$, J is counted up by "1", and AGP is added to AGX.

With the above-described arrangement, the needle location point of $J=1$ belongs to the circular arc unit $M_1$ at the outer side. Hence, when J is of an odd number, a point on the side of the unit $M_1$ is selected, and, when J is of an even number, a point on the side of the unit $M_2$ is selected, whereby the needle location points reciprocate between the unit $M_1$ and the unit $M_2$, thereby enabling the performance of embroidery by swings in a specified direction. Then, J is counted up by "1" and AGP is added to AGX, and thereafter, judgement is made whether J is of an odd number or an even number. If J is of an odd number, then a distance RR from the center point $(XX_0, YY_0)$ to a needle location point is put as $R_0$. If J is of an even number, then a judgement is made whether the block is of a hollow-in-the-center shape or a solid-in-the-center shape. The solid-in-the-center shape is intended to describe the case where the center point $(X_0, Y_0)$ is included in the block as with the circle shown in FIG. 38 for example. In the case of a solid-in-the-center shape, it is put as $R=1$ mm. As will be described hereunder, this is equivalent to the provision of a circular hollow-in-the-center shape E having a radius of 1 mm in FIG. 39 for example. In the case of a hollow-in-the-center shape, an additional unit $M_2$ is present inwardly of a circular arc unit $M_1$. Consequently, a point of intersection is to be extracted between the unit $M_2$ and a straight line $L_a$: $Y-Y_0=\tan AGX (X-X_0)$ passing through the point $(XX_0, YY_0)$ and having a vectorial angle tan AGX. For this, in the flow chart of FIG. 29, the equation of the straight line $L_A$ is substituted in place of the equation of the straight line $L_1$, co-ordinates $(xk+1, yk+1)$ of the point of intersection is calculated. Then, $R=\sqrt{(xk+1-X_0)^2+(yk+1-Y_0)^2}$ is calculated.

Now, as apparent from FIG. 37, intervals formed between seams become so small near the co-ordinates of the center $(X_0, Y_0)$, whereby jamming tends to occur. Then, as shown in FIG. 38, when the pitch P is small and/or the unit $M_2$ at the inner side is close to the co-ordinates of the center $(X_0, Y_0)$, the following measure is taken to prevent jamming from occurring. More specifically, firstly, a judgement is made whether the pitch P, which has been set, is larger than 0.4 mm or not for example. When the pitch P is larger than 0.4 mm, it is considered that no jamming occurs, no process to be described hereunder is performed, and immediately, it is put as $RR=R$. When the pitch P is smaller than 0.4 mm, judgement is made whether R is smaller than $R_0/3$ or not. If R is larger than $R_0/3$, then it is considered that the density of the seams in the unit $M_2$ at the inner side (Refer to FIG. 38) is not so high as that of the unit $M_1$ at the outer side, and also, it is put as $RR=R$. If the pitch P is smaller than 0.4 mm and R is smaller than $R_0/3$, then, a judgement is made whether J is a multiple of 4 or not. If not, it is put as $RR=R$. If J is a multiple of 4, then it is put as $RR=\frac{1}{3}R_0$. Then RR is calculated depending upon whether J is of an odd or even number, and whether J is a multiple of 4 or not, respectively. The RR thus calculated respectively are used to successively calculate the co-ordinates of the needle location points $(U(J), V(J))$ until $J<1$, values of the co-ordinates of the point $(U(J), V(J))=P_3=(X_3, Y_3)$ are stored, and thereupon, the flow makes a return.

More specifically, when the pitch $P>0.4$ mm or $R>\frac{1}{3}R_0$, no jamming occurs. And, when J is an even number, it is put as $RR=R$. Consequently, the swinging directions of needle become radial directions centered about the point $(X_0, Y_0)$. In FIG. 37, the needle location points advance in the clockwise direction in such a manner that, when J is of an odd number, the needle location point is disposed on the circular arc unit $M_1$, and, when J is an even number, the needle location point is disposed on the unit $M_2$.

However, in the case of the pitch $P<0.4$ mm and $R<R_0/3$, and when J is an even number, if J is a multiple of 4, then it is put as $RR=\frac{1}{3}R_0$. If J is not a multiple of 4, then it is put as $RR=R$. In consequence, as shown in FIG. 38, half the number of the needle location points which would otherwise be disposed on the unit $M_2$ are set on $RR=R_0/3$ which is disposed outwardly of R with respect to the point $(X_0, Y_0)$, whereby the density of seams on the unit $M_2$ is reduced to one half, thus avoiding jamming. In the case of a circle shown in FIG. 39 also, a hollow-in-the-center shape E provided around the center point $(X_0, Y_0)$ is regarded as the unit $M_2$ in FIG. 38, and a process similar to the above is performed.

(iii) pattern sewing

"Pattern sewing" is intended for forming seams on a contour of a unit at a preset pitch P as described above. Co-ordinates of the needle location points are calculated in accordance with a flow shown in FIG. 40. In the flow, firstly, the counted value J of the needle number counter is reset to "0", and a judgement is made whether the unit, on which seams are to be formed, is of a straight line or a circle (or a circular arc). Description will hereunder be given of the cases of a straight line and a circular arc, separately of each other.

(1) Straight line

The vectorial angle of the unit $AGX=\tan^{-1}[(Y_2-Y_1)/(X_2-X_1)]$ and the length unit $H=\sqrt{(X_2-X_1)^2+(Y_2-Y_1)^2}$ are calculated from the points at opposite ends $(X_1, Y_1)$ and $(X_2, Y_2)$ of the unit, and the number of points $I=H/P$ in the unit is calculated through the pitch P.

Subsequently, the counted values JO of the needle number counters for the individual units are reset to "0", and the needle location points $(U(J+1), V(J+1))$ are calculated by putter as $U(J+1)=X_1+JO.P.\cos AGX$ and $V(J+1)=Y_1+JO.P \sin AGX$. Upon completion of this calculation, JO and J are counted up by "1", and calculation of $(U(J+1), V(J+1))$ is repeated. Thus, when JO becomes larger than the number of points I, then it is put as $U(J+1)=X_2$ and $V(J+1)=Y_2$ (the ending point of the unit), then, J is counted up by "1", and the process goes forward to calculation of the needle location points of the succeeding unit.

(2) Circular arc

The co-ordinates of the center point $(X_0, Y_0)$ and the radius R are calculated from three points $(X_1, Y_1)$, $(X_2, Y_2)$ and $(X_3, Y_3)$ of the unit in accordance with a flow chart shown in FIG. 25. Further, calculation is made on the initial value of angle $AG_2=\tan^{-1}[(Y_1-Y_0)/(X_1-X_0)]$, the final value of angle $AG_2=\tan^{-1}[(Y_3-Y_0)/(X_3-X_0)]$, the whole angle $AGT="AG_2-AG_1"$, and an angle for a pitch $AGP=P/R$. The number of points I is calculated through $I=AGT/AGP$, then, the counted values JO of the individual needle location points $(U(J+1), V(J+1))$ are calculated by putting as $U(J+1)=X_0+R.\cos(AG_1+J_0.AGP)$ and $V(J+1)=Y_0+R.\sin(AG_1+J_0.AGP)$. Upon completion of this calculation, JO and J are counted up by "1", and calculation $(U(J+1), V(J+1))$ is repeated. Thus, when JO becomes larger than the number of points I, then it is put as $U(J+1)=X_3$ and $V(J+1)=Y_3$ (the ending point), and J is counted up by "1". The counter value J of the needle number counter gives a serial number of the needle location numbers over the units in one block.

Upon completion of the above-described calculations over all the units in one block, the flow makes a return.

(iv) jump

"Jump" is intended to describe that movement of a needle is made from a point $P_1$ to a point $P_2$ without a needle location point therebetween. "Jump" does not relate to seam forming. In the present embodiment, a jump is regarded as a block.

Upon completion of calculation of the co-ordinates of the needle location points as described above, the process goes forward to flow charts for storing the co-ordinates of the needle location points as shown in FIGS. 40, 41 and 42. The flow chart for the storing the co-ordinates of the needle location points are adapted to give specific hexadecimal command codes to specify swings to the needle location co-ordinate data and change the needle location co-ordinate data into relative co-ordinates. The reason for this change into the relative co-ordinates is that necessary data for a driving source of a sewing machine for embroidery are what distance and in what direction the needle advances from the current needle location co-ordinates to the succeeding needle location co-ordinates, but not the needle location co-ordinates themselves.

In the flow, firstly, a judgement is made whether current data belongs to the first block or not. If so, a start code 7D is immediately outputted and it is put as $U0=U(1)$ and $V0=V(1)$. If not, a check is made on the connection to the preceding block. More specifically, when the ending point of the preceding block is put as (U0, V0) and the first point of the current block is put as $(U(1), V(1))$, the distance between the two points $L=\sqrt{(U0-U(1))^2+(V0-V(1))^2}$ is calculated and a judgement is made on the value of L. If $L=0$, then the flow immediately makes a return. If $L\neq 0$, "80" (a command code to instruct a pattern) is emitted to connect (U0, V0) to (U(1), V(1)) through a straight-lined seam.

Subsequently, in accordance with the type of swings inputted through a key of the cursor 12, if the swinging direction is larger in inclination than 45° with respect to the base line $X_n$ in the case of "embroidery by swings in specified direction", then it is regarded as an embroidery in the longitudinal direction and a command code "FF" is emitted. If the swinging direction is smaller in inclination than 45° with respect to the base line $X_n$, it is regarded as an embroidery in the lateral direction and a command code "FE" is emitted. If it is "swings from center", a command code "7F" is emitted. If it is "pattern sewing", a command code "80" is emitted. If it is "jump", a command code "7E" is emitted. When a command code is specified, the total number of needles in one block is read out, the counted value JJ of a predetermined counter is reset to "1", and JJ is counted up by "1". The whole data in one block is changed into relative co-ordinates (UU, VV) by use of this JJ in the following manner. More specifically, it is put as $UU=U(JJ)-U0$, $VV=V(JJ)-V0$ and $U0=U(1)$, $V0=V(1)$ in the initial condition, and JJ is counted up by "1" from "1".

Affirmation is made which does not exceed the pitch P out of $UU=U(2)-U(1)$ and $VV=V(2)-V(1)$. When both UU and VV are smaller than the pitch P, the values of UU and VV are converted into binary codes and fed to the data disk. If either UU or VV is larger than the pitch P, then this corresponds to some operational miss in some data as apparent from FIG. 30. Hence, it is regarded as an error. Thereafter, in general, as for the co-ordinates of the needle location point of a serial number JJ(U(JJ), V(JJ)), it is put as U0=U(JJ) and V0=V(JJ), JJ is counted up by "1", and operation is made on UU=U(JJ +1)−U(JJ) and VV=V(JJ +1)−V(JJ), whereby the relative coordinates of a serial number JJ (UU, VV) is fed to the data disk. Thus, JJ is successively counted up by "1" until JJ>J. When JJ>J is reached, all of the needle location co-ordinates are changed into relative co-ordinates, thus completing storage of those relative co-ordinates into the data disk. Hence, a directory area write-in flow shown in FIG. 43 is processed, pattern Nos., track Nos. and the like are written into the directory area of the data disk, and the process comes to an end.

This invention has the above-described arrangement. Description will hereunder be given of the case of inputting a pattern in conjunction with a specific example. A paper of an original figure is rested on a tablet 11, and, for example, one of the alphabet "B" and an exclamation mark "!" are to be read. In the first place, "B" is divided into six blocks as shown in FIG. 49. In passing, in FIGS. 44 through 53, there are illustrated blocks, which have been read, and blocks, which have been read anew, are successively added thereto.

Now, a new input is specified through operation of an operating means 19, the key 14b, for example, of the cursor 12 is pressed to set the scale for one time, thereafter, the key 14a is pressed with the mark 13a of the cursor 12 being registered with a point $S_1$ on the tablet 11, and subsequently, the key 14a is pressed with the mark 13a being registered with a point $S_2$, whereby the base line connecting $S_1$ to $S_2$ is specified. Subsequently, an inclination of the base line $X_n$ to the axis X of the tablet 11 is calculated in accordance with a co-ordinate transformation calculation routine (Refer to FIG. 10).

Figure 44:
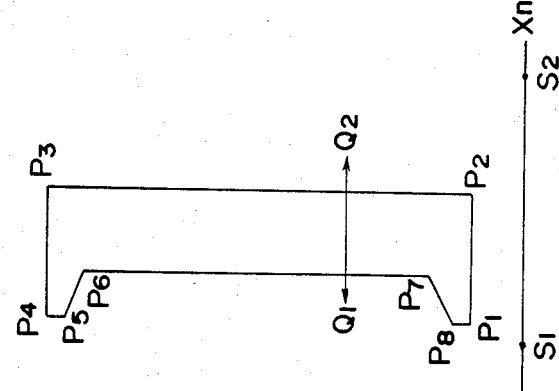

Subsequently, in FIG. 44, a key 14l of the cursor 12 is pressed to specify "embroidery sewing", thereafter, the mark 13a of the cursor 12 is registered with a point $P_1$ at the lower left corner of the first block of the alphabet "B", the key 14b corresponding to an input of a "straight line" is pressed because a path to the succeeding point $P_2$ is a straight line, and subsequently, the key 14b is pressed with the mark 13a being registered with the point $P_2$, whereby reading of a section from $P_1$ to $P_2$ is completed. Further, the key 14b is successively pressed with the mark 13a being registered with $P_2$, $P_3$, $P_4$, $P_5$, $P_6$ and $P_7$ in succession, and a key 14n to instruct completion of the block is pressed at the ending point $P_8$ of the first block, thus completing data reading of the first block. Subsequently, the key 14a is pressed with the mark 13a of the cursor 12 being registered with a point $P_1$ on the tablet 11, and subsequently, the key 14a is pressed with the mark 13a being registered with a point $P_2$, whereby the swinging direction is specified to take the direction of $Q_1$ to $Q_2$ (lateral direction). Thereafter, a numeral key such for example as the key 14c of the cursor 12 is pressed, whereby the pitch "P=0.2 mm" for swinging is set.

Figure 45:
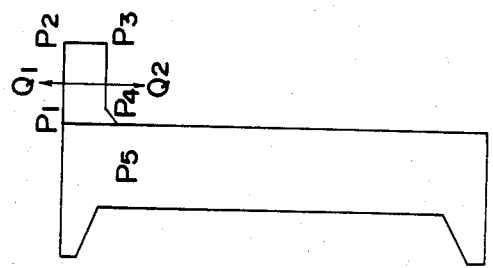

With the second block in FIG. 45 also, firstly, the key 14l of the cursor 12 is pressed to specify "embroidery sewing". The second block consists of only straight lines similarly to the first block, so that reading may be made on points $P_1$, $P_2$, $P_3$, $P_4$ and $P_5$ in succession in the same manner as in the case of the first block. Upon completion of reading, the key 14a is pressed with the mark 13a of the cursor 12 being registered with a point $Q_1$, and subsequently, the key 14a is pressed with the mark 13a being registered with a point $Q_2$, whereby the swinging direction is specified in the direction of $Q_1$ to $Q_2$ (longitudinal direction). Thereafter, the key 14b, for example, of the cursor 12 is pressed, so that the pitch for swinging "P=0.1 mm" can be set.

Figure 46:
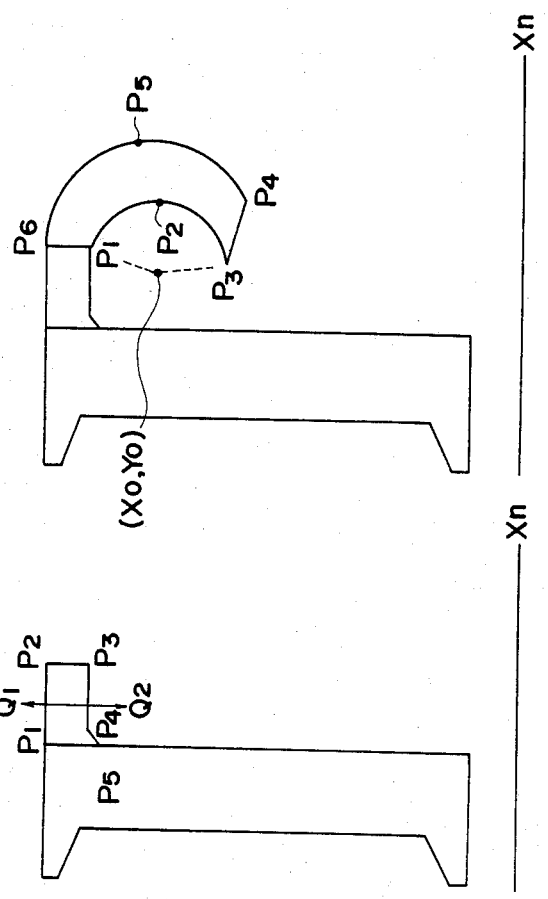

With the third block in FIG. 46 also, firstly, the key 14l of the cursor 12 is pressed to specify "embroidery sewing". Since $P_1$ and $P_2$, $P_3$ and $P_4$ in this third block are circular arc units, firstly the key 14c to specify a "circular arc" is pressed with the mark 13a of the cursor 12 being registered with a point $P_1$. Then, in the data check routine shown in FIG. 13, the counted value in the "circular arc point number" counter becomes "1". Then, if the key 14b to specify a "straight line" is erroneously pressed at a point $P_2$, then the counted value in the "straight line number" counter is counted up in a condition where the circular arc number is "1". Hence, an error is judged in accordance with the flow shown in FIG. 13, whereby this error is reported by the buzzer. Here, when the key 14j of the cursor 12 is pressed, data inputted in connection with the point $P_2$ in accordance with the flow shown in FIG. 11 is removed, whereby the buzzer is stopped. Then, the mark 13a of the cursor 12 is registered with the point $P_2$ again and the key 14c to specify a "circular arc" is pressed this time. Subsequently, the mark 13a of the cursor 12 is registered with a point $P_3$, and the key 14b to specify a "straight line" is pressed because a section between the succeeding point $P_4$ and the point $P_3$ is a straight line. Thus, the circular arc is defined by the three points $P_1$, $P_2$ and $P_3$. Subsequently, the key 14c to specify a "circular arc" is successively pressed with the mark 13a of the cursor 12 being registered with points $P_4$ and $P_5$ in succession. When the key 14n to specify "completion" is pressed at the final point $P_6$, the circular arc is defined by the three points $P_4$, $P_5$ and $P_6$ and the data reading in the third block comes to an end. Then, when the key 14h is pressed to specify "swings from center", the "swings from center" being radial of the center point of the circular arc defined by $P_1$, $P_2$ and $P_3$ are specified. When a numeral key such for example as the key 14e is pressed, a pitch "P=0.4 mm" is set.

Thereafter, with the fourth and sixth blocks in FIGS. 47 and 49, data reading is performed in the same manner as in the first and second blocks. With the fifth block in FIG. 48, data reading is performed in the same manner as in the third block. Additionally, in the fourth and sixth blocks, the longitudinal swings are specified, while, in the fifth block, the "swings from center" are specified.

Upon completion of data reading in the sixth block (Refer to FIG. 48) as being the final block, in order to previously move a needle location point for the succeeding embroidery pattern, the key 14m to specify "jump" is pressed with the mark 13a of the cursor 12 being registered with the final point $P_5$ of the sixth block. Subsequently, when the key 14n to specify completion of one pattern reading is pressed twice with the mark 13a being registered with a point $Q_3$ spaced rightwardly apart from the point $P_5$, whereby the "jump" from $P_5$ to $Q_3$ is read in and reading of one pattern "B" comes to an end. As against the data of the pattern "B", which has been read in, pattern No. is determined through a key operation of the operating means 19 and the pattern data is stored in the system disk.

Subsequently, the pattern data is read out, the maximum values in directions X and Y and the minimum values in the directions X and Y of the pattern "B" are selected, respectively, the scale of an indicated figure on the CRT's indicating portion of the indicating means 17 is determined in accordance with the co-ordinate transformation coefficient calculation routine, and the indication on the CRT is performed in such a manner that the first block is in red color, the second block in yellow color, the third block in blue color, the fourth block in green color, the fifth block in white color, the sixth block in purple color, the seventh block's portion indicating the "jump" in red color again, in accordance with the flow chart shown in FIG. 24.

The data concerning the pattern "B" thus indicated is processed in the needle location co-ordinate calculation, the needle location co-ordinate storage and the directory section write-in in accordance with "PTOUT" (the flows shown in FIGS. 25 through 28, 35, 36 and 40 through 42), and stored in the data disk. Description will now be given of reading of the exclamation mark "!". The examation mark "!" is divided into two blocks according to its pattern.

Now, a new input is specified again through operation of the operating means 19. Here, a numerical key for example such as the key 14b of the cursor 12 is pressed in the same manner as in the case of the pattern "B" to set the scale for one time, and thereafter, the key 14a is pressed with the mark 13a of the cursor 12 being registered with a point $S_1$ on the tablet 11, and subsequently, the key 14a is pressed with the mark 13a being registered with a point $S_2$, whereby a base line $X_n$ connecting $S_1$ to $S_2$ is specified. Then, an inclination of the base line $X_n$ to the axis X of the tablet 11 is calculated in accordance with the co-ordinate transformation coefficient calculation routine (Refer to FIG. 10).

Next, in FIG. 50, the key 14k to specify "embroidery sewing" of the cursor 12 is pressed, thereafter, the key 14b to instruct a "straight line" is pressed with the mark 13a of the cursor 12 being registered with a point $P_1$, and subsequently, the key 14n to instruct "completion" is pressed with the mark 13a being registered with a point $P_2$. Thus, the points $P_1$ and $P_2$ are interconnected through a straight-lined pattern sewing. The reason for this is that the top end point $P_1$ of the block of pattern sewing is specified to the first point $P_1$ (Refer to FIG. 51) in the upper block $B_1$ of "!", whereby the embroidery advances from above to below in the upper block $B_1$.

Subsequently, in FIG. 51, the key 14l of the cursor 12 is pressed to specify "embroidery sewing". Then, the ending point $P_2$ in the block of embroidery sewing in FIG. 50 is specified to the starting point of the block $B_1$, the key 14c to specify a "circular arc" is successively pressed with the mark 13a of the cursor 12 being registered with the points $P_1$ and $P_2$ in succession, and the key 14b to specify a "straight line" is pressed at a point $P_3$, whereby the circular arc is defined by the points $P_1$, $P_2$ and $P_3$. Subsequently, the key 14b is successively pressed with the mark 13a being registered with $P_4$, $P_5$, $P_6$ and $P_7$ in succession, then, the key 14c is successively pressed with the mark 13a being registered with $P8$ and $P9$ in succession, and the key 14n to instruct "completion" is pressed at $P_{10}$, which is substantially registered with $P_1$, whereby the circular arc is defined by $P_8$, $P_9$ and $P_{10}$, so that the reading of the block $B_1$ comes to an end. Then, in FIG. 51, the key 14a is pressed with the mark 13a of the cursor 12 being registered with the point $Q_1$, and subsequently, the key 14a is pressed with the mark 13a being registered with the point $Q_2$, whereby, the swinging direction is specified to the direction of $Q_1$ to $Q_2$ (lateral direction). Thereafter, the key 14d, for example, of the cursor 12 is pressed, whereby the pitch "P=0.3 mm" for swings is set.

Next, in FIG. 52, the key 14m to instruct "jump" is pressed with the mark 13a of the cursor 12 being registered with the point 10 of the block $B_1$, and subsequently, the key 14n to instruct "completion" is pressed with the mark 13a being registered with the starting point $P_1$ of the block $B_1$. Thus, the needle location point moves from $P_{10}$ to $P_1$. After the key 14l is pressed to set "embroidery sewing", the key 14d to specify a "circle" is successively pressed with the mark 13a of the cursor 12 being registered with the points $P_1$ and $P_2$ in succession, and the key 14n is pressed at $P_3$, whereby the circle is defined by the points $P_1$, $P_2$ and $P_3$, and reading of the block $B_2$ comes to an end. Then, the key 14h is pressed to instruct "swings from center", and subsequently, the key 14c is pressed, whereby the pitch "P=0.2 mm" is set. Upon completion of data reading, in order to previously move the needle location point for the succeeding embroidery pattern, the key 14m to specify "jump" is pressed with the mark 13a of the cursor 12 being registered with the final point $P_3$ of the block $B_2$, and subsequently, the key 14n to instruct completion of data reading of one pattern is pressed twice with the mark 13a being registered with the point $Q_1$ spaced apart from the point $Q_1$, whereby the "jump" from $P_3$ to $Q_1$ is read in and reading of one pattern "B" comes to an end.

FIG. 53 shows the embroidery seams of the alphabet "B" and the exclamation mark "!" thus inputted.

In addition, in the present embodiment, there has been shown an arrangement wherein the taboret 6 is supported on the support frame 5 and the support frame 5 is made movable by the operating means, however, this arrangement may be replaced by one in which the taboret may be connected to the operating means for its movement.

Furthermore, in the present embodiment, such an arrangement has been shown that the support frame is made movable in the directions X and Y by the data of the data disk, however, this arrangement may be replaced by one in which a sewing machine for zigzag chain stitch is provided and oscillations of the needle are controlled by the data of the data disk simultaneously with the movement of the support frame.

Additionally, in the present embodiment, there has been shown a figure in which the opposing sides are formed of circular arcs, however, such a figure may be used in which only one side, either an inner or an outer side is formed of a circular arc.

As has been described hereinabove, according to the present invention, in a figure in which at least one side out of the opposing two sides has a circular arc-shaped contour, needle location points are set equidistantly, circumferentially on the circular arc in connection with reading of the circular arc side, needle location points are set at points of intersection between the side opposed to the circular arc side and radial lines from the center of the circular arc and passing through the midpoints between the respective needle location points of the circular arc side, so that the needle location points can be easily set to improve the working efficiency, the needle location points on the circular and can be equidistantly arranged and the needle location points on the side opposed to the circular arc side can be set on the radial lines passing through the midpoints between the respective needle location points of the circular arc side, thereby offering the advantages that the embroidery seams are neatly finished and the sewn product is improved in quality.

In addition, in the present embodiment, such an arrangement has been shown that the taboret 6 is supported on the support frame 5 and the support frame 5 is made movable by the operating means, however, this arrangement may be replaced by one in which the taboret may be connected to the operating means for its movement.

Furthermore, in the present embodiment, such an arrangement has been shown that the support frame is made movable in the directions X and Y by the data of the data disk, however, this arrangement may be replaced by one in which a sewing machine for zigzag chain stitch is provided wherein the needle is oscillated in the lateral direction by the control of a servo-motor, stepping motor or the like, and oscillations of the needle may be controlled by the data of the data disk simultaneously with the movement of the support frame.

As has been described hereinabove, according to the present invention, when a circular arc line and a straight line are connected to each other, it has been made possible that a continuous line is set at a connecting point through manual operation of a first or second switch corresponding to the succeeding line, so that the control switch can be simplified in operation so as to facilitate the data input operation, thus attaining the advantage in improved working efficiency.

Furthermore, in the present embodiment, such an arrangement has been shown that the taboret 6 is supported on the support frame 5 and the support frame 5 is made movable by the operating means, however, this arrangement may be replaced by one in which the taboret may be connected to the operating means for its movement.

In addition, in the present embodiment, there has been shown the arrangement in which the support frame is made movable in the directions of X and Y by the data of the data disk, however, this arrangement may be replaced by one in which a sewing machine for zigzag chain stitch is provided wherein the needle is oscillated in the lateral direction by the control of a servo-motor, stepping motor or the like, and oscillations of the needle may be controlled by the data of the data disk simultaneously with the movement of the support frame.

As has been described hereinabove, according to the present invention, in response to the specifying signal generated through operation, the direction of embroidery seams is set such that the direction of embroidery seams lies along the straight line interconnecting two points corresponding to two reading signals generated after the specifying signal is generated, so that the direction of seams to the figure of embroidery may be desirably set by an operator, thereby attaining the advantages that the emboridery seams do not become too long according to the figure so as to be finished neatly and the sewn product is improved in quality.

Additionally, in the present embodiment, such an arrangement has been shown that the taboret 6 is supported on the support frame 5 and the support frame 5 is made movable by the operating means, however, this arrangement may be replaced by one in which the taboret may be connected to the operating means for its movement.

Furthermore, in the present embodiment, there has been shown the arrangement in which the support frame is made movable in the directions of X and Y by the data of the data disk, however, this arrangement may be replaced by one in which a sewing machine for zigzag chain stitch is provided wherein the needle is oscillated in the lateral direction by the control of a servo-motor, stepping motor or the like, and oscillations of the needle may be controlled by the data of the data disk simultaneously with the movement of the support frame.

The present embodiment is applicable to not only the "embroidery" but also to the "pattern".

As has been described hereinabove, according to the present invention, a circle or circular and passing through three points is set in response to a completion signal after reading three different points on the tablet in response to successively emitted three data signals and a circle or circular arc is uniformly divided on the basis of specification of the seam interval to thereby set the needle location points on the circle or the circular arc, whereby the need for setting the needle location points by hand writing is eliminated, thus enabling to attain the advantages that specification of the needle location points on the circle or circular arc can be facilitated and the working efficiency can be considerably improved.

In addition, in the present embodiment, such an arrangement has been shown that the taboret 6 is supported on the support frame 5 and the support frame 5 is made movable by the operating means, however, this arrangement may be replaced by one in which the taboret may be connected to the operating means for its movement.

Furthermore, in the present embodiment, there has been shown the arrangement in which the support frame is made movable in the directions of X and Y by the data of the data disk, however, this arrangement may be replaced by one in which a sewing machine for zigzag chain stitch is provided wherein the needle is oscillated in the lateral direction by the control of a servo-motor, stepping motor or the like, and oscillations of the needle may be controlled by the data disk simultaneously with the movement of the support frame.

In the present embodiment, when the ratio between the inner and the outer circles are 1:3 and the pitch is less than 0.4 mm, the needle location points on the inner side are set at positions of $\frac{1}{3}$ of the distance between the inner and the outer circles from the inner circle, however, the above-described numerical value should not necessarily limited to the ones shown in the present embodiment.

In the present embodiment, there has been shown a method in which the original figure is read by the reading means consisting of the tablet 11 and the cursor 12, and the data for setting the needle location points is set by the computer on the basis of the data thus read, however, this method may be replaced by a method wherein the operator instructs the needle location points one after one to form the data, or any other method.

As has been described hereinabove, according to the present invention, the path of the needle location points starts from a point on the outer circle, passes through a midpoint between the outer and inner circles, returns to a point on the outer circle, moves to a point on the inner circle, and returns to a point on the outer circle, thus repeating the same cycle as described above when the ratio of the inner circle to the outer circle in diameter is smaller than a predetermined value and the interval of needle location points of the inner circle is shorter than a predetermined length, whereby no jamming and the like tend to occur even when the interval between the needle location points is small on the side of the inner circle, thus attaining the advantages that the embroidery seams are neatly finished and the sewn product is improved in quality.

What is claimed is:

1. A method for embroidering a cloth with a pattern having at least a circular arc and an opposite line opposed to the circular arc, thereto, said method comprising the steps of:

reading data of at least three points on the circular arc of an original pattern two points of which are end points of the circular arc-shaped line, said data being read in a form of co-ordinates;

determining, in accordance with the thus read data of said three prints, a circular arc origin and a radius of the circular arc to specify the circular arc;

reading data of at least two points on the opposite line of the orignal pattern;

determining, in accordance with predetermined pitch for a needle location point, needle location points on the circular arc specified by said circular arc origin and said radius;

determining a radial bisector passing through said circular arc origin and bisecting an angle defined by radial lines connecting the circular arc origin to two successive needle location points on the specified circular arc;

determining needle location points on the opposite line in such a manner that they are positioned at intersections between said opposite line and said radial bisector; and moving the cloth of the needle in accordance with said needle location points to embroider the cloth with the pattern.

2. A method according to claim 1, wherein said predetermined pitch for the needle location point is defined by an angular value with respect to the circular arc origin, said needle location points on the circular arc are spaced by twice said angular value and said angle defined by the radial lines corresponds to twice the angular value.

3. A method for embroidering a cloth with a pattern having an outer circular arc add an inner opposite line opposed to the outer circular, said method comprising the steps of:

reading data of at least three points on the outer circular arc of an original pattern;

reading data of at least two points on the inner opposite line of the original pattern;

determining, in accordance with the thus read data of said three points, an outer circular arc origin and a radius of an outer circular arc to specify the outer circular arc;

determining, in accordance with predetermined pitch for a needle location point, needle location points on the specified outer circular arc;

determining radial bisector passing through the outer circular arc origin and bisecting an angle defined by radial lines connecting the outer circular arc origin to two successive needle location points on the specified outer circular arc;

determining first intersections between the inner opposite line specified by said data of the two points on the inner opposite line and said each radial bisector;

judging as to whether the ratio of a distance between the first intersection and the outer circular arc origin to the radius of the specified outer circular arc is less than a predetermined ratio; and determining the needle location points on the specified inner opposite line in such a manner that they are wholly positioned at the first intersections if said ratio is greater than the predetermined ratio, and that they are alternatingly positioned at the first intersections and second intersections between the radial bisectors and a mid line positioned between the needle location points on the outer circular arc and the first intersections, if said ratio is less than the predetermined ratio.

4. A method according to claim 3, wherein said inner opposite line is an inner circular arc which is co-axial with said outer circular arc so that said origin is common for two circular arcs, wherein said inner circular arc to be embroidered is specified by data of at least three points on the inner circular arc of the original pattern and wherein said distance between the first intersections and said common origin is a radius of the inner circular arc which is determined by the data of the three points on the inner circular arc.

5. An apparatus for reading data for a contour of a pattern to be embroidered comprising:

cursor means manually movable upon an original pattern for indicating a point on the contour of the original pattern so that positional data of the point thus indicated are read in a form of co-ordinate;

a first manual switch for a straight line for producing a first signal when it is operated after said cursor is positioned;

a second manual switch for a circular arc for producing a second signal when it is operated after said cursor is positioned;

a third manual switch for completion of reading of data for producing a third signal, said third manual switch being operated when reading of the data for a pattern to be embroidered is completed; and judging means for judging that data of the single straight line and single circular arc connected thereto are read when four signal including one first signal, two successive second signals and one third signal are successively generated of four signals including two successive second signals, one first signal and one third signal are successively generated.

6. An apparatus according to claim 5, wherein said judging means further judges that the single straight line is read when both said first and third signals are successively generated, that more than one straight line is read when said two or more successive first signals and third signal are successively generated, that the single circular arc is read when two successive second signals and the third signal are successively generated and that more than one circular arc is read when five or more successive second signals and the third signal are successively generated.

7. An apparatus according to claim 5, wherein said judging means comprises:

a first counter responsive to said first signal for counting up by one in response to said first signal;

a second counter responsive to said second signal for counting up by one in response to said second signal; and a third counter responsive to an output of said second counter for counting up by one in response to the output of said second counter indicating "3", for counting up by one in response to said output of said second counter indicating "2" and counting up of the first counter, and for counting up by one in response to said output of said second counter indicating "2" and said third signal; and wherein said second counter is reset in response to counting up of said third counter after generation of said first signal and said second counter is set to be "1" in response to counting up of said third counter after generation of said second signal.

8. An apparatus according to claim 6, wherein said judging means comprises:

a first counter responsive to said first signal for counting up by one in response to said first signal;

a second counter responsive to said second signal for counting up by one in response to said second signal; and a third counter responsive to an output of said second counter for counting up by one in response to the output of said second counter indicating "3", for counting up by one in response to said output of said second counter indicating "2" and counting up of the first counter, and for counting up by one in response to said output of said second counter indicating "2" and said third signal; and wherein said second counter is reset in response to counting up of said third counter after generation of said first signal and said second counter is set to be "1" in response to counting up of said third counter after generation of said second signal.

9. An apparatus for embroidering a cloth with a pattern comprising:

means for reading data of a contour of an original pattern and a direction of movement of a needle or the cloth;

means for determining the contour of the pattern in accordance with the thus read data and the direction of movement of the needle or the cloth in accordance with a line connecting two needle location points to each other;

means for determining successive lines oriented in the thus determined direction in such a manner that they are spaced at a predetermined pitch for the needle location point;

means for determining the needle location points on the specified contour in such a manner that they are positioned at intersections between said successive lines and the specified contour; and means for moving the needle or the cloth in accordance with said needle location points to embroider the cloth with a pattern.

10. An apparatus according to claim 9, wherein when said contour is a triangle, at least three points on the contour of the original pattern are read by said reading means and said determining means determine the triangle based on the thus read data of the three points.

11. An apparatus according to claim 9, wherein when said contour is rectangle, at least four points on the contour of the original pattern are read by said reading means and said determining means determines the rectangle based on the thus read data of four points.

12. An apparatus according to claim 9, wherein when said pattern further includes a circular arc, said determining means determines the circular arc by determination of a circular arc origin and a radius of the circular arc defined by reading of at least three points on the circular arc.

* * * * *